(12) United States Patent
Zhang et al.

(10) Patent No.: US 12,003,836 B2
(45) Date of Patent: Jun. 4, 2024

(54) OPTICAL SYSTEM, LENS MODULE, AND ELECTRONIC DEVICE

(71) Applicant: JIANGXI JINGCHAO OPTICAL CO., LTD., Jiangxi (CN)

(72) Inventors: Wenyan Zhang, Jiangxi (CN); Hairong Zou, Jiangxi (CN)

(73) Assignee: JIANGXI JINGCHAO OPTICAL CO., LTD., Nanchang (CN)

(*) Notice: Subject to any disclaimer, the term of this patent is extended or adjusted under 35 U.S.C. 154(b) by 170 days.

(21) Appl. No.: 17/591,156

(22) Filed: Feb. 2, 2022

(65) Prior Publication Data

US 2022/0159154 A1 May 19, 2022

Related U.S. Application Data

(63) Continuation of application No. PCT/CN2019/099837, filed on Aug. 8, 2019.

(51) Int. Cl.
| | | |
|---|---|---|
| *H04N 23/55* | (2023.01) | |
| *G02B 7/02* | (2021.01) | |
| *G02B 9/64* | (2006.01) | |
| *G02B 13/00* | (2006.01) | |
| *G03B 17/12* | (2021.01) | |
| *H04N 23/51* | (2023.01) | |
| *H04N 23/54* | (2023.01) | |

(52) U.S. Cl.
CPC ............ *H04N 23/55* (2023.01); *G02B 7/021* (2013.01); *G02B 9/64* (2013.01); *H04N 23/51* (2023.01); *H04N 23/54* (2023.01); *G02B 13/0045* (2013.01); *G03B 17/12* (2013.01)

(58) Field of Classification Search
None
See application file for complete search history.

(56) References Cited

U.S. PATENT DOCUMENTS

2018/0188483 A1* 7/2018 Hsieh ................... G02B 9/64

FOREIGN PATENT DOCUMENTS

| CN | 108732724 A | 11/2018 | |
|---|---|---|---|
| CN | 109031590 A | * 12/2018 | ............ G02B 13/00 |
| CN | 109491047 A | * 3/2019 | ......... G02B 13/0045 |
| CN | 109491047 A | 3/2019 | |
| CN | 109752823 A | 5/2019 | |

OTHER PUBLICATIONS

International Search Report issued in corresponding international application No. PCT/CN2019/099837 dated Apr. 26, 2020.

* cited by examiner

*Primary Examiner* — Quan Pham
(74) *Attorney, Agent, or Firm* — HAUPTMAN HAM, LLP

(57) ABSTRACT

An optical system, a lens module, and an electronic device are provide. The optical system includes, in order from an object side to an image side along an optical axis, a first lens with a positive refractive power, a second lens with a negative refractive power, a third lens with a refractive power, a fourth lens with a refractive power, a fifth lens with a refractive power, a sixth lens with a refractive power, and a seventh lens with a negative refractive power. The optical system further includes a stop, and the optical system satisfies the following expression: 1.5<TTL/D<2.5.

19 Claims, 24 Drawing Sheets

OPTICAL SYSTEM, LENS MODULE, AND ELECTRONIC DEVICE

CROSS-REFERENCE TO RELATED APPLICATION(S)

The present application is a continuation of International Application No. PCT/CN2019/099837, filed on Aug. 8, 2019, the disclosure of which is hereby incorporated by reference in its entirety.

TECHNICAL FIELD

The present disclosure relates to the field of optical imaging technology, and particularly to an optical system, a lens module, and an electronic device.

BACKGROUND

With a wide application of electronic products such as mobile phones, tablet computers, drones, and computers in life, various technological improvements have been introduced. In improvements of new electronic products, an improvement and innovation of shooting effect of a camera lens has become one of the focuses of people's attention, and has become an important part of scientific and technological improvements. Whether a micro camera element can be used to take high-quality and high-definition pictures, and even clear pictures in low light conditions, has become a key factor for modern people to choose electronic products. On the other hand, with advancements of science and technology, performance improvements of photosensitive elements such as an optocoupler, a charge-coupled device (CCD), and a complementary metal oxide semiconductor (CMOS) provide a possibility of shooting high-quality images and videos, which brings people a higher-quality shooting experience. Therefore, miniaturization and performance improvement in an optical system design have become key factors for improving the shooting quality of current cameras.

SUMMARY

The present disclosure aims at providing an optical system, a lens module, and an electronic device, and the optical system that meet miniaturization requirements, high image quality, high definition, and shooting in a low light environment.

Technical solutions are provided hereinafter to achieve at least one objective of the present disclosure.

In a first aspect, an optical system is provided according to the present disclosure. The optical system includes, in order from an object side to an image side along an optical axis, a first lens with a positive refractive power, a second lens with a negative refractive power, a third lens with a refractive power, a fourth lens with a refractive power, a fifth lens with a refractive power, a sixth lens with a refractive power, and a seventh lens with a negative refractive power.

The first lens has an object-side surface which is convex and an image-side surface which is concave at the optical axis. The second lens has an object-side surface which is convex and an image-side surface which is concave. The third lens has an object-side surface which is convex at the optical axis and an image-side surface which is concave at the optical axis. The fourth lens has an object-side surface which is concave at a periphery and an image-side surface which is convex at a periphery. The fifth lens has an object-side surface which is convex at the optical axis and an image-side surface which is concave at the optical axis. The sixth lens has an object-side surface which is concave at a periphery and an image-side surface which is convex at a periphery. The seventh len has an image-side surface which is concave at the optical axis and an image-side surface which is convex at a periphery. The optical system further includes a stop, and the optical system satisfies the following expression: $1.5<TTL/D<2.5$; where TTL represents a distance on the optical axis from the object-side surface of the first lens to an imaging plane of the optical system, and D represents an aperture of the stop. An appropriate configuration in a surface profile and a refractive power of each lens of the first to seventh lenses ensures that the optical system satisfies the miniaturization requirements, high image quality, high definition, and low-light shooting capabilities. At the same time, an appropriate value of TTL/D can ensure a lens miniaturization design and an amount of light entering the optical system required for lens shooting, which can achieve high-quality and high-definition shooting effects, and ensure a sufficient amount of light entering the optical system for shooting object space scenes with low brightnesses such as night scenes, starry sky, and the like.

In a possible implementation, the optical system satisfies the following expression: $0.6<L/Imgh<0.8$; where L represents a clear aperture diameter of the first lens, and Imgh represents half of a diagonal length of an effective pixel area of the imaging plane of the optical system. The aperture diameter of the first lens determines the amount of light entering the entire optical system, and a size of a photosensitive surface determines an image definition and a pixel size of the entire optical system. An appropriate ratio of the aperture diameter of the first lens to the size of the photosensitive surface can ensure a sufficient amount of light entering the entire optical system, which can ensure an image shooting definition and achieve a high-quality shooting for the object space scenes with low brightnesses such as night scenes, starry sky, and the like.

In a possible implementation, the optical system satisfies the following expression: $1<f14/f<1.5$; where f14 represents a combined focal length of the first lens, the second lens, the third lens, and the fourth lens, and f represents an effective focal length of the optical system. The first to fourth lenses are mainly used to correct distortion and rationally expand an incident angle of light to meet image height requirements, and form an appropriate ratio with the optical effective focal length to meet the requirements of the optical system.

In a possible implementation, the optical system satisfies the following expression: $Fno<2$; where Fno represents an F-number of the optical system. When $Fno<2$, it can satisfy the miniaturization requirements and ensure a large aperture under a condition of a certain focal length, so that there is a sufficient light entering the optical system, a captured image can have an improved definition, and a high-quality shooting for the object space scenes with low brightnesses such as night scenes, starry sky, and the like can be achieved.

In a possible implementation, the optical system satisfies the following expression: $Fno/TTL<0.29$; where Fno represents an F-number of the optical system. When this expression is satisfied, the large aperture and miniaturization design requirements of the lens system can be taken into account at the same time, a sufficient amount of light entering the optical system can be provided for photography and shooting, which satisfies the requirements of high-quality and high-definition shooting, and can provide high-quality shooting for the object space scenes with low brightnesses such as night scenes, starry sky, and the like.

In a possible implementation, the optical system satisfies the following expression: $TTL/Imgh<1.5$; where Imgh represents half of a diagonal length of an effective pixel area of the imaging plane of the optical system. The miniaturization requirements can be satisfied, and at the same time, the imaging plane has large image height information, which can satisfy requirements on shooting image quality and definition.

In a possible implementation, the optical system satisfies the following expression: $1.0<TTL/f<1.3$; where f represents an effective focal length of the optical system. While satisfying high-definition optical performance, a focal length that matches a structure of the optical system is required to satisfy the miniaturization requirements.

In a possible implementation, the optical system satisfies the following expression: $1.0<f/f1<1.3$; where f1 represents an effective focal length of the first lens, and f represents an effective focal length of the optical system. The first lens provides all optical information from an object space to an image space for a lens group, and the aperture size and the focal length of the first lens determine an acquisition of light information in the object space by the optical system. When the above expression is satisfied, a ratio of the focal length of the first lens to the focal length of the optical system is appropriate, such that an aberration generated by the first lens can be corrected, and a processing technology is simple.

In a possible implementation, the optical system satisfies the following expression: $0.2<(R9+R10)/R9*R10<0.65$; where R9 represents a radius of curvature of the object-side surface of the fifth lens, R10 represents a radius of curvature of the image-side surface of the fifth lens.

When the lens group satisfies the above expression, the radius of curvature of the object-side surface and the radius of curvature of the image-side surface of the fifth lens are proper, which can ensure the machinability of the fifth lens in shape, and can effectively reduce the astigmatism of the optical system.

In a possible implementation, the optical system satisfies the following expression: $2<(R1+R2)/f1<4.5$; where R1 represents a radius of curvature of the object-side surface of the first lens, R2 represents a radius of curvature of the image-side surface of the first lens, and f1 represents an effective focal length of the first lens. In this way, large-diameter requirements of the first lens can be satisfied, and it is convenient to correct the aberration.

In a possible implementation, the optical system satisfies the following expression: $1.5<R3/R4<3.5$; where R3 represents a radius of curvature of the object-side surface of the second lens, and R4 represents a radius of curvature of the image-side surface of the second lens. The second lens provides a negative refractive power to balance a distortion generated by the first lens and correct the aberration generated by the first lens to a certain extent.

In a possible implementation, the optical system satisfies the following expression: $-100<(R5+R6)/(R5-R6)<180$; where R5 represents a radius of curvature of the object-side surface of the third lens, and R6 represents a radius of curvature of the image-side surface of the third lens. The radius of curvature of the object-side surface and the radius of curvature of the image-side surface of the third lens are relatively proper, and an incident angle can be rationally expanded to satisfy the high image requirements of the optical system, reduce a system sensitivity, and improve the assembly stability.

In a possible implementation, the optical system satisfies the following expression: $-0.6<f1/f2<-0.3$; where f1 represents an effective focal length of the first lens, and f2 represents an effective focal length of the second lens. The first lens provides a positive refractive power, the second lens provides a negative refractive power, and the two lenses are properly configured to correct a positional chromatic aberration of the optical system.

In a possible implementation, the optical system satisfies the following expression: $1.5<(R13*R14)/(R13-R14)<3.5$; where R13 represents a radius of curvature of an object-side surface of the seventh lens, and R14 represents a radius of curvature of the image-side surface of the seventh lens. The radius of curvature of the object-side surface and the radius of curvature of the image-side surface of the seventh lens are relatively proper, which can appropriately correct a spherical aberration of the optical system, reduce a distortion aberration and the astigmatism, reduce the system sensitivity, and improve the assembly stability.

In a possible implementation, the optical system satisfies the following expression: $0.5<\Sigma CT/f<0.7$; where $\Sigma CT$ represents a sum of a center thickness of each lens of the optical system on the optical axis, and f represents an effective focal length of the optical system. A compact structure combination of the lens group and corresponding effective focal lengths can be ensured to meet the miniaturization requirements.

In a possible implementation, the optical system satisfies the following expression: $0.4<\Sigma CT/TTL<0.6$; where $\Sigma CT$ represents a sum of a center thickness of each lens of the optical system on the optical axis. In this way, a good assembly stability of the lens group can be ensured, and the miniaturization design requirements of the optical system can be ensured.

In a possible implementation, the optical system satisfies the following expression: $0.25<ET1/CT1<0.55$; where ET1 represents an edge thickness of the first lens, and CT1 represents a center thickness of the first lens. In this way, a desired optical system can be obtained, and the requirements of high-quality image shooting can be satisfied.

In a possible implementation, the optical system satisfies the following expression: $1.0<ET5/CT5<1.6$; where ET5 represents an edge thickness of the fifth lens, and CT5 represents a center thickness of the fifth lens. The fifth lens is an aspherical lens and has a relatively high processing difficulty. A ratio of the edge thickness to the center thickness should not be too large. When $1.0<ET5/CT5<1.6$ is satisfied, good optical performance and molding yield can be ensured.

In a second aspect, a lens module is provided according to the present disclosure. The lens module includes a lens barrel, the optical system provided in any of the implementations in the first aspect. The first to seventh lenses of the optical system are received in the lens barrel.

With each lens installed in the optical system, the lens module has the characteristics of miniaturization, high image quality, high definition, and shooting in a low light environment.

In a third aspect, an electronic device is provided according to the present disclosure. The electronic device includes a housing, an electronic photosensitive element, the lens module provided in the second aspect. The lens module and the electronic photosensitive element are received in the housing. The electronic photosensitive element is disposed on an imaging plane of the optical system and configured to convert lights of an object passing through the first to seventh lenses and incidenting on the electronic photosensitive element into an electrical signal of an image. With the lens module arranged in the present disclosure, the electronic device can achieve thinness and miniaturization, high image quality, high definition, and shooting in a low light environment.

BRIEF DESCRIPTION OF THE DRAWINGS

To describe the technical solutions in the implementations of the present disclosure or the related art more clearly, the following briefly introduces the accompanying drawings required for describing the implementations or the related art. Apparently, the accompanying drawings in the following description illustrate some implementations of the present disclosure. Those of ordinary skill in the art may also obtain other drawings based on these accompanying drawings without creative efforts.

FIG. 1b illustrates a longitudinal spherical aberration curve, an astigmatic field curve, and a distortion curve of the optical system illustrated in FIG. 1a;

FIG. 2b illustrates a longitudinal spherical aberration curve, an astigmatic field curve, and a distortion curve of the optical system illustrated in FIG. 2a;

FIG. 3b illustrates a longitudinal spherical aberration curve, an astigmatic field curve, and a distortion curve of the optical system illustrated in FIG. 3a;

FIG. 4b illustrates a longitudinal spherical aberration curve, an astigmatic field curve, and a distortion curve of the optical system illustrated in FIG. 4a;

FIG. 5b illustrates a longitudinal spherical aberration curve, an astigmatic field curve, and a distortion curve of the optical system illustrated in FIG. 5a;

FIG. 6b illustrates a longitudinal spherical aberration curve, an astigmatic field curve, and a distortion curve of the optical system illustrated in FIG. 6a;

FIG. 7b illustrates a longitudinal spherical aberration curve, an astigmatic field curve, and a distortion curve of the optical system illustrated in FIG. 7a;

FIG. 8b illustrates a longitudinal spherical aberration curve, an astigmatic field curve, and a distortion curve of the optical system illustrated in FIG. 8a;

FIG. 9b illustrates a longitudinal spherical aberration curve, an astigmatic field curve, and a distortion curve of the optical system illustrated in FIG. 9a;

FIG. 10b illustrates a longitudinal spherical aberration curve, an astigmatic field curve, and a distortion curve of the optical system illustrated in FIG. 10a;

FIG. 11b illustrates a longitudinal spherical aberration curve, an astigmatic field curve, and a distortion curve of the optical system illustrated in FIG. 11a;

FIG. 12b illustrates a longitudinal spherical aberration curve, an astigmatic field curve, and a distortion curve of the optical system illustrated in FIG. 12a.

DETAILED DESCRIPTION OF ILLUSTRATED IMPLEMENTATIONS

Figure 1A:
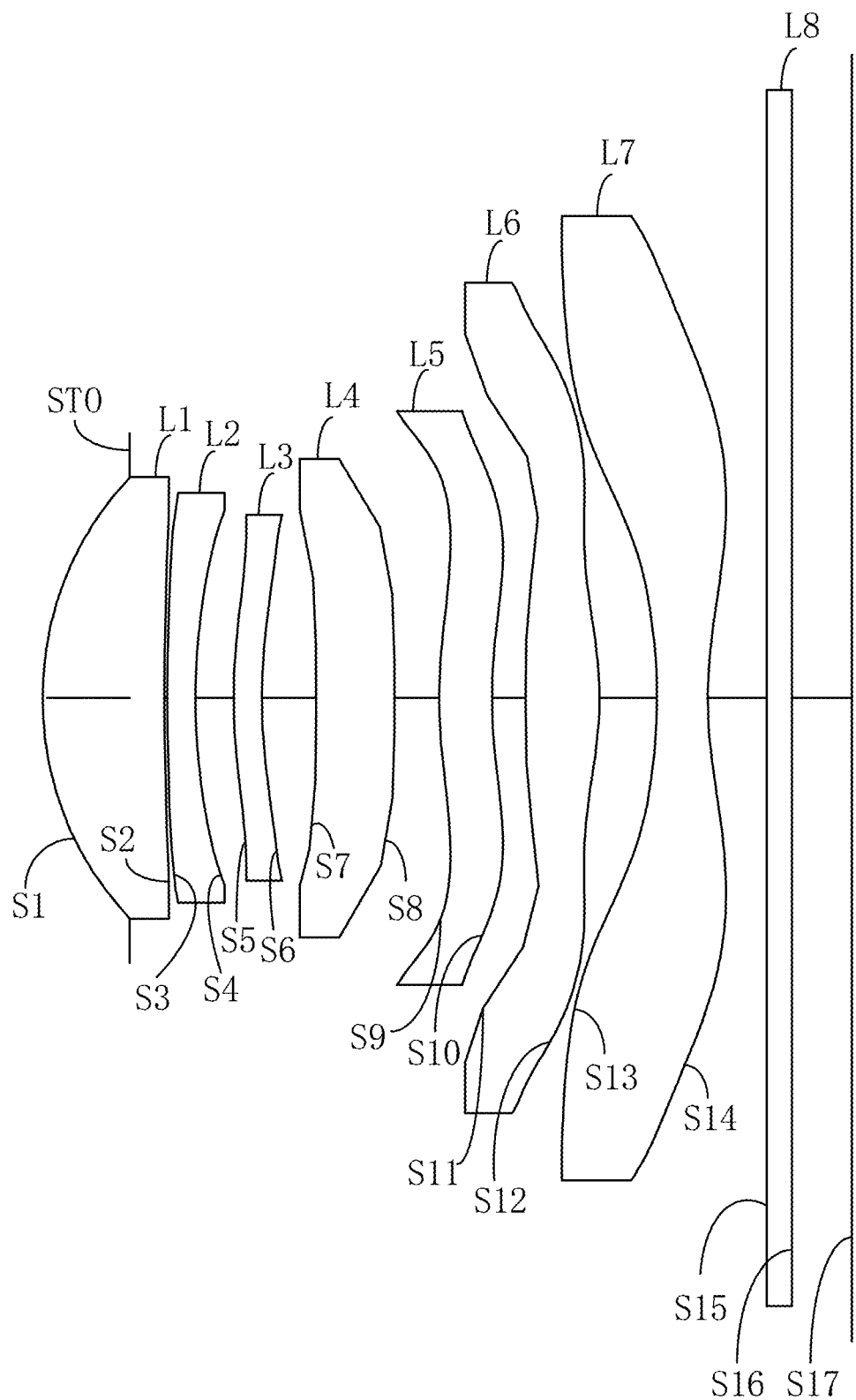
FIG. 1a is a schematic structural view of an optical system according to an implementation.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

A lens module is provided. The lens module includes a lens barrel and an optical system provided in implementations of the disclosure. The first to seventh lenses of the optical system are received in the lens barrel. The lens module can be an independent lens of a digital camera or an imaging module integrated on an electronic device such as a smart phone. With the first to seventh lenses installed in the optical system, the lens module can achieve miniaturization and high-definition large scene shooting.

An electronic device is further provided. The electronic device includes a housing, an electronic photosensitive element, and the lens module in the implementations of the present disclosure. The lens module and the electronic photosensitive element are received in the housing. The electronic photosensitive element is disposed on an imaging plane of the optical system and configured to convert light passing through the first to seventh lenses and incident on the electronic photosensitive element into an electrical signal of an image. The electronic photosensitive element may be a complementary metal oxide semiconductor (CMOS) or a charge-coupled device (CCD). The electronic device can be a smart phone, a personal digital assistant (PDA), a tablet computer, a smart watch, a drone, etc. With the lens module arranged in the present disclosure, the electronic device can achieve miniaturization, high image quality, high definition, and shooting in a low light environment.

The implementations of the present disclosure provide an optical system including, for example, seven lenses, namely, a first lens, a second lens, a third lens, a fourth lens, a fifth lens, a sixth lens, and a seventh lens. The first to seventh lenses are arranged in order from an object side to an image side along an optical axis of the optical system. In the first to seventh lenses, there is an air gap between any two adjacent lenses.

Specifically, specific shapes and structures of the seven lenses are described as follows.

The first lens is with a positive refractive power. The first lens has an object-side surface which is convex and an image-side surface which is concave at the optical axis. The second lens is with a negative refractive power. The second lens has an object-side surface which is convex and an image-side surface which is concave. The third lens is with a positive refractive power or a negative refractive power. The third lens has an object-side surface which is convex at the optical axis and an image-side surface which is concave at the optical axis. The fourth lens is with a positive refractive power or a negative refractive power. The fourth lens has an object-side surface which is concave at a periphery and an image-side surface which is convex at a periphery. The fifth lens is with a positive refractive power or a negative refractive power. The fifth lens has an object-side surface which is convex at the optical axis and an image-side surface which is concave at the optical axis. The sixth lens is with a positive refractive power or a negative refractive power. The sixth lens has an object-side surface which is concave at a periphery and an image-side surface which is convex at a periphery. The seventh lens is with a negative refractive power. The seventh len has an image-side surface which is concave at the optical axis and an image-side surface which is convex at a periphery.

The optical system further includes a stop. The stop can be arranged at any position between the first lens and the seventh lens, such as between the second lens and the third lens.

The optical system satisfies the following expression: $1.5<TTL/D<2.5$; where TTL represents a distance on the optical axis from the object-side surface of the first lens to an imaging plane of the optical system, and D represents an aperture of the stop.

An appropriate configuration in a surface profile and a refractive power of each lens of the first to seventh lenses ensures that the optical system satisfies the miniaturization requirements, high image quality, high definition, and low-light shooting capabilities. At the same time, an appropriate value of TTL/D can ensure a lens miniaturization design and an amount of light entering the optical system required for lens shooting, which can achieve high-quality and high-definition shooting effects, and ensure a sufficient amount of light entering the optical system for shooting object space scenes with low brightnesses such as night scenes, starry sky, and the like. If $TTL/D<1.5$, when the miniaturization design is satisfied, but a clear aperture will be too large, which will cause marginal rays to enter an imaging system and reduce an imaging quality. If $TTL/D>2.5$, when the miniaturization is satisfied, but a clear aperture of the stop will be too small to satisfy a sufficient amount of light entering the optical system and requirements of high-definition shooting in dark scenes. Therefore, only if $1.5<TTL/D<2.5$ can be satisfied, the optimization of optical performance and the miniaturization of structure can be taken into account at the same time.

In an implementation, the optical system satisfies the following expression: $0.6<L/Imgh<0.8$; where L represents a clear aperture diameter of the first lens, and Imgh represents half of a diagonal length of an effective pixel area of the imaging plane of the optical system. The aperture diameter of the first lens determines the amount of light entering the entire optical system, and a size of a photosensitive surface determines an image definition and a pixel size of the entire optical system. An appropriate ratio of the aperture diameter of the first lens to the size of the photosensitive surface can ensure a sufficient amount of light entering the entire optical system, which can ensure an image shooting definition and achieve a high-quality shooting for the object space scenes with low brightnesses such as night scenes, starry sky, and the like. If $L/Imgh>0.8$, an exposure will be too large, a brightness will be too high, and a picture quality will be adversely affected. If $L/Imgh<0.6$, it will cause an insufficient amount of light entering the optical system and cannot achieve dark scene shooting.

In an implementation, the optical system satisfies the following expression: $1<f14/f<1.5$; where f14 represents a combined focal length of the first lens, the second lens, the third lens, and the fourth lens, and f represents an effective focal length of the optical system. The first to fourth lenses are mainly used to correct distortion and rationally expand an incident angle of light to meet the image height requirements, and form an appropriate ratio with the optical effective focal length to meet the requirements of the optical system. If $f14/f<1$, the image height requirements of the optical system cannot be satisfied. If $f14/f>1.5$, distortion requirements of the optical system cannot be met.

In an implementation, the optical system satisfies the following expression: $Fno<2$; where Fno represents an F-number of the optical system. When $Fno<2$, it can satisfy the miniaturization requirements and ensure a large aperture under the condition of a certain focal length, so that there is a sufficient light entering the optical system, a captured image can have an improved definition, and a high-quality shooting for the object space scenes with low brightnesses such as night scenes, starry sky, and the like can be achieved.

In an implementation, the optical system satisfies the following expression: $Fno/TTL<0.29$; where Fno represents an F-number of the optical system. When this expression is satisfied, the large aperture and miniaturization design requirements of the lens system can be taken into account at the same time, a sufficient amount of light entering the optical system can be provided for photography and shooting, which satisfies the requirements of high-quality and high-definition shooting, and can provide high-quality shooting for the object space scenes with low brightnesses such as night scenes, starry sky, and the like. When $Fno/TTL>0.29$, a lens optical performance will decrease, and high-definition shooting cannot be achieved.

In an implementation, the optical system satisfies the following expression: $TTL/Imgh<1.5$; where Imgh represents half of a diagonal length of an effective pixel area of the imaging plane of the optical system. When the above expression is satisfied, the miniaturization requirements can be satisfied, and at the same time, the imaging plane has large image height information, which can satisfy requirements on shooting image quality and definition. If $TTL/Imgh>1.5$, the high-definition imaging effect cannot be guaranteed while achieving miniaturization.

In an implementation, the optical system satisfies the following expression: $1.0<TTL/f<1.3$; where f represents an effective focal length of the optical system. While satisfying high-definition optical performance, a focal length that matches a structure of the optical system is required to satisfy the miniaturization requirements. If $TTL/|f|\leq 1.0$, the optical length of the lens group is too short, which will increase the system sensitivity and make it difficult to correct aberrations. If $TTL/|f|\geq 1.3$, the optical length of the lens group is too long, which will cause lights entering the imaging plane to have a too large chief ray angle, and marginal rays of the imaging plane of the optical system cannot be imaged on the photosensitive surface, resulting in incomplete imaging information.

In an implementation, the optical system satisfies the following expression: $1.0<f/f1<1.3$; where f1 represents an effective focal length of the first lens, and f represents an effective focal length of the optical system. The first lens provides all optical information from an object space to an image space for the lens group, and the aperture size and the focal length of the first lens determine an acquisition of light information in the object space by the optical system. When the above expression is satisfied, a ratio of the focal length of the first lens to the focal length of the optical system is appropriate, such that an aberration generated by the first lens can be corrected, and the processing technology is simple. When f/f1≥1.3, the system sensitivity will increase, the processing technology will be difficult, and a difficulty in correcting the aberration generated by the first lens will increase, which is difficult to meet shooting requirements. When f/f1≤1.0, a ratio of the focal length of the first lens to the focal length of the optical system is not appropriate, and the aberration generated by the first lens cannot be corrected.

In an implementation, the optical system satisfies the following expression: 0.2<(R9+R10)/R9*R10<0.65; where R9 represents a radius of curvature of the object-side surface of the fifth lens, R10 represents a radius of curvature of the image-side surface of the fifth lens.

When the lens group satisfies the above expression, the radius of curvature of the object-side surface and the radius of curvature of the image-side surface of the fifth lens are proper, which can ensure the machinability of the fifth lens in shape, and can effectively reduce the astigmatism of the optical system.

In an implementation, the optical system satisfies the following expression: 2<(R1+R2)/f1<4.5; where R1 represents a radius of curvature of the object-side surface of the first lens, R2 represents a radius of curvature of the image-side surface of the first lens, and f1 represents an effective focal length of the first lens. The first lens provides all optical information from the object space to the image space for the lens group. When 2<(R1+R2)/f1<4.5, large-diameter requirements of the first lens can be satisfied, and it is convenient to correct the aberration. If (R1+R2)/f1≥4.5, it will increase a difficulty in correcting the aberration of the optical system. If (R1+R2)/f1≤2, it is not beneficial to the acquisition of light information in the object space by the optical system, and an imaging effect cannot satisfy design expectations.

In an implementation, the optical system satisfies the following expression: 1.5<R3/R4<3.5; where R3 represents a radius of curvature of the object-side surface of the second lens, and R4 represents a radius of curvature of the image-side surface of the second lens. The second lens provides a negative refractive power to balance a distortion generated by the first lens and correct the aberration generated by the first lens to a certain extent. If R3/R4≥3.5, a distortion correction will be too excessive. If R3/R4≤1.5, a purpose of the distortion correction cannot be achieved.

In an implementation, the optical system satisfies the following expression: −100<(R5+R6)/(R5−R6)<180; where R5 represents a radius of curvature of the object-side surface of the third lens, and R6 represents a radius of curvature of the image-side surface of the third lens. The radius of curvature of the object-side surface and the radius of curvature of the image-side surface of the third lens are relatively proper, and an incident angle can be rationally expanded to satisfy the high image requirements of the optical system, reduce the sensitivity of the optical system, and improve the assembly stability.

In an implementation, the optical system satisfies the following expression: −0.6<f1/f2<−0.3; where f1 represents an effective focal length of the first lens, and f2 represents an effective focal length of the second lens. The first lens provides a positive refractive power, the second lens provides a negative refractive power, and the two lenses are properly configured to correct a positional chromatic aberration of the optical system.

In an implementation, the optical system satisfies the following expression: 1.5<(R13*R14)/(R13−R14)<3.5; where R13 represents a radius of curvature of an object-side surface of the seventh lens, and R14 represents a radius of curvature of the image-side surface of the seventh lens. When the optical system satisfies the above expression, the radius of curvature of the object-side surface and the radius of curvature of the image-side surface of the seventh lens are relatively proper, which can appropriately correct a spherical aberration of the optical system, reduce a distortion aberration and the astigmatism, reduce the sensitivity of the system, and improve the assembly stability.

In an implementation, the optical system satisfies the following expression: 0.5<ΣCT/f<0.7; where ΣCT represents a sum of a center thickness of each lens of the optical system on the optical axis, and f represents an effective focal length of the optical system. When the optical system satisfies the above expression, a compact structure combination of the lens group and corresponding effective focal lengths can be ensured to meet the miniaturization requirements.

In an implementation, the optical system satisfies the following expression: 0.4<ΣCT/TTL<0.6; where ΣCT represents a sum of a center thickness of each lens of the optical system on the optical axis. When the optical system satisfies the above expression, a good assembly stability of the lens group can be ensured, and the miniaturization design requirements of the optical system can be ensured.

In an implementation, the optical system satisfies the following expression: 0.25<ET1/CT1<0.55; where ET1 represents an edge thickness of the first lens, and CT1 represents a center thickness of the first lens. The first lens provides all optical information of the object space for the optical system, and a corresponding aberration, distortion, and field curvature are also generated. Therefore, a ratio of the edge thickness to the center thickness should not be too large. If the ratio is too large, it will cause a difficulty in correcting an aberration of a subsequent lens combination, and at the same time, it will produce large distortion and field curvature, which cannot satisfy optical performance requirements. When 0.25<ET1/CT1<0.55 is satisfied, a desired optical system can be obtained to meet the requirements of high-quality image shooting.

In an implementation, the optical system satisfies the following expression: 1.0<ET5/CT5<1.6; where ET5 represents an edge thickness of the fifth lens, and CT5 represents a center thickness of the fifth lens. The fifth lens is an aspherical lens and has a relatively high processing difficulty. A ratio of the edge thickness to the center thickness should not be too large. When 1.0<ET5/CT5<1.6 is satisfied, good optical performance and molding yield can be ensured.

Figure 1B:
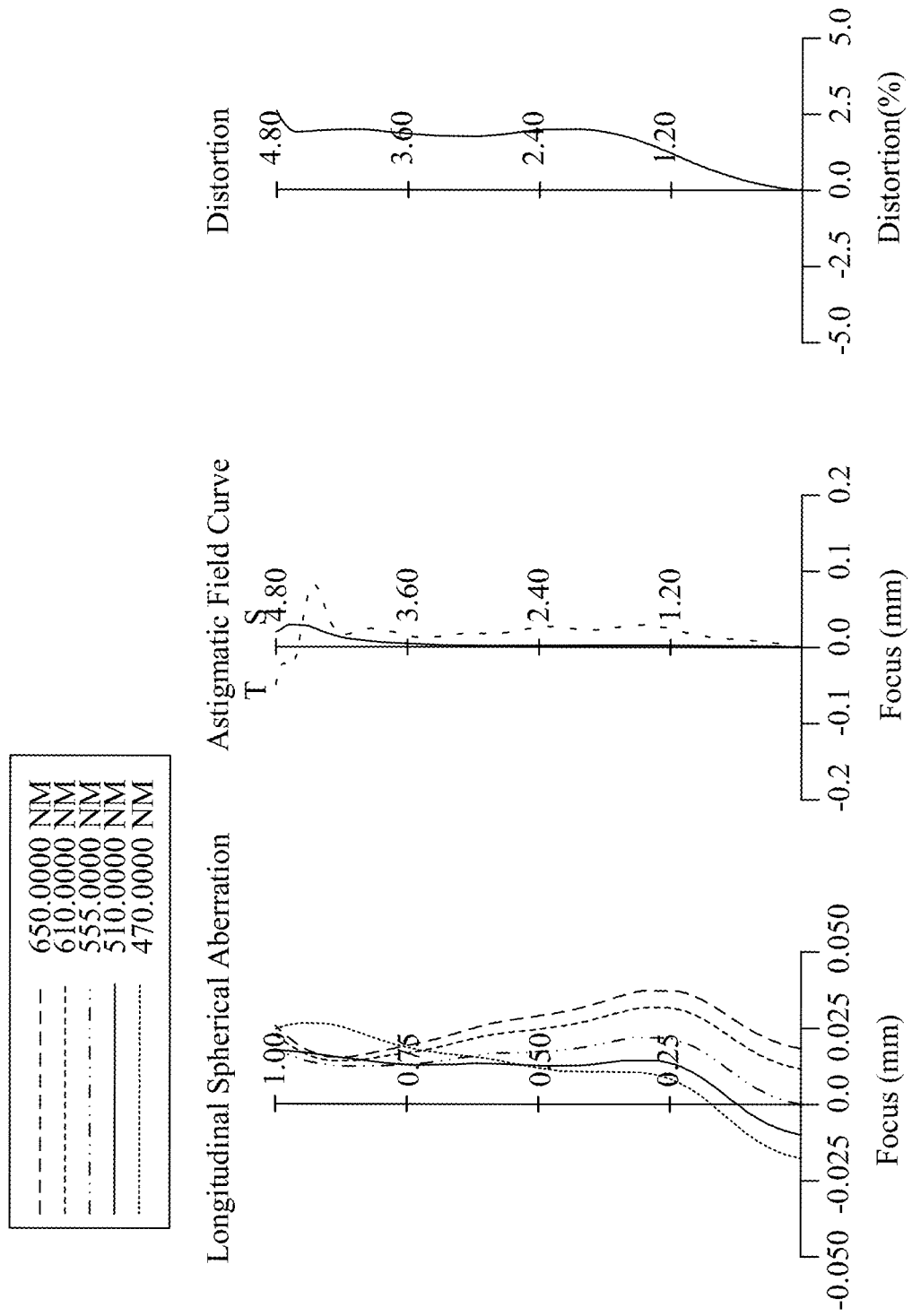

Referring to FIG. 1a and FIG. 1b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave at the optical axis and is convex at a periphery of the image-side surface S2 of the first lens L1.

The second lens L2 has a negative refractive power. An object-side surface S3 of the second lens L2 is convex. An image-side surface S4 of the second lens L2 is concave.

The third lens L3 has a positive refractive power. An object-side surface S5 of the third lens L3 is convex. An image-side surface S6 of the third lens L3 is concave.

The fourth lens L4 has a negative refractive power. An object-side surface S7 of the fourth lens L4 is concave. An image-side surface S8 of the fourth lens L4 is convex.

The fifth lens L5 has a positive refractive power. An object-side surface S9 of the fifth lens L5 is convex at the optical axis and is concave at a periphery of the object-side surface S9 of the fifth lens L5. An image-side surface S10 of the fifth lens L5 is concave at the optical axis and is convex at a periphery of the image-side surface S10 of the fifth lens L5.

The sixth lens L6 has a positive refractive power. An object-side surface S11 of the sixth lens L6 is convex at the optical axis and is concave at a periphery of the object-side surface S11 of the sixth lens L6. An image-side surface S12 of the sixth lens L6 is convex.

The seventh lens L7 has a negative refractive power. An object-side surface S13 of the seventh lens L7 is concave at the optical axis and is convex at a periphery of the object-side surface S13 of the seventh lens L7. An image-side surface S14 of the seventh lens L7 is concave at the optical axis and is convex at a periphery of the image-side surface S14 of the seventh lens L7.

In an implementation, each lens of the first to seventh lenses (L1 to L7) is made of plastic.

In addition, the optical system further includes a stop (STO), an infrared cut-off filter L8, and an imaging plane S17. The STO is arranged at an edge of the first lens L1 to control the amount of light entering the optical system and improve the performance of the optical system.

In other implementations, the STO can also be disposed between two other adjacent lenses. The infrared cut-off filter L8 is disposed at an image side of the seventh lens L7 and has an object-side surface S15 and an image-side surface S16. The infrared cut-off filter L8 is used to filter out infrared light so that the light entering the imaging plane S17 is visible light, and the wavelength of visible light is 380 nm-780 nm. The infrared cut-off filter L8 is made of glass and can be coated thereon. The imaging plane S17 is an effective pixel area of the electronic photosensitive element.

Table 1a illustrates characteristics of the optical system in this implementation. Data in Table 1a is obtained based on light with a wavelength of 555 nm. Each of Y radius, thickness, and focal length is in units of millimeter (mm).

TABLE 1a

Optical System Illustrated in FIG. 1a
EFL= 5.56, FNO = 1.68, FOV = 80.08, TTL = 6.69

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.7187 | | | | |
| S1 | First | Aspherical | 2.2547 | 1.0051 | Plastic | 1.55 | 56.11 | 4.74 |
| S2 | lens | Aspherical | 14.7428 | 0.0240 | | | | |
| S3 | Second | Aspherical | 13.3450 | 0.2350 | Plastic | 1.67 | 20.38 | −9.91 |
| S4 | lens | Aspherical | 4.3859 | 0.3140 | | | | |
| S5 | Third | Aspherical | 3.6661 | 0.2350 | Plastic | 1.67 | 20.38 | 99.18 |
| S6 | lens | Aspherical | 3.7818 | 0.4484 | | | | |
| S7 | Fourth | Aspherical | −42.5642 | 0.6485 | Plastic | 1.55 | 56.11 | −244.43 |
| S8 | lens | Aspherical | −62.8357 | 0.3689 | | | | |
| S9 | Fifth | Aspherical | 3.2893 | 0.4365 | Plastic | 1.55 | 56.11 | 62.75 |
| S10 | lens | Aspherical | 3.4682 | 0.2774 | | | | |
| S11 | Sixth | Aspherical | 20.6735 | 0.6112 | Plastic | 1.55 | 56.11 | 3.84 |
| S12 | lens | Aspherical | −2.3082 | 0.4748 | | | | |
| S13 | Seventh | Aspherical | −3.6637 | 0.4200 | Plastic | 1.54 | 55.75 | −2.93 |
| S14 | lens | Aspherical | 2.8635 | 0.4884 | | | | |
| S15 | Infrared | Spherical | Infinity | 0.2100 | Class | | | |
| S16 | cut-off filter | Spherical | Infinity | 0.4929 | | | | |
| S17 | Imaging plane | Spherical | Infinity | 0.0000 | | | | |

Note:
The reference wavelength is 555 nm

In Table 1a, EFL represents an effective focal length of the optical system. FNO represents an F-number of the optical system. FOV represents an angle of view of the optical system.

In this implementation, the object-side surface and the image-side surface of each of the first to seventh lenses (L1, L2, L3, L4, L5, L6, L7) are aspherical. A surface shape of each aspherical lens can be defined by but not limited to the following aspherical formula:

$$x = \frac{ch^2}{1 + \sqrt{1 - (k+1)c^2h^2}} + \sum A_i h^i$$

x represents a distance (sag) along the optical axis from a vertex of the aspherical surface to a position on the aspherical surface at a height h. c represents the paraxial curvature of the aspherical surface, and is the inverse of the Y radius (that is, c=1/R, where R represents the Y radius in the Table 1a). k represents the conic coefficient. $A_i$ represents the i-th order correction coefficient of the aspherical surface. Table 1b shows higher-order coefficients A4, A6, A8, A10, A12, A14, A15, A17, and A18 of each of aspherical lens surfaces S1 to S14 of the optical system illustrated in FIG. 1a.

TABLE 1b

| Surface Number | K | A4 | A6 | A8 | A10 | A12 | A14 | A16 | A18 | A20 |
|---|---|---|---|---|---|---|---|---|---|---|
| S1 | −0.4808 | 0.0035 | 0.0102 | −0.0190 | 0.0240 | −0.0189 | 0.0094 | −0.0029 | 0.0005 | 0.0000 |
| S2 | 4.4943 | −0.0303 | 0.0434 | −0.0350 | −0.0018 | 0.0299 | −0.0267 | 0.0112 | −0.0023 | 0.0002 |
| S3 | −0.0448 | −0.0344 | 0.0602 | −0.0598 | 0.0247 | 0.0108 | −0.0175 | 0.0082 | −0.0017 | 0.0001 |
| S4 | −0.0014 | −0.0171 | 0.0365 | −0.0589 | 0.0821 | −0.0886 | 0.0676 | −0.0331 | 0.0092 | −0.0011 |
| S5 | 0.0000 | −0.0499 | 0.0217 | −0.0545 | 0.0848 | −0.0931 | 0.0690 | −0.0324 | 0.0088 | −0.0010 |
| S6 | −4.2596 | −0.0263 | 0.0071 | −0.0082 | −0.0018 | 0.0118 | −0.0104 | 0.0042 | −0.0007 | 0.0000 |
| S7 | 2.0000 | −0.0295 | 0.0294 | −0.0723 | 0.1106 | −0.1125 | 0.0728 | −0.0288 | 0.0063 | −0.0006 |
| S8 | −8.0000 | −0.0558 | 0.0279 | −0.0236 | 0.0136 | −0.0052 | 0.0007 | 0.0002 | −0.0001 | 0.0000 |
| S9 | −9.3403 | −0.0471 | 0.0009 | 0.0018 | 0.0043 | −0.0055 | 0.0026 | −0.0007 | 0.0001 | 0.0000 |
| S10 | −2.5679 | −0.0391 | −0.0098 | −0.0129 | 0.0170 | −0.0083 | 0.0022 | −0.0003 | 0.0000 | 0.0000 |
| S11 | −14.3812 | 0.0526 | −0.0011 | −0.0277 | 0.0175 | −0.0061 | 0.0013 | −0.0002 | 0.0000 | 0.0000 |
| S12 | −10.0207 | 0.0358 | 0.0299 | −0.0258 | 0.0080 | −0.0013 | 0.0001 | 0.0000 | 0.0000 | 0.0000 |
| S13 | −11.4058 | 0.0125 | −0.0524 | 0.0278 | −0.0070 | 0.0010 | −0.0001 | 0.0000 | 0.0000 | 0.0000 |
| S14 | −0.9239 | −0.0669 | 0.0081 | 0.0013 | −0.0009 | 0.0002 | 0.0000 | 0.0000 | 0.0000 | 0.0000 |

FIG. 1b illustrates a longitudinal spherical aberration curve, an astigmatic field curve, and a distortion curve of the optical system of the optical system illustrated in FIG. 1a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 1b, the optical system illustrated in FIG. 1a can achieve good imaging quality.

Figure 2A:
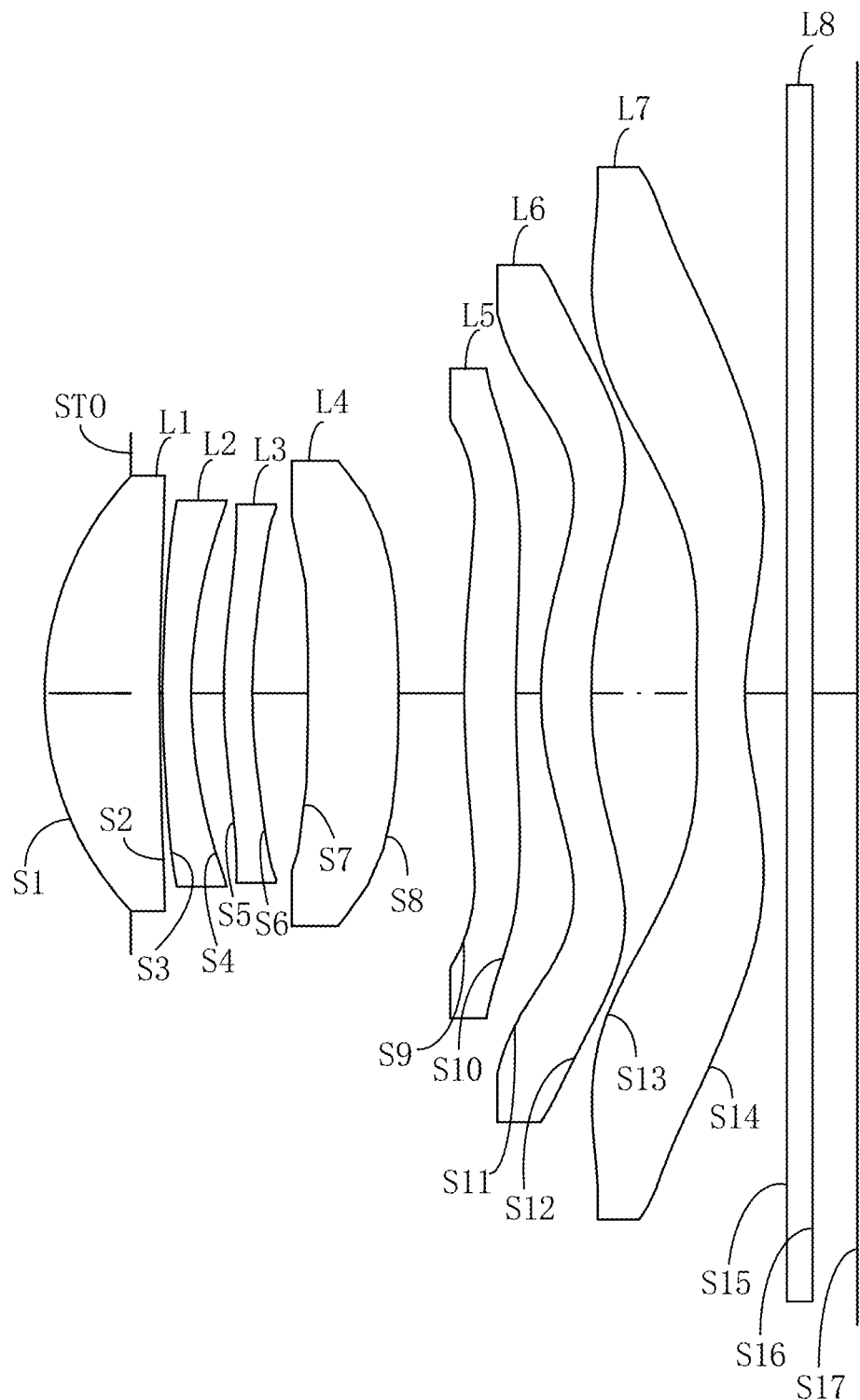
FIG. 2a is a schematic structural view of an optical system according to an implementation.
Figure 2B:
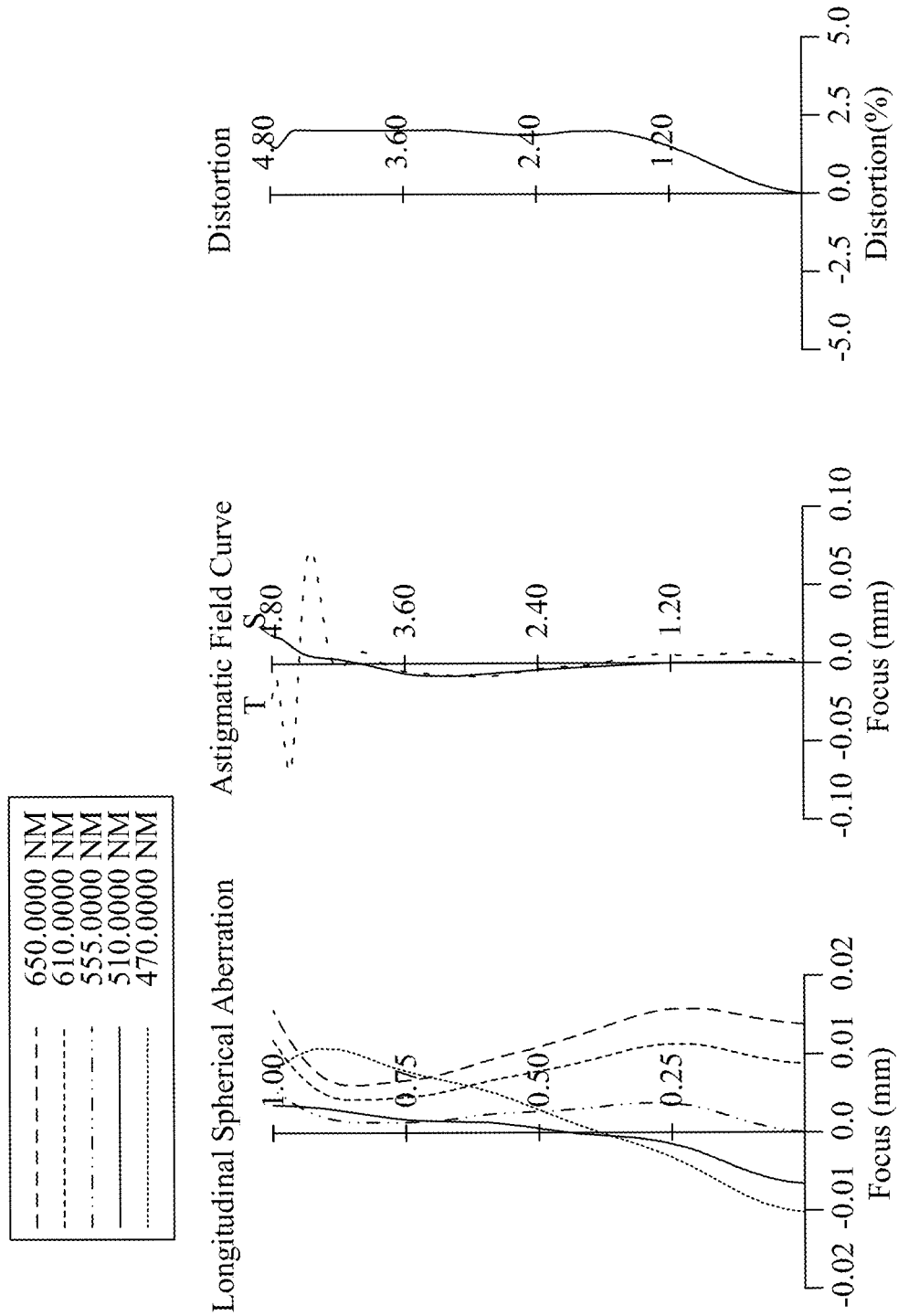

Referring to FIG. 2a and FIG. 2b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave.

The second lens L2 has a negative refractive power. An object-side surface S3 of the second lens L2 is convex. An image-side surface S4 of the second lens L2 is concave.

The third lens L3 has a positive refractive power. An object-side surface S5 of the third lens L3 is convex at the optical axis and is concave at a periphery of the object-side surface S5 of the third lens L3. An image-side surface S6 of the third lens L3 is concave.

The fourth lens L4 has a positive refractive power. An object-side surface S7 of the fourth lens L4 is convex at the optical axis and is concave at a periphery of the object-side surface S7 of the fourth lens L4. An image-side surface S8 of the fourth lens L4 is concave at the optical axis and is convex at a periphery of the image-side surface S8 of the fourth lens L4.

The fifth lens L5 has a positive refractive power. An object-side surface S9 of the fifth lens L5 is convex at the optical axis and is concave at a periphery of the object-side surface S9 of the fifth lens L5. An image-side surface S10 of the fifth lens L5 is concave.

The sixth lens L6 has a positive refractive power. An object-side surface S11 of the sixth lens L6 is convex at the optical axis and is concave at a periphery of the object-side surface S11 of the sixth lens L6. An image-side surface S12 of the sixth lens L6 is concave at the optical axis and is convex at a periphery of the image-side surface S12 of the sixth lens L6.

The seventh lens L7 has a negative refractive power. An object-side surface S13 of the seventh lens L7 is convex at the optical axis and is concave at a periphery of the object-side surface S13 of the seventh lens L7. An image-side surface S14 of the seventh lens L7 is concave at the optical axis and is convex at a periphery of the image-side surface S14 of the seventh lens L7.

The other structures of the optical system illustrated in FIG. 2a are identical with the optical system illustrated in FIG. 1a, reference can be made to the optical system illustrated in FIG. 1a.

Table 2a illustrates characteristics of the optical system in this implementation. Data in Table 2a is obtained based on light with a wavelength of 555 nm. Each of Y radius, thickness, and focal length is in units of millimeter (mm).

TABLE 2a

Optical System Illustrated in FIG. 2a
EFL = 5.56, FNO =1.68, FOV = 80.70, TTL = 6.68

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.7054 | | | | |
| S1 | First | Aspherical | 2.2842 | 0.9440 | Plastic | 1.55 | 56.11 | 4.72 |
| S2 | lens | Aspherical | 17.2700 | 0.0240 | | | | |
| S3 | Second | Aspherical | 7.9335 | 0.2350 | Plastic | 1.67 | 20.38 | −9.25 |
| S4 | lens | Aspherical | 3.4278 | 0.2668 | | | | |
| S5 | Third | Aspherical | 3.9805 | 0.2350 | Plastic | 1.67 | 20.38 | 487.88 |
| S6 | lens | Aspherical | 3.9347 | 0.4591 | | | | |
| S7 | Fourth | Aspherical | −38.5164 | 0.7424 | Plastic | 1.55 | 56.11 | 32.03 |

TABLE 2a-continued

Optical System Illustrated in FIG. 2a
EFL = 5.56, FNO =1.68, FOV = 80.70, TTL = 6.68

| Surface Number | Surface Name | Surface Type | Y Radius | Thickness | Material | Refractive Index | Abbe Number | Focal length |
|---|---|---|---|---|---|---|---|---|
| S8  | lens | Aspherical | −12.1078 | 0.5395 |  |  |  |  |
| S9  | Fifth | Aspherical | 6.9733 | 0.4229 | Plastic | 1.55 | 56.11 | 20140.07 |
| S10 | lens | Aspherical | 6.8283 | 0.2069 |  |  |  |  |
| S11 | Sixth | Aspherical | 2.2354 | 0.4156 | Plastic | 1.55 | 56.11 | 9.93 |
| S12 | lens | Aspherical | 3.5545 | 0.8622 |  |  |  |  |
| S13 | Seventh | Aspherical | 8.2856 | 0.4000 | Plastic | 1.54 | 55.75 | −5.52 |
| S14 | lens | Aspherical | 2.1461 | 0.3428 |  |  |  |  |
| S15 | Infrared | Spherical | Infinity | 0.2100 | Glass |  |  |  |
| S16 | cut-off filter | Spherical | Infinity | 0.3703 |  |  |  |  |
| S17 | Imaging plane | Spherical | Infinity | 0.0000 |  |  |  |  |

Note:
The reference wavelength is 555 nm

In Table 2a, EFL represents an effective focal length of the optical system. FNO represents an F-number of the optical system. FOV represents an angle of view of the optical system.

Table 2b shows higher-order coefficients that can be used for each aspherical lens of the optical system illustrated in FIG. 2a, where a shape of each aspherical lens surface can be defined by the formula given for the optical system illustrated in FIG. 1a.

TABLE 2b

| Surface Number | K | A4 | A6 | A8 | A10 | A12 | A14 | A16 | A18 | A20 |
|---|---|---|---|---|---|---|---|---|---|---|
| S1  | −0.4881 | 0.0054 | 0.0029 | −0.0038 | 0.0046 | −0.0035 | 0.0017 | −0.0005 | 0.0001 | 0.0000 |
| S2  | 4.9740 | −0.0180 | 0.0132 | −0.0076 | 0.0053 | −0.0028 | 0.0005 | 0.0002 | −0.0001 | 0.0000 |
| S3  | 2.6114 | −0.0270 | 0.0216 | −0.0170 | 0.0161 | −0.0104 | 0.0035 | −0.0004 | −0.0001 | 0.0000 |
| S4  | −1.9714 | −0.0115 | 0.0159 | −0.0165 | 0.0159 | −0.0112 | 0.0056 | −0.0024 | 0.0009 | −0.0002 |
| S5  | 0.0000 | −0.0441 | 0.0022 | 0.0116 | −0.0350 | 0.0472 | −0.0356 | 0.0154 | −0.0034 | 0.0003 |
| S6  | −2.6780 | −0.0306 | 0.0005 | 0.0191 | −0.0437 | 0.0563 | −0.0422 | 0.0188 | −0.0045 | 0.0004 |
| S7  | −13.7868 | −0.0263 | −0.0039 | 0.0034 | −0.0102 | 0.0144 | −0.0127 | 0.0067 | −0.0020 | 0.0003 |
| S8  | 9.7822 | −0.0306 | −0.0018 | 0.0020 | −0.0060 | 0.0067 | −0.0041 | 0.0014 | −0.0003 | 0.0000 |
| S9  | −18.0000 | −0.0132 | 0.0153 | −0.0144 | 0.0070 | −0.0025 | 0.0006 | −0.0001 | 0.0000 | 0.0000 |
| S10 | −8.0000 | −0.0705 | 0.0517 | −0.0286 | 0.0110 | −0.0031 | 0.0006 | −0.0001 | 0.0000 | 0.0000 |
| S11 | −4.1192 | −0.0123 | 0.0017 | −0.0090 | 0.0047 | −0.0014 | 0.0003 | 0.0000 | 0.0000 | 0.0000 |
| S12 | −6.2914 | 0.0409 | −0.0297 | 0.0058 | 0.0000 | −0.0003 | 0.0001 | 0.0000 | 0.0000 | 0.0000 |
| S13 | 1.4115 | −0.1419 | 0.0529 | −0.0140 | 0.0027 | −0.0003 | 0.0000 | 0.0000 | 0.0000 | 0.0000 |
| S14 | −1.1243 | −0.1438 | 0.0569 | −0.0173 | 0.0035 | −0.0005 | 0.0000 | 0.0000 | 0.0000 | 0.0000 |

FIG. 2b illustrates a longitudinal spherical aberration curve, an astigmatic field curve, and a distortion curve of the optical system illustrated in FIG. 2a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 2b, the optical system illustrated in FIG. 2a can achieve good imaging quality.

Figure 3A:
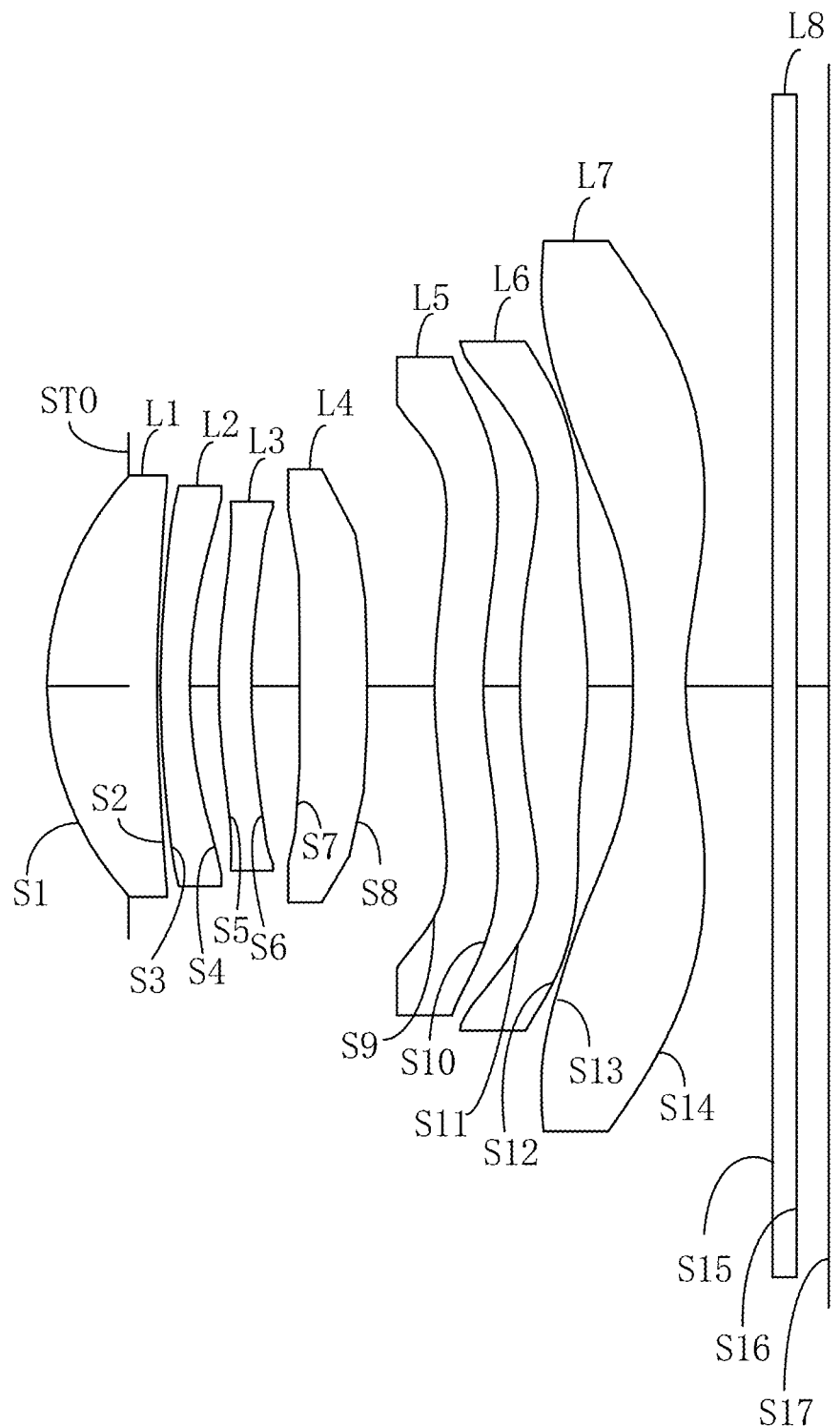
FIG. 3a is a schematic structural view of an optical system according to an implementation.
Figure 3B:
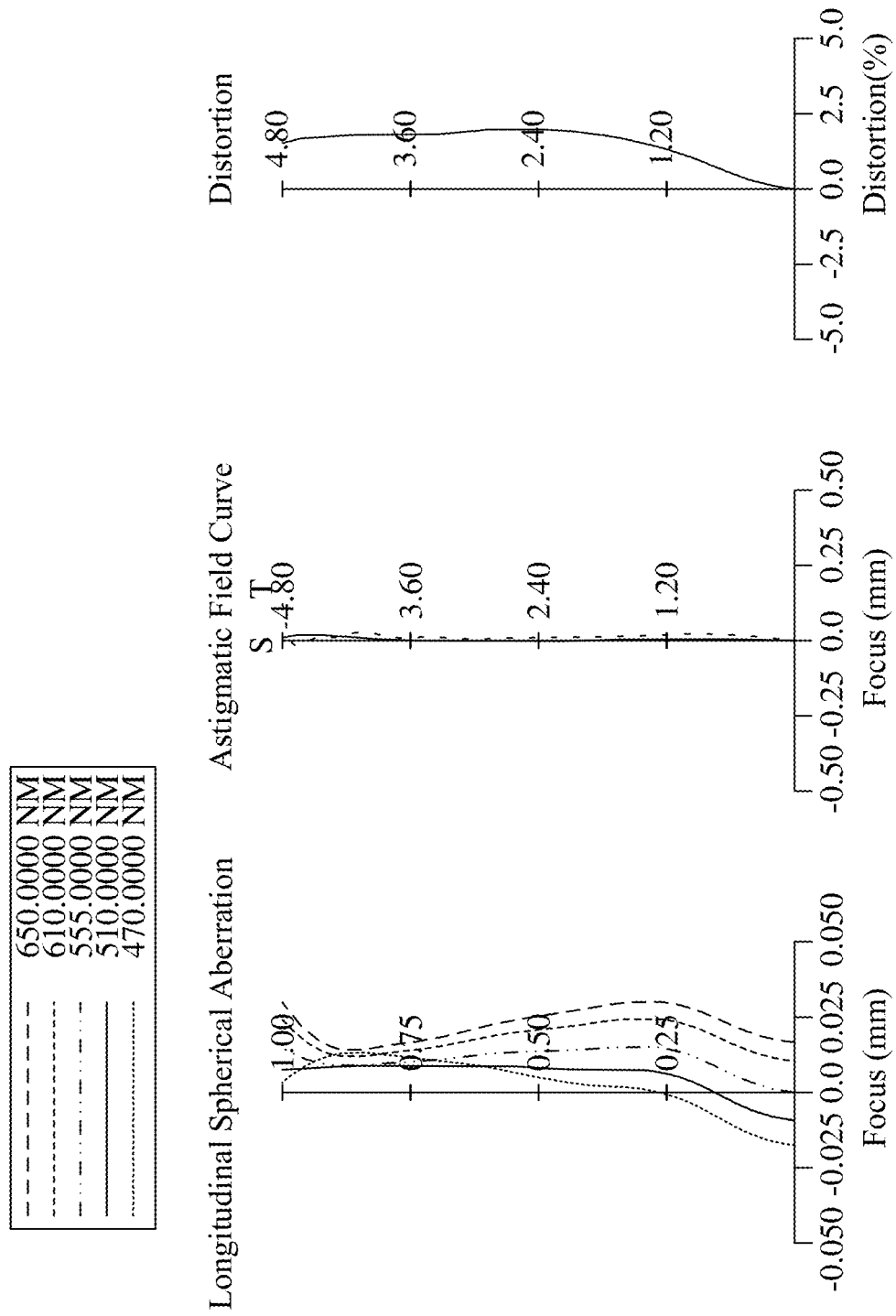

Referring to FIG. 3a and FIG. 3b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave.

The second lens L2 has a negative refractive power. An object-side surface S3 of the second lens L2 is convex. An image-side surface S4 of the second lens L2 is concave.

The third lens L3 has a positive refractive power. An object-side surface S5 of the third lens L3 is convex. An image-side surface S6 of the third lens L3 is concave.

The fourth lens L4 has a positive refractive power. An object-side surface S7 of the fourth lens L4 is convex at the optical axis and is concave at a periphery of the object-side surface S7 of the fourth lens L4. An image-side surface S8 of the fourth lens L4 is convex.

The fifth lens L5 has a negative refractive power. An object-side surface S9 of the fifth lens L5 is convex at the optical axis and is concave at a periphery of the object-side surface S9 of the fifth lens L5. An image-side surface S10 of the fifth lens L5 is concave at the optical axis and is convex at a periphery of the image-side surface S10 of the fifth lens L5.

The sixth lens L6 has a positive refractive power. An object-side surface S11 of the sixth lens L6 is convex at the optical axis and is concave at a periphery of the object-side surface S11 of the sixth lens L6. An image-side surface S12 of the sixth lens L6 is convex.

The seventh lens L7 has a negative refractive power. An object-side surface S13 of the seventh lens L7 is concave at the optical axis and is convex at a periphery of the object-side surface S13 of the seventh lens L7. An image-side surface S14 of the seventh lens L7 is concave at the optical axis and is convex at a periphery of the image-side surface S14 of the seventh lens L7.

The other structures of the optical system illustrated in FIG. 3a are identical with the optical system illustrated in FIG. 1a, reference can be made to the optical system illustrated in FIG. 1a.

Table 3a illustrates characteristics of the optical system in this implementation. Data in Table 3a is obtained based on light with a wavelength of 555 nm. Each of Y radius, thickness, and focal length is in units of millimeter (mm).

FIG. 3b illustrates a longitudinal spherical aberration curve, an astigmatic field curve, and a distortion curve of the optical system illustrated in FIG. 3a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 3b, the optical system illustrated in FIG. 3a can achieve good imaging quality.

TABLE 3a

Optical System Illustrated in FIG. 3a
EFL = 5.58, FNO = 1.68, FOV+3279.84, TTL+326.69

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.6937 | | | | |
| S1 | First | Aspherical | 2.2848 | 0.9400 | Plastic | 1.55 | 56.14 | 5.13 |
| S2 | lens | Aspherical | 10.6446 | 0.0300 | | | | |
| S3 | Second | Aspherical | 7.1122 | 0.2500 | Plastic | 1.67 | 20.35 | −9.92 |
| S4 | lens | Aspherical | 3.3794 | 0.2481 | | | | |
| S5 | Third | Aspherical | 4.0792 | 0.2800 | Plastic | 1.67 | 20.35 | 65.65 |
| S6 | lens | Aspherical | 4.3747 | 0.4107 | | | | |
| S7 | Fourth | Aspherical | 31.2135 | 0.5801 | Plastic | 1.55 | 56.14 | 27.98 |
| S8 | lens | Aspherical | −29.7038 | 0.5762 | | | | |
| S9 | Fifth | Aspherical | 3.8586 | 0.4200 | Plastic | 1.64 | 23.80 | −28.74 |
| S10 | lens | Aspherical | 3.0542 | 0.3117 | | | | |
| S11 | Sixth | Aspherical | 5.6229 | 0.5805 | Plastic | 1.55 | 56.14 | 3.86 |
| S12 | lens | Aspherical | −3.2489 | 0.3881 | | | | |
| S13 | Seventh | Aspherical | −7.3393 | 0.4500 | Plastic | 1.55 | 56.14 | −3.20 |
| S14 | lens | Aspherical | 2.3445 | 0.7415 | | | | |
| S15 | Infrared | Spherical | Infinity | 0.2100 | Class | | | |
| S16 | cut-off filter | Spherical | Infinity | 0.2729 | | | | |
| S17 | Imaging plane | Spherical | Infinity | 0.0000 | | | | |

Note:
The reference wavelength is 555 nm

In Table 3a, EFL represents an effective focal length of the optical system. FNO represents an F-number of the optical system. FOV represents an angle of view of the optical system.

Table 3b shows higher-order coefficients that can be used for each aspherical lens of the optical system illustrated in FIG. 3a, where a shape of each aspherical lens surface can be defined by the formula given for the optical system illustrated in FIG. 1a.

Figure 4A:
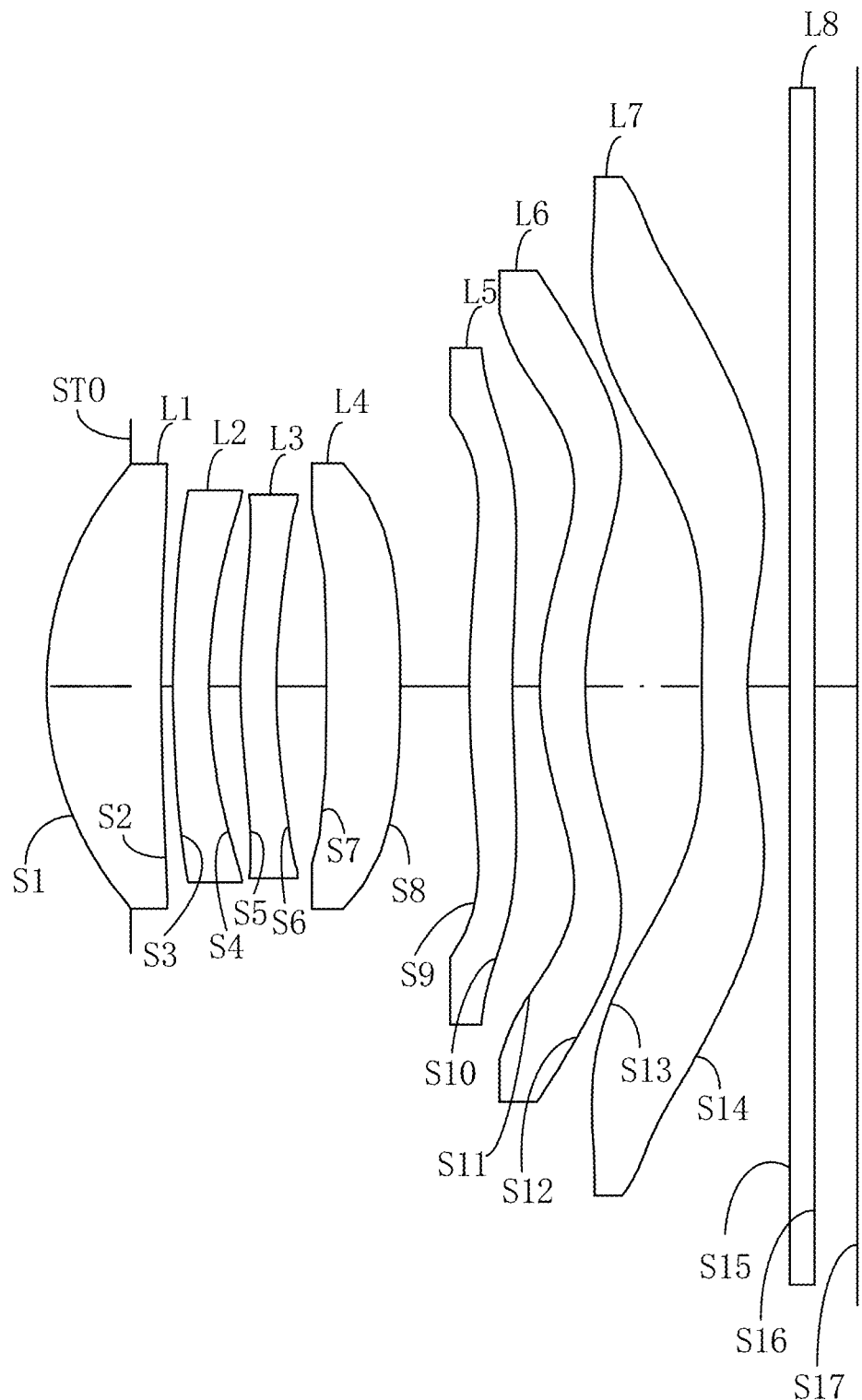
FIG. 4a is a schematic structural view of an optical system according to an implementation.
Figure 4B:
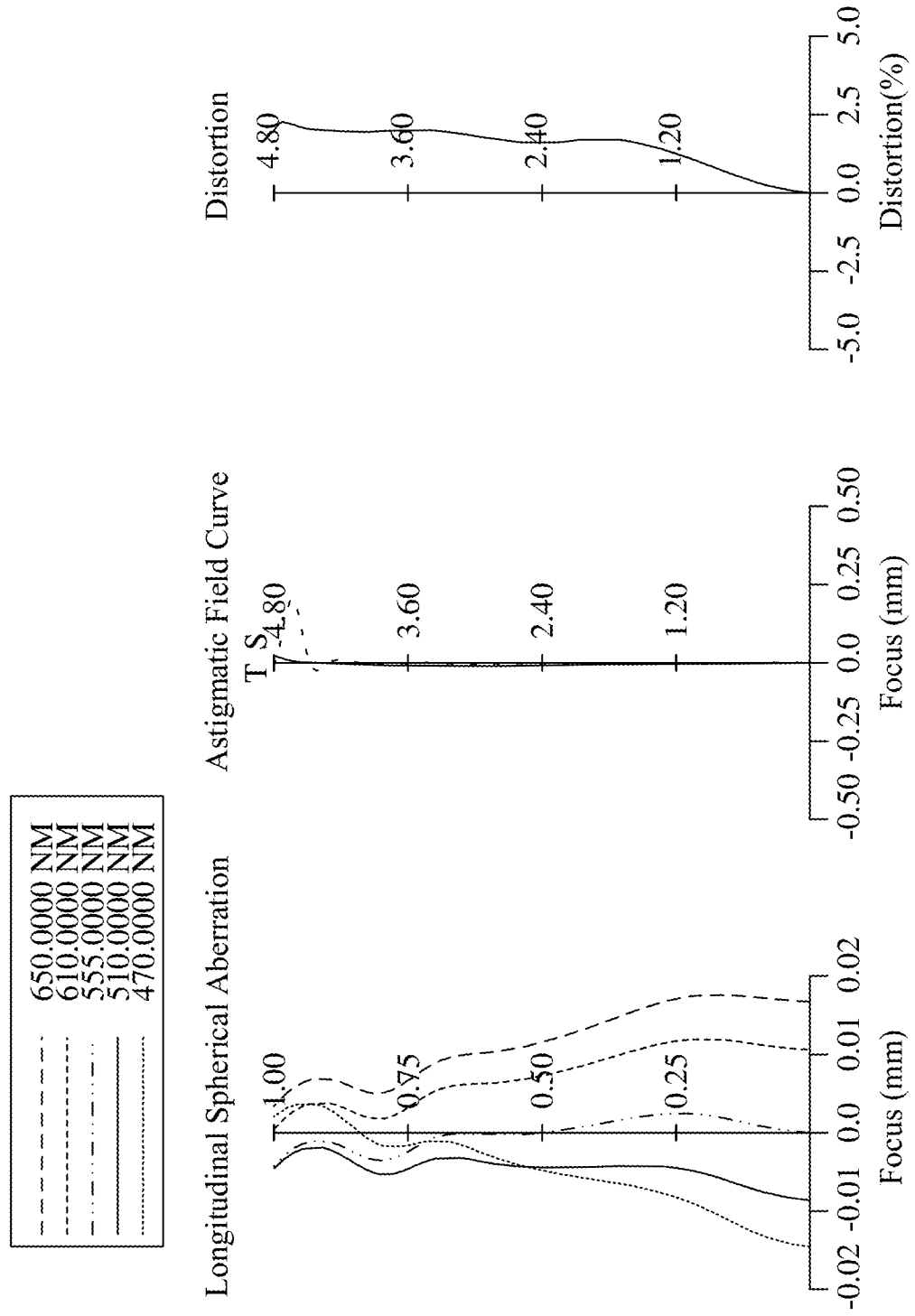

Referring to FIG. 4a and FIG. 4b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave at the TABLE 3b

| Surface Number | K | A4 | A6 | A8 | A10 | A12 | A14 | A16 | A18 | A20 |
|---|---|---|---|---|---|---|---|---|---|---|
| S1 | −1.2516 | 0.0126 | 0.0020 | −0.0010 | 0.0000 | 0.0009 | −0.0008 | 0.0004 | −0.0001 | 0.0000 |
| S2 | 2.0556 | −0.0142 | 0.0374 | −0.0958 | 0.1266 | −0.0976 | 0.0465 | −0.0135 | 0.0022 | −0.0002 |
| S3 | −7.9157 | −0.0181 | 0.0513 | −0.1200 | 0.1554 | −0.1191 | 0.0564 | −0.0162 | 0.0026 | −0.0002 |
| S4 | −1.6796 | −0.0108 | 0.0211 | −0.0223 | −0.0065 | 0.0424 | −0.0482 | 0.0267 | −0.0076 | 0.0009 |
| S5 | 0.0000 | −0.0392 | 0.0101 | −0.0004 | −0.0282 | 0.0485 | −0.0425 | 0.0211 | −0.0056 | 0.0006 |
| S6 | 3.8042 | −0.0365 | 0.0037 | 0.0119 | −0.0340 | 0.0429 | −0.0299 | 0.0120 | −0.0024 | 0.0002 |
| S7 | 2.0000 | −0.0318 | 0.0212 | −0.0608 | 0.0947 | −0.0964 | 0.0621 | −0.0243 | 0.0053 | −0.0005 |
| S8 | −14.4936 | −0.0383 | 0.0103 | −0.0084 | −0.0029 | 0.0087 | −0.0069 | 0.0029 | −0.0006 | 0.0001 |
| S9 | −4.1439 | −0.0670 | 0.0457 | −0.0331 | 0.0201 | −0.0094 | 0.0029 | −0.0006 | 0.0001 | 0.0000 |
| S10 | −9.7913 | −0.0541 | 0.0305 | −0.0226 | 0.0135 | −0.0053 | 0.0013 | −0.0002 | 0.0000 | 0.0000 |
| S11 | −1.8671 | 0.0112 | −0.0023 | −0.0080 | 0.0049 | −0.0021 | 0.0006 | −0.0001 | 0.0000 | 0.0000 |
| S12 | −13.3363 | 0.0683 | −0.0258 | 0.0095 | −0.0050 | 0.0017 | −0.0003 | 0.0000 | 0.0000 | 0.0000 |
| S13 | 2.7754 | −0.0247 | −0.0251 | 0.0210 | −0.0066 | 0.0011 | −0.0001 | 0.0000 | 0.0000 | 0.0000 |
| S14 | −0.6231 | −0.1154 | 0.0362 | −0.0095 | 0.0019 | −0.0003 | 0.0000 | 0.0000 | 0.0000 | 0.0000 | optical axis and is convex at a periphery of the image-side surface S2 of the first lens L1.

The second lens L2 has a negative refractive power. An object-side surface S3 of the second lens L2 is convex. An image-side surface S4 of the second lens L2 is concave.

The third lens L3 has a negative refractive power. An object-side surface S5 of the third lens L3 is convex at the optical axis and is concave at a periphery of the object-side surface S5 of the third lens L3. An image-side surface S6 of the third lens L3 is concave.

The fourth lens L4 has a positive refractive power. An object-side surface S7 of the fourth lens L4 is concave. An image-side surface S8 of the fourth lens L4 is convex.

The fifth lens L5 has a negative refractive power. An object-side surface S9 of the fifth lens L5 is convex at the optical axis and is concave at a periphery. An image-side surface S10 of the fifth lens L5 is concave at the optical axis and is convex at a periphery of the image-side surface S10 of the fifth lens L5.

The sixth lens L6 has a positive refractive power. An object-side surface S11 of the sixth lens L6 is convex at the optical axis and is concave at a periphery of the object-side surface S11 of the sixth lens L6. An image-side surface S12 of the sixth lens L6 is concave at the optical axis and is convex at a periphery of the image-side surface S12 of the sixth lens L6.

The seventh lens L7 has a negative refractive power. An object-side surface S13 of the seventh lens L7 is convex. An image-side surface S14 of the seventh lens L7 is concave at the optical axis and is convex at a periphery of the image-side surface S14 of the seventh lens L7.

The other structures of the optical system illustrated in FIG. 4a are identical with the optical system illustrated in FIG. 1a, reference can be made to the optical system illustrated in FIG. 1a.

Table 4a illustrates characteristics of the optical system in this implementation. Data in Table 4a is obtained based on light with a wavelength of 555 nm. Each of Y radius, thickness, and focal length is in units of millimeter (mm).

TABLE 4a

Optical System Illustrated in FIG. 4a
EFL = 5.79, FNO = 1.68, FOV = 78.22, TTL = 6.80

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.7063 | | | | |
| S1 | First | Aspherical | 2.3984 | 0.9610 | Plastic | 1.55 | 56.11 | 5.08 |
| S2 | lens | Aspherical | 15.2596 | 0.1000 | | | | |
| S3 | Second | Aspherical | 8.1123 | 0.3022 | Plastic | 1.67 | 20.38 | −10.05 |
| S4 | lens | Aspherical | 3.6150 | 0.2633 | | | | |
| S5 | Third | Aspherical | 4.5266 | 0.3000 | Plastic | 1.67 | 20.38 | −462.09 |
| S6 | lens | Aspherical | 4.3428 | 0.4203 | | | | |
| S7 | Fourth | Aspherical | −80.9527 | 0.6216 | Plastic | 1.55 | 56.11 | 23.98 |
| S8 | lens | Aspherical | −11.3002 | 0.5779 | | | | |
| S9 | Fifth | Aspherical | 7.2390 | 0.3613 | Plastic | 1.55 | 56.11 | −8330.70 |
| S10 | lens | Aspherical | 7.1001 | 0.2301 | | | | |
| S11 | Sixth | Aspherical | 2.1808 | 0.3810 | Plastic | 1.55 | 56.11 | 11.37 |
| S12 | lens | Aspherical | 3.1547 | 0.9770 | | | | |
| S13 | Seventh | Aspherical | 8.8004 | 0.3834 | Plastic | 1.54 | 55.75 | −5.63 |
| S14 | lens | Aspherical | 2.2159 | 0.3532 | | | | |
| S15 | Infrared | Spherical | Infinity | 0.2100 | Class | | | |
| S16 | cut-off filter | Spherical | Infinity | 0.3578 | | | | |
| S17 | Imaging plane | Spherical | Infinity | 0.0000 | | | | |

Note:
The reference wavelength is 555 nm

In Table 4a, EEL represents an effective focal length of the optical system. FNO represents an F-number of the optical system. FOV represents an angle of view of the optical system.

Table 4b shows higher-order coefficients that can be used for each aspherical lens of the optical system illustrated in FIG. 4a, where a shape of each aspherical lens surface can be defined by the formula given for the optical system illustrated in FIG. 1a.

TABLE 4b

| Surface Number | K | A4 | A6 | A8 | A10 | A12 | A14 | A16 | A18 | A20 |
|---|---|---|---|---|---|---|---|---|---|---|
| S1 | −0.5687 | 0.0045 | 0.0010 | −0.0010 | 0.0020 | −0.0023 | 0.0015 | −0.0006 | 0.0001 | 0.0000 |
| S2 | 1.8766 | −0.0232 | 0.0337 | −0.0376 | 0.0310 | −0.0182 | 0.0072 | −0.0018 | 0.0003 | 0.0000 |
| S3 | 3.7650 | −0.0378 | 0.0575 | −0.0623 | 0.0517 | −0.0319 | 0.0139 | −0.0040 | 0.0007 | −0.0001 |
| S4 | −2.4320 | −0.0239 | 0.0457 | −0.0531 | 0.0495 | −0.0390 | 0.0243 | −0.0108 | 0.0030 | −0.0004 |
| S5 | 0.0000 | −0.0449 | 0.0165 | −0.0195 | 0.0185 | −0.0164 | 0.0124 | −0.0067 | 0.0022 | −0.0003 |
| S6 | −2.4196 | −0.0277 | 0.0022 | 0.0171 | −0.0414 | 0.0524 | −0.0387 | 0.0170 | −0.0040 | 0.0004 |
| S7 | 99.0000 | −0.0237 | −0.0003 | −0.0095 | 0.0190 | −0.0218 | 0.0143 | −0.0053 | 0.0010 | −0.0001 |

TABLE 4b-continued

| Surface Number | K | A4 | A6 | A8 | A10 | A12 | A14 | A16 | A18 | A20 |
|---|---|---|---|---|---|---|---|---|---|---|
| S8 | 13.9255 | −0.0297 | −0.0021 | 0.0072 | −0.0171 | 0.0188 | −0.0117 | 0.0042 | −0.0008 | 0.0001 |
| S9 | −25.6045 | −0.0157 | 0.0200 | −0.0175 | 0.0073 | −0.0019 | 0.0003 | 0.0000 | 0.0000 | 0.0000 |
| S10 | −8.0029 | −0.0732 | 0.0630 | −0.0398 | 0.0163 | −0.0045 | 0.0008 | −0.0001 | 0.0000 | 0.0000 |
| S11 | −4.1648 | −0.0126 | 0.0057 | −0.0115 | 0.0053 | −0.0013 | 0.0002 | 0.0000 | 0.0000 | 0.0000 |
| S12 | −6.8784 | 0.0399 | −0.0274 | 0.0042 | 0.0006 | −0.0004 | 0.0001 | 0.0000 | 0.0000 | 0.0000 |
| S13 | 1.5200 | −0.1371 | 0.0496 | −0.0130 | 0.0025 | −0.0003 | 0.0000 | 0.0000 | 0.0000 | 0.0000 |
| S14 | −1.1402 | −0.1415 | 0.0542 | −0.0160 | 0.0031 | −0.0004 | 0.0000 | 0.0000 | 0.0000 | 0.0000 |

FIG. 4b illustrates a longitudinal spherical aberration curve, an astigmatic field curve, and a distortion curve of the optical system of the optical system illustrated in FIG. 4a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 4b, the optical system illustrated in FIG. 4a can achieve good imaging quality.

Figure 5A:
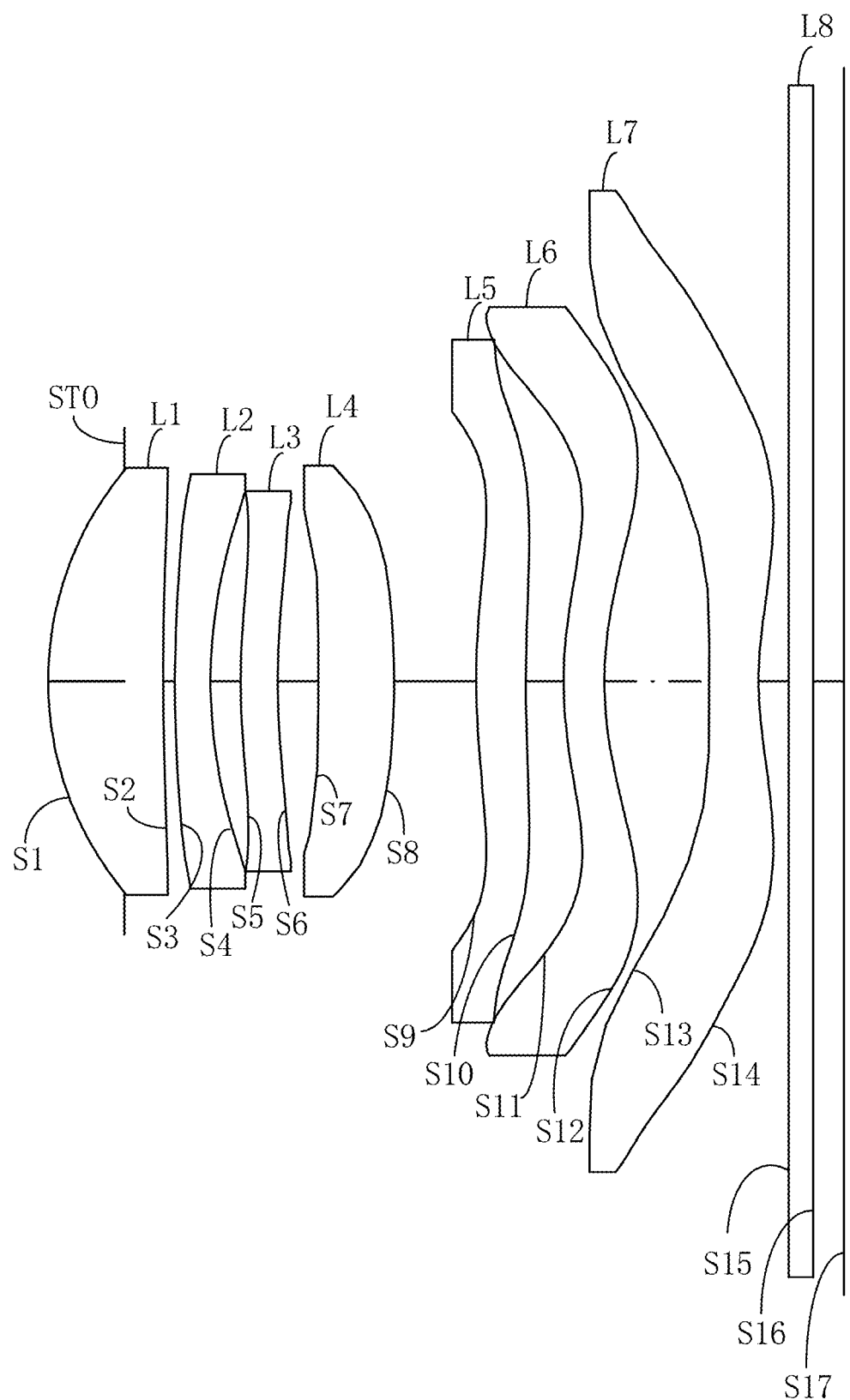
FIG. 5a is a schematic structural view of an optical system according to an implementation.
Figure 5B:
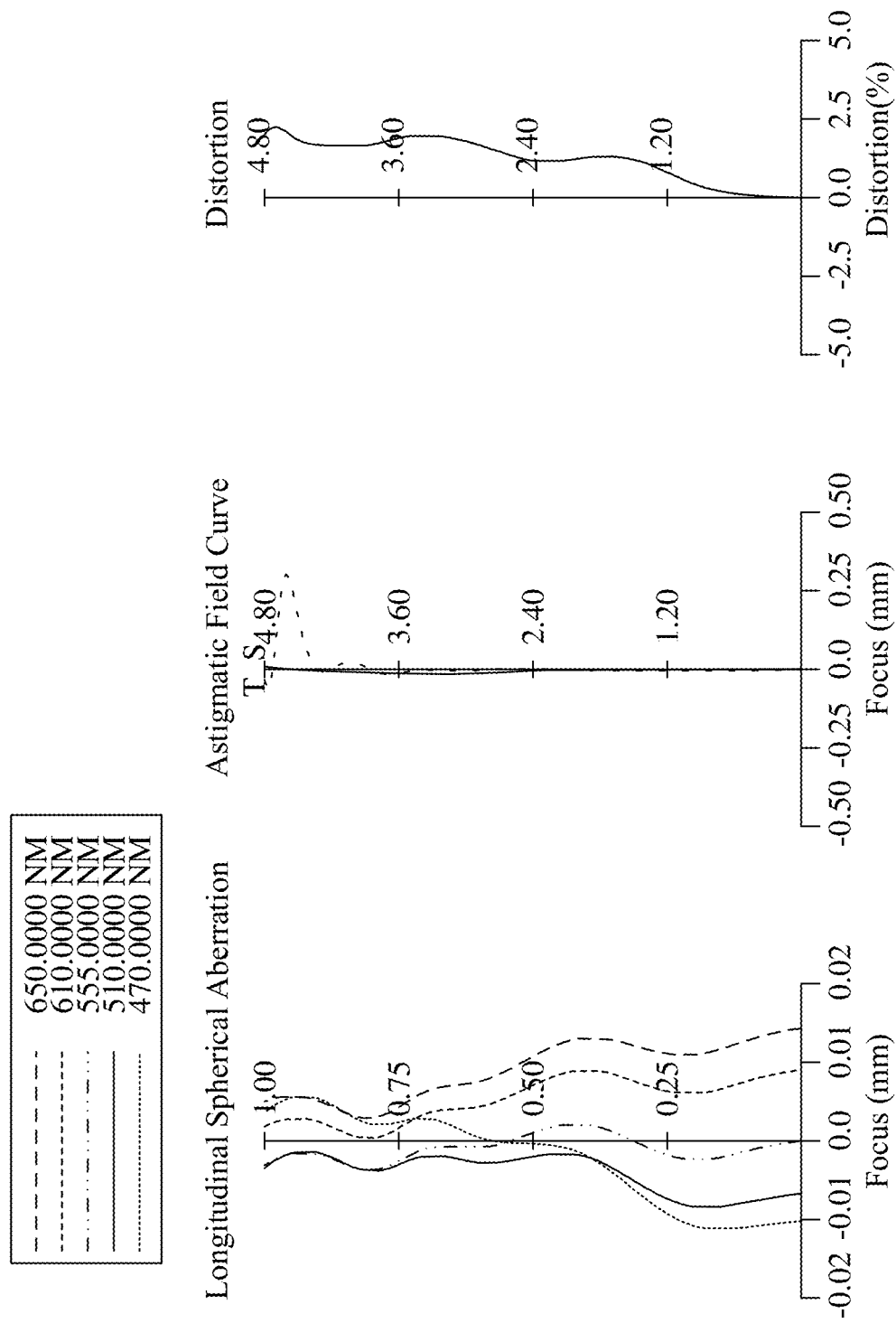

Referring to FIG. 5a and FIG. 5b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. The image-side surface S2 of the first lens L1 is concave at the optical axis and is convex at a periphery.

The second lens L2 has a negative refractive power. An object-side surface S3 of the second lens L2 is convex. An image-side surface S4 of the second lens L2 is concave.

The third lens L3 has a positive refractive power. An object-side surface S5 of the third lens L3 is convex at the optical axis and is concave at a periphery. An image-side surface S6 of the third lens L3 is concave.

The fourth lens L4 has a positive refractive power. An object-side surface S7 of the fourth lens L4 is concave. An image-side surface S8 of the fourth lens L4 is convex.

The fifth lens L5 has a positive refractive power. An object-side surface S9 of the fifth lens L5 is convex at the optical axis and is concave at a periphery. An image-side surface S10 of the fifth lens L5 is concave at the optical axis and is convex at a periphery of the image-side surface S10 of the fifth lens L5.

The sixth lens L6 has a negative refractive power. An object-side surface S11 of the sixth lens L6 is convex at the optical axis and is concave at a periphery of the object-side surface S11 of the sixth lens L6. An image-side surface S12 of the sixth lens L6 is concave at the optical axis and is convex at a periphery of the image-side surface S12 of the sixth lens L6.

The seventh lens L7 has a negative refractive power. An object-side surface S13 of the seventh lens L7 is convex. An image-side surface S14 of the seventh lens L7 is concave at the optical axis and is convex at a periphery of the image-side surface S14 of the seventh lens L7.

The other structures of the optical system of the optical system illustrated in FIG. 5a are identical with the optical system illustrated in FIG. 1a, reference can be made to the optical system illustrated in FIG. 1a.

Table 5a illustrates characteristics of the optical system in this implementation. Data in Table 5a is obtained based on light with a wavelength of 555 nm. Each of Y radius, thickness, and focal length is in units of millimeter (mm).

TABLE 5a

Optical System Illustrated in FIG. 5a
EFL = 5.82, FNO = 1.68, FOV = 77.94, TTL = 6.8

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.6494 | | | | |
| S1 | First | Aspherical | 2.3885 | 0.9823 | Plastic | 1.55 | 56.11 | 4.96 |
| S2 | lens | Aspherical | 17.3979 | 0.1000 | | | | |
| S3 | Second | Aspherical | 8.9809 | 0.3047 | Plastic | 1.67 | 20.38 | −8.68 |
| S4 | lens | Aspherical | 3.4715 | 0.2576 | | | | |
| S5 | Third | Aspherical | 5.1628 | 0.3165 | Plastic | 1.67 | 20.38 | 166.32 |
| S6 | lens | Aspherical | 5.2822 | 0.3485 | | | | |
| S7 | Fourth | Aspherical | −200.5075 | 0.6445 | Plastic | 1.55 | 56.11 | 16.85 |
| S8 | lens | Aspherical | −8.8036 | 0.7024 | | | | |
| S9 | Fifth | Aspherical | 4.9324 | 0.4242 | Plastic | 1.55 | 56.11 | 20.68 |
| S10 | lens | Aspherical | 8.4929 | 0.3225 | | | | |
| S11 | Sixth | Aspherical | 2.8503 | 0.3500 | Plastic | 1.55 | 56.11 | −240.00 |
| S12 | lens | Aspherical | 2.6686 | 0.8932 | | | | |
| S13 | Seventh | Aspherical | 19.1718 | 0.4234 | Plastic | 1.54 | 55.75 | −5.39 |
| S14 | lens | Aspherical | 2.4950 | 0.2578 | | | | |
| S15 | Infrared | Spherical | Infinity | 0.2100 | Class | | | |

TABLE 5a-continued

Optical System Illustrated in FIG. 5a
EFL = 5.82, FNO = 1.68, FOV = 77.94, TTL = 6.8

| Surface Number | Surface Name | Surface Type | Y Radius | Thickness | Material | Refractive Index | Abbe Number | Focal length |
|---|---|---|---|---|---|---|---|---|
| S16 | cut-off filter | Spherical | Infinity | 0.2623 | | | | |
| S17 | Imaging plane | Spherical | Infinity | 0.0000 | | | | |

Note:
The reference wavelength is 555 nm

In Table 5a, EFL represents an effective focal length of the optical system. FNO represents an F-number of the optical system. FOV represents an angle of view of the optical system.

Table 5b shows higher-order coefficients that can be used for each aspherical lens of the optical system illustrated in FIG. 5a, where a shape of each aspherical lens surface can be defined by the formula given for the optical system illustrated in FIG. 1a.

TABLE 5b

| Surface Number | K | A4 | A6 | A8 | A10 | A12 | A14 | A16 | A18 | A20 |
|---|---|---|---|---|---|---|---|---|---|---|
| S1 | −0.5669 | 0.0051 | −0.0002 | 0.0017 | −0.0018 | 0.0011 | −0.0004 | 0.0000 | 0.0000 | 0.0000 |
| S2 | 2.8847 | −0.0149 | 0.0114 | −0.0043 | −0.0026 | 0.0046 | −0.0028 | 0.0009 | −0.0002 | 0.0000 |
| S3 | 3.7576 | −0.0272 | 0.0251 | −0.0118 | −0.0038 | 0.0113 | −0.0083 | 0.0031 | −0.0006 | 0.0001 |
| S4 | −1.8799 | −0.0136 | 0.0161 | 0.0055 | −0.0384 | 0.0554 | −0.0434 | 0.0199 | −0.0051 | 0.0006 |
| S5 | 0.0000 | −0.0353 | 0.0016 | 0.0048 | −0.0159 | 0.0155 | −0.0082 | 0.0029 | −0.0007 | 0.0001 |
| S6 | −5.5495 | −0.0303 | 0.0259 | −0.0614 | 0.0999 | −0.1069 | 0.0727 | −0.0297 | 0.0067 | −0.0006 |
| S7 | 99.0000 | −0.0331 | −0.0015 | 0.0319 | −0.0869 | 0.1159 | −0.0920 | 0.0436 | −0.0114 | 0.0013 |
| S8 | 15.3503 | −0.0425 | 0.0090 | 0.0074 | −0.0290 | 0.0337 | −0.0214 | 0.0078 | −0.0015 | 0.0001 |
| S9 | −34.8978 | −0.0199 | 0.0256 | −0.0250 | 0.0120 | −0.0036 | 0.0007 | −0.0001 | 0.0000 | 0.0000 |
| S10 | −5.3412 | −0.0644 | 0.0670 | −0.0490 | 0.0213 | −0.0059 | 0.0010 | −0.0001 | 0.0000 | 0.0000 |
| S11 | −5.6869 | −0.0361 | 0.0240 | −0.0245 | 0.0109 | −0.0027 | 0.0004 | 0.0000 | 0.0000 | 0.0000 |
| S12 | −10.5507 | 0.0340 | −0.0238 | 0.0021 | 0.0017 | −0.0007 | 0.0001 | 0.0000 | 0.0000 | 0.0000 |
| S13 | 17.1198 | −0.1117 | 0.0448 | −0.0126 | 0.0024 | −0.0003 | 0.0000 | 0.0000 | 0.0000 | 0.0000 |
| S14 | −1.1369 | −0.1304 | 0.0568 | −0.0192 | 0.0040 | −0.0005 | 0.0000 | 0.0000 | 0.0000 | 0.0000 |

FIG. 5b illustrates a longitudinal spherical aberration curve, an astigmatic field curve, and a distortion curve of the optical system illustrated in FIG. 5a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 5b, the optical system illustrated in FIG. 5a can achieve good imaging quality.

Figure 6A:
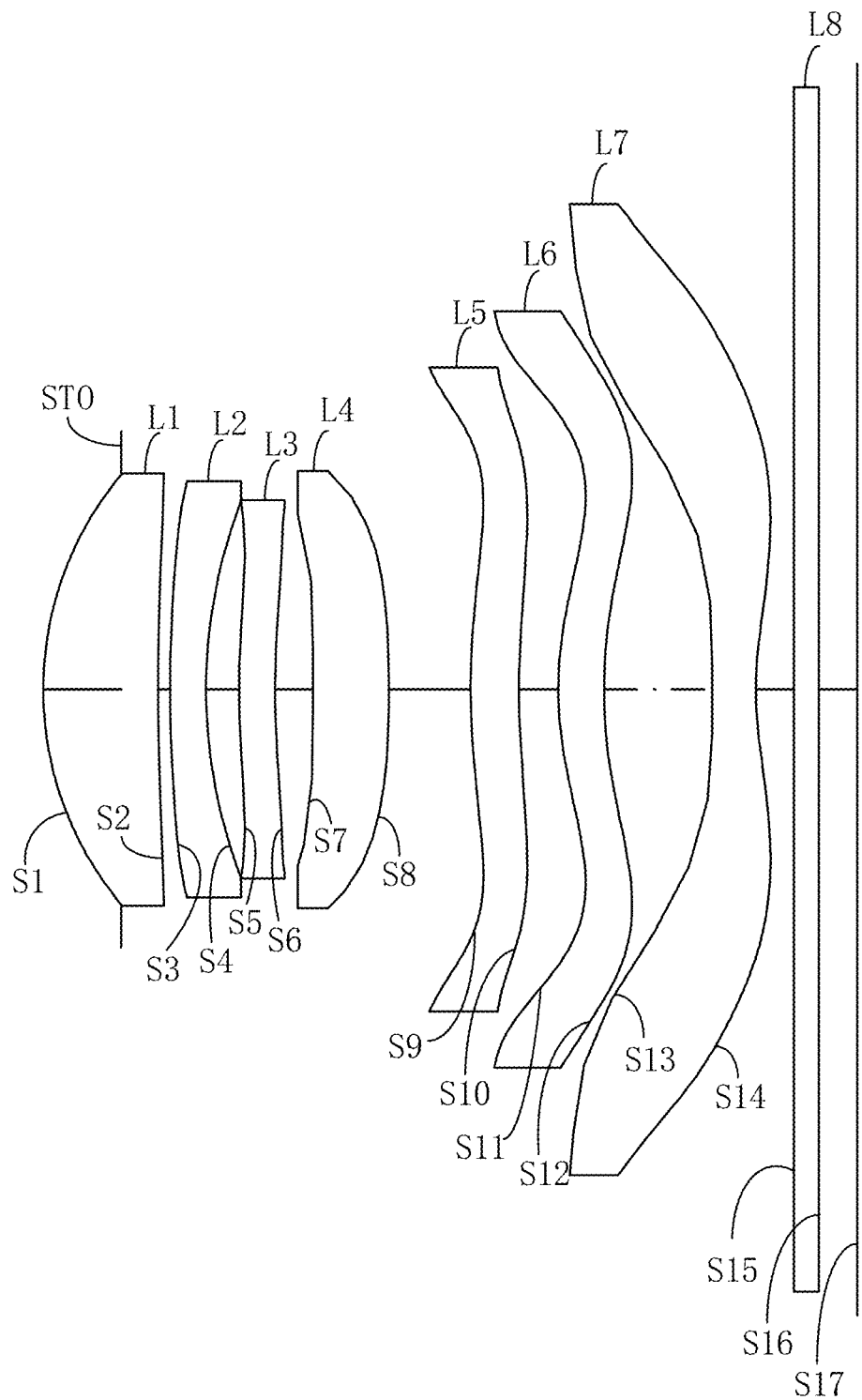
FIG. 6a is a schematic structural view of an optical system according to an implementation.
Figure 6B:
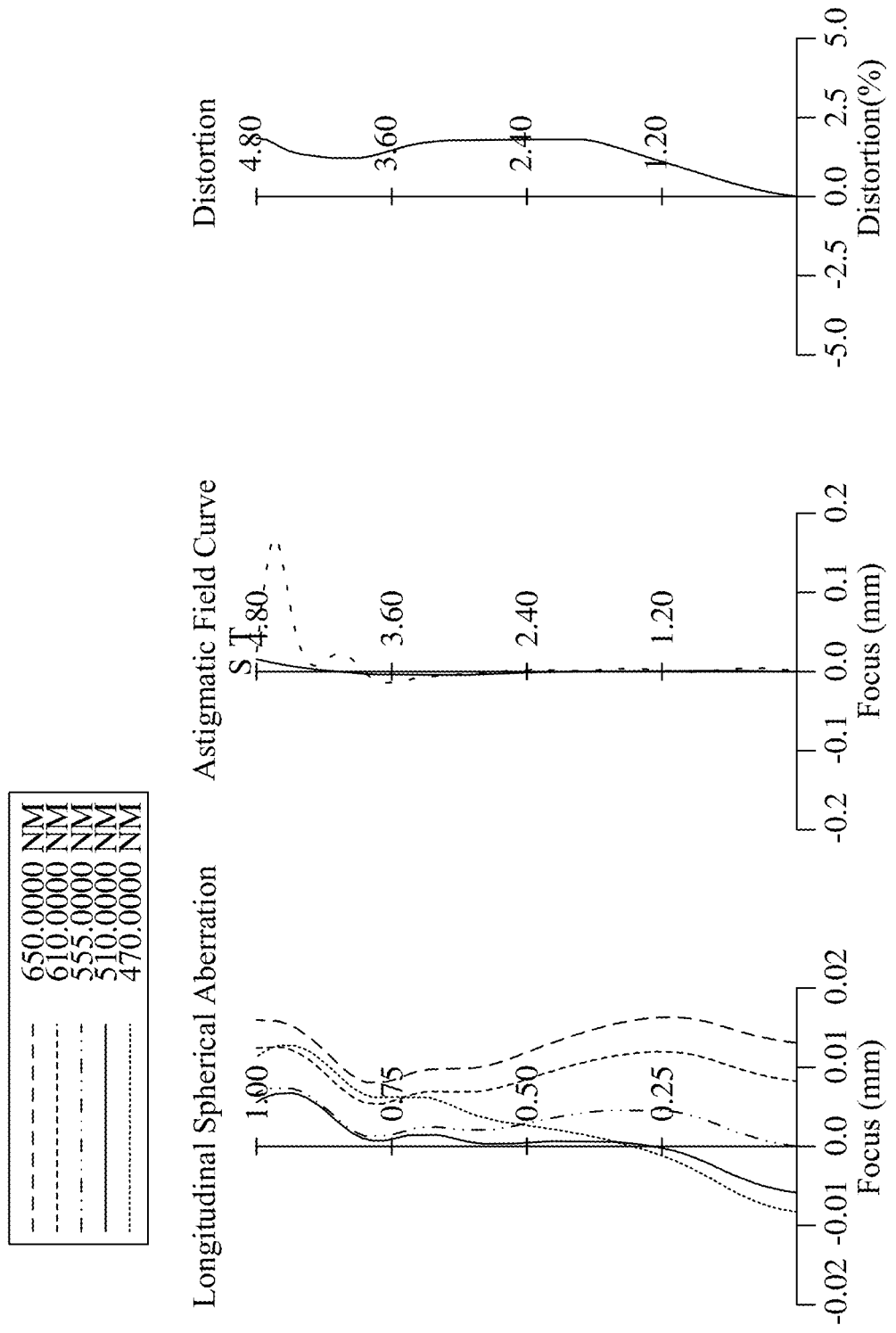

Referring to FIG. 6a and FIG. 6b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave.

The second lens L2 has a negative refractive power. An object-side surface S3 of the second lens L2 is convex. An image-side surface S4 of the second lens L2 is concave.

The third lens L3 has a negative refractive power. An object-side surface S5 of the third lens L3 is convex at the optical axis and is concave at a periphery of the object-side surface S5 of the third lens L3. An image-side surface S6 of the third lens L3 is concave.

The fourth lens L4 has a positive refractive power. An object-side surface S7 of the fourth lens L4 is concave. An image-side surface S8 of the fourth lens L4 is convex.

The fifth lens L5 has a positive refractive power. An object-side surface S9 of the fifth lens L5 is convex at the optical axis and is concave at a periphery of the object-side surface S9 of the fifth lens L5. An image-side surface S10 of the fifth lens L5 is concave at the optical axis and is convex at a periphery of the image-side surface S10 of the fifth lens L5.

The sixth lens L6 has a positive refractive power. An object-side surface S11 of the sixth lens L6 is convex at the optical axis and is concave at a periphery of the object-side surface S511 of the sixth lens L6. An image-side surface S512 of the sixth lens L6 is concave at the optical axis and is convex at a periphery of the image-side surface 12 of the sixth lens L6.

The seventh lens L7 has a negative refractive power. An object-side surface 13 of the seventh lens L7 is convex at the optical axis and is concave at a periphery of the object-side surface S13 of the seventh lens L7. An image-side surface S14 of the seventh lens L7 is concave at the optical axis and is convex at a periphery of the image-side surface S14 of the seventh lens L7.

The other structures of the optical system illustrated in FIG. 6a are identical with the optical system illustrated in FIG. 1a, reference can be made to the optical system illustrated in FIG. 1a.

Table 6a illustrates characteristics of the optical system in this implementation. Data in Table 6a is obtained based on light with a wavelength of 555 nm. Each of Y radius, thickness, and focal length is in units of millimeter (mm).

TABLE 6a

Optical System Illustrated in FIG. 6a
EFL = 5.74, FNO = 1.68, FOV = 78.76, TTL = 6.8

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.6508 | | | | |
| S1 | First | Aspherical | 2.3917 | 0.9592 | Plastic | 1.55 | 56.11 | 5.01 |
| S2 | lens | Aspherical | 16.3817 | 0.1000 | | | | |
| S3 | Second | Aspherical | 8.7856 | 0.3000 | Plastic | 1.67 | 20.38 | −8.99 |
| S4 | lens | Aspherical | 3.5148 | 0.2773 | | | | |
| S5 | Third | Aspherical | 6.2980 | 0.3000 | Plastic | 1.67 | 20.38 | −2257.39 |
| S6 | lens | Aspherical | 6.1523 | 0.3156 | | | | |
| S7 | Fourth | Aspherical | −4094.3547 | 0.6350 | Plastic | 1.55 | 56.11 | 16.65 |
| S8 | lens | Aspherical | −9.0680 | 0.6825 | | | | |
| S9 | Fifth | Aspherical | 5.0249 | 0.4047 | Plastic | 1.55 | 56.11 | 127.47 |
| S10 | lens | Aspherical | 5.2620 | 0.3283 | | | | |
| S11 | Sixth | Aspherical | 2.5089 | 0.3822 | Plastic | 1.55 | 56.11 | 13.19 |
| S12 | lens | Aspherical | 3.6441 | 0.9035 | | | | |
| S13 | Seventh | Aspherical | 42.0343 | 0.3650 | Plastic | 1.54 | 55.75 | −5.03 |
| S14 | lens | Aspherical | 2.5314 | 0.3160 | | | | |
| S15 | Infrared cut-off filter | Spherical | Infinity | 0.2100 | Class | | | |
| S16 | | Spherical | Infinity | 0.3206 | | | | |
| S17 | Imaging plane | Spherical | Infinity | 0.0000 | | | | |

Note:
The reference wavelength is 555 nm

In Table 6a, EFL represents an effective focal length of the optical system. FNO represents an F-number of the optical system. FOV represents an angle of view of the optical system.

Table 6b shows higher-order coefficients that can be used for each aspherical lens of the optical system illustrated in FIG. 6a, where a shape of each aspherical lens surface can be defined by the formula given for the optical system illustrated in FIG. 1a.

TABLE 6b

| Surface Number | K | A4 | A6 | A8 | A10 | A12 | A14 | A16 | A18 | A20 |
|---|---|---|---|---|---|---|---|---|---|---|
| S1 | −0.5502 | 0.0047 | 0.0022 | −0.0036 | 0.0054 | −0.0050 | 0.0028 | −0.0010 | 0.0002 | 0.0000 |
| S2 | 7.5959 | −0.0138 | 0.0125 | −0.0146 | 0.0160 | −0.0117 | 0.0053 | −0.0014 | 0.0002 | 0.0000 |
| S3 | 5.3671 | −0.0244 | 0.0181 | −0.0092 | 0.0038 | 0.0008 | −0.0026 | 0.0016 | −0.0004 | 0.0000 |
| S4 | −1.4656 | −0.0099 | 0.0057 | 0.0204 | −0.0522 | 0.0681 | −0.0536 | 0.0252 | −0.0065 | 0.0007 |
| S5 | 0.0000 | −0.0349 | 0.0051 | −0.0122 | 0.0135 | −0.0084 | 0.0022 | 0.0003 | −0.0002 | 0.0000 |
| S6 | −8.9428 | −0.0290 | 0.0081 | −0.0140 | 0.0188 | −0.0164 | 0.0097 | −0.0035 | 0.0007 | −0.0001 |
| S7 | −2.9088 | −0.0328 | 0.0021 | −0.0017 | −0.0123 | 0.0252 | −0.0252 | 0.0141 | −0.0042 | 0.0005 |
| S8 | 17.6861 | −0.0338 | 0.0007 | 0.0058 | −0.0157 | 0.0169 | −0.0102 | 0.0036 | −0.0007 | 0.0001 |
| S9 | −23.5570 | −0.0129 | 0.0125 | −0.0106 | 0.0041 | −0.0013 | 0.0003 | −0.0001 | 0.0000 | 0.0000 |
| S10 | −8.6259 | −0.0602 | 0.0413 | −0.0200 | 0.0058 | −0.0012 | 0.0002 | 0.0000 | 0.0000 | 0.0000 |
| S11 | −4.8419 | −0.0094 | −0.0100 | 0.0009 | 0.0011 | −0.0007 | 0.0002 | 0.0000 | 0.0000 | 0.0000 |
| S12 | −10.2326 | 0.0390 | −0.0359 | 0.0126 | −0.0029 | 0.0004 | 0.0000 | 0.0000 | 0.0000 | 0.0000 |
| S13 | 87.1386 | −0.1212 | 0.0515 | −0.0158 | 0.0032 | −0.0004 | 0.0000 | 0.0000 | 0.0002 | 0.0000 |
| S14 | −1.1476 | −0.1279 | 0.0512 | −0.0151 | 0.0028 | −0.0003 | 0.0000 | 0.0000 | 0.0000 | 0.0000 |

FIG. 6b illustrates a longitudinal spherical aberration curve, an astigmatic field curve, and a distortion curve of the optical system illustrated in FIG. 6a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 6b, f the optical system illustrated in FIG. 6a can achieve good imaging quality.

Figure 7A:
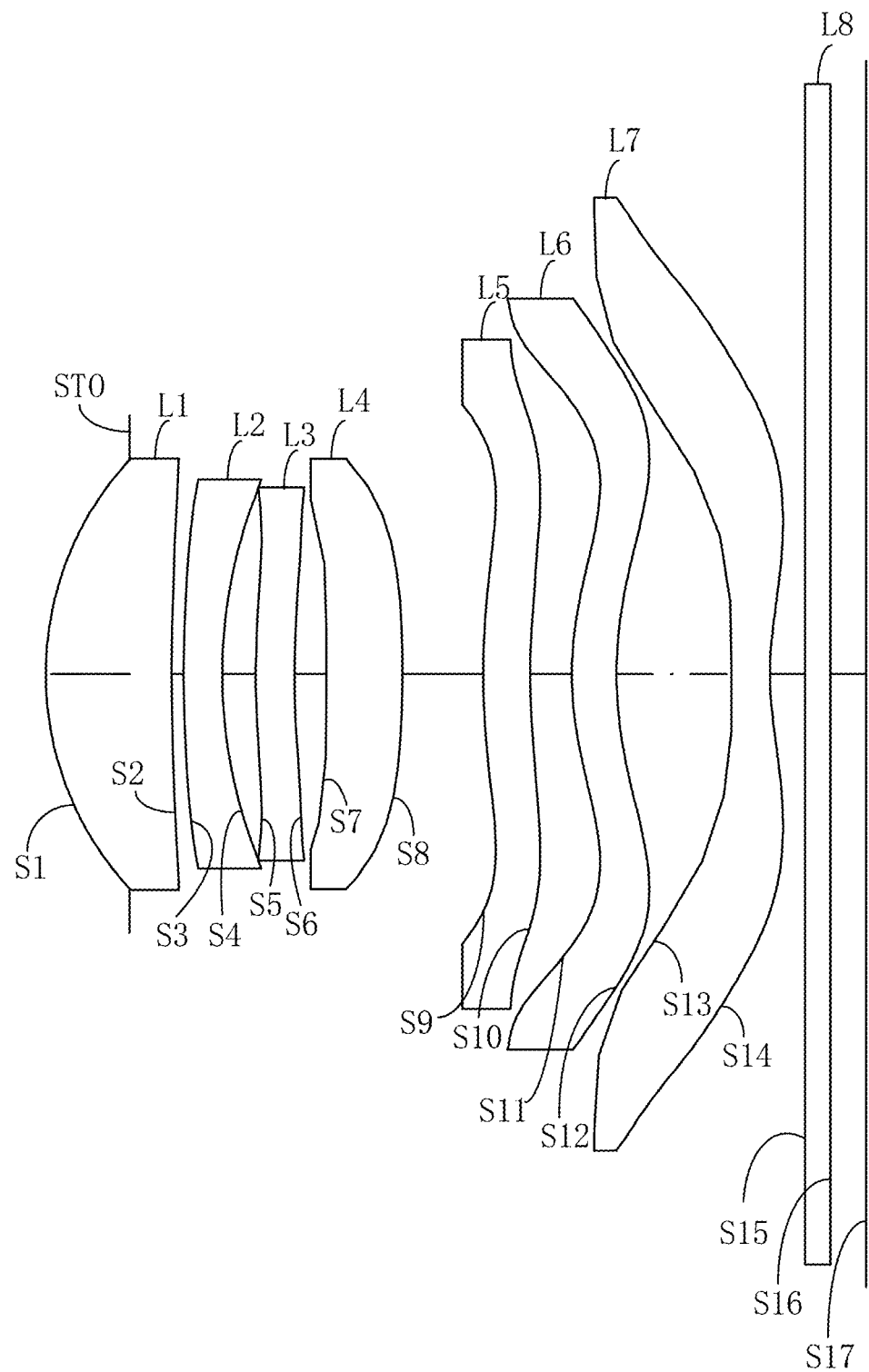
FIG. 7a is a schematic structural view of an optical system according to an implementation.
Figure 7B:
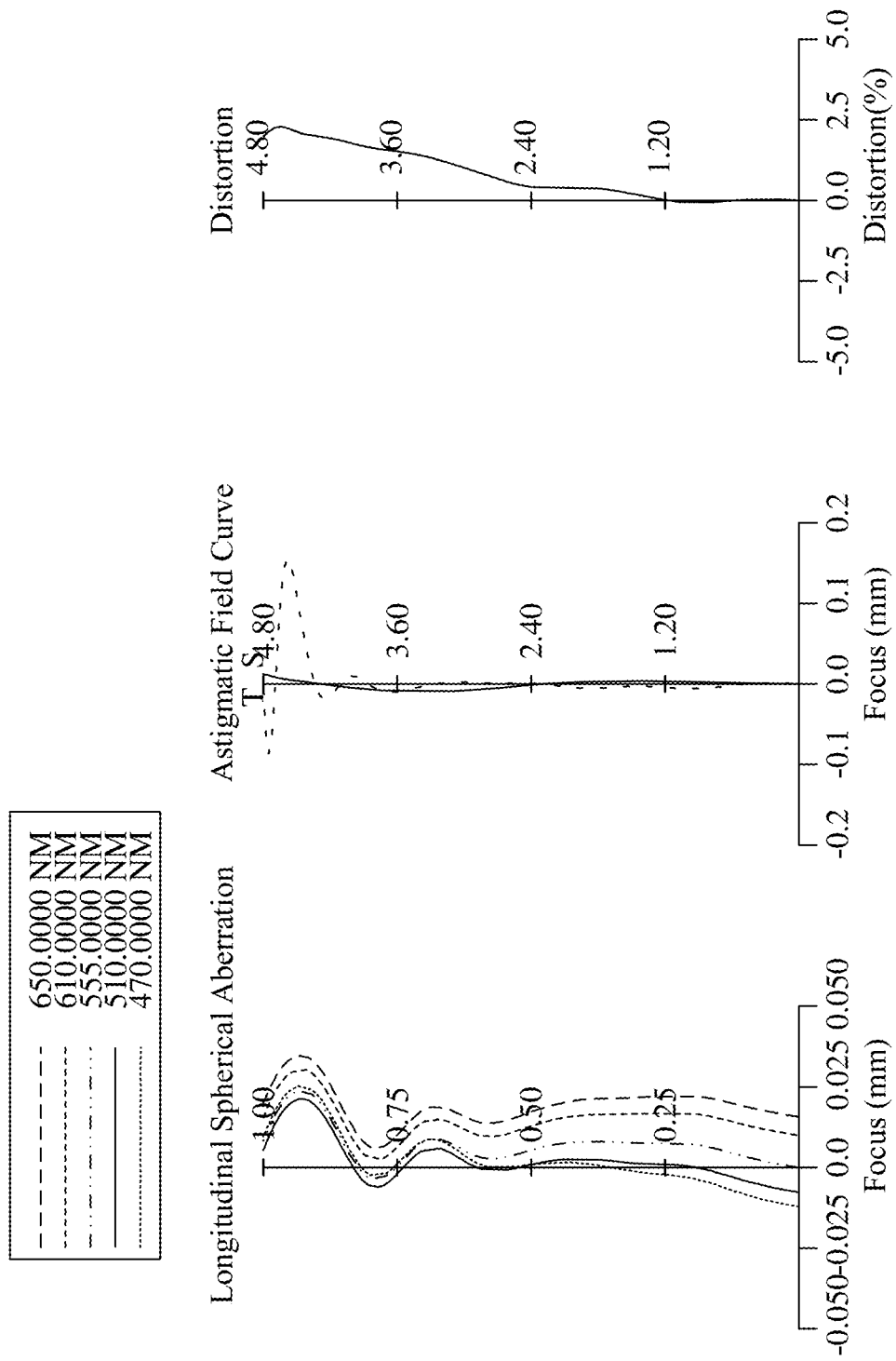

Referring to FIG. 7a and FIG. 7b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave.

The second lens L2 has a negative refractive power. An object-side surface S3 of the second lens L2 is convex. An image-side surface S4 of the second lens L2 is concave.

The third lens L3 has a negative refractive power. An object-side surface S5 of the third lens L3 is convex at the optical axis and is concave at a periphery of the object-side surface S5 of the third lens L3. An image-side surface S6 of the third lens L3 is concave.

The fourth lens L4 has a positive refractive power. An object-side surface S7 of the fourth lens L4 is convex at the optical axis and is concave at a periphery of the object-side surface S7 of the fourth lens L4. An image-side surface S8 of the fourth lens L4 is convex.

The fifth lens L5 has a positive refractive power. An object-side surface S9 of the fifth lens L5 is convex at the optical axis and is concave at a periphery of the object-side surface S9 of the fifth lens L5. An image-side surface S10 of the fifth lens L5 is concave.

The sixth lens L6 has a positive refractive power. An object-side surface S11 of the sixth lens L6 is convex at the optical axis and is concave at a periphery of the object-side surface S11 of the sixth lens L6. An image-side surface S12 of the sixth lens L6 is concave at the optical axis and is convex at a periphery of the image-side surface S12 of the sixth lens L6.

The seventh lens L7 has a negative refractive power. An object-side surface S13 of the seventh lens L7 is convex at the optical axis and is concave at a periphery of the object-side surface S13 of the seventh lens L7. An image-side surface S14 of the seventh lens L7 is concave at the optical axis and is convex at a periphery of the image-side surface S14 of the seventh lens L7.

The other structures of the optical system illustrated in FIG. 7a are identical with the optical system illustrated in FIG. 1a, reference can be made to the optical system illustrated in FIG. 1a.

Table 7a illustrates characteristics of the optical system in this implementation. Data in Table 7a is obtained based on light with a wavelength of 555 nm. Each of Y radius, thickness, and focal length is in units of millimeter (mm).

TABLE 7a

Optical System Illustrated in FIG. 7a
EFL = 5.94, FNO = 1.68, FOV = 76.80, TTL = 6.8

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.6936 | | | | |
| S1 | First lens | Aspherical | 2.3611 | 1.0422 | Plastic | 1.55 | 56.11 | 4.99 |
| S2 | | Aspherical | 14.9063 | 0.1000 | | | | |
| S3 | Second lens | Aspherical | 8.5640 | 0.3200 | Plastic | 1.67 | 20.38 | −9.18 |
| S4 | | Aspherical | 3.5151 | 0.2782 | | | | |
| S5 | Third lens | Aspherical | 6.3763 | 0.3200 | Plastic | 1.67 | 20.38 | −12516.09 |
| S6 | | Aspherical | 6.2436 | 0.2663 | | | | |
| S7 | Fourth lens | Aspherical | 9551.7825 | 0.6287 | Plastic | 1.55 | 56.11 | 18.08 |
| S8 | | Aspherical | −9.8823 | 0.6691 | | | | |
| S9 | Fifth lens | Aspherical | 4.7451 | 0.3901 | Plastic | 1.55 | 56.11 | 183.60 |
| S10 | | Aspherical | 4.8363 | 0.3453 | | | | |
| S11 | Sixth lens | Aspherical | 2.4179 | 0.3710 | Plastic | 1.55 | 56.11 | 16.12 |
| S12 | | Aspherical | 3.1536 | 0.9518 | | | | |
| S13 | Seventh lens | Aspherical | 46.1672 | 0.3200 | Plastic | 1.54 | 55.75 | −4.73 |
| S14 | | Aspherical | 2.3996 | 0.2914 | | | | |
| S15 | Infrared cut-off filter | Spherical | Infinity | 0.2100 | Class | | | |
| S16 | | Spherical | Infinity | 0.2960 | | | | |
| S17 | Imaging plane | Spherical | Infinity | 0.0000 | | | | |

Note:
The reference wavelength is 555 nm

In Table 7a, EFL represents an effective focal length of the optical system. FNO represents an F-number of the optical system. FOV represents an angle of view of the optical system.

Table 7b shows higher-order coefficients that can be used for each aspherical lens of the optical system illustrated in FIG. 7a, where a shape of each aspherical lens surface can be defined by the formula given for the optical system illustrated in FIG. 1a.

TABLE 7b

| Surface Number | K | A4 | A6 | A8 | A10 | A12 | A14 | A16 | A18 | A20 |
|---|---|---|---|---|---|---|---|---|---|---|
| S1 | −0.5251 | 0.0027 | 0.0110 | −0.0244 | 0.0329 | −0.0267 | 0.0133 | −0.0040 | 0.0006 | 0.0000 |
| S2 | 7.5637 | −0.0132 | 0.0150 | −0.0231 | 0.0278 | −0.0215 | 0.0104 | −0.0030 | 0.0005 | 0.0000 |
| S3 | 5.2154 | −0.0232 | 0.0157 | −0.0034 | −0.0077 | 0.0129 | −0.0093 | 0.0036 | −0.0007 | 0.0001 |
| S4 | −1.3649 | −0.0119 | 0.0117 | 0.0136 | −0.0578 | 0.0907 | −0.0785 | 0.0390 | −0.0104 | 0.0012 |
| S5 | 0.0000 | −0.0313 | −0.0108 | 0.0462 | −0.0965 | 0.1118 | −0.0779 | 0.0327 | −0.0076 | 0.0008 |
| S6 | −9.1694 | −0.0276 | −0.0012 | 0.0245 | −0.0568 | 0.0710 | −0.0546 | 0.0262 | −0.0071 | 0.0008 |
| S7 | −99.0000 | −0.0350 | 0.0104 | −0.0184 | 0.0079 | 0.0157 | −0.0291 | 0.0205 | −0.0068 | 0.0009 |
| S8 | 17.7619 | −0.0337 | −0.0008 | 0.0134 | −0.0265 | 0.0256 | −0.0145 | 0.0048 | −0.0009 | 0.0001 |
| S9 | −25.8861 | −0.0187 | 0.0270 | −0.0265 | 0.0130 | −0.0041 | 0.0008 | −0.0001 | 0.0000 | 0.0000 |
| S10 | −8.1563 | −0.0701 | 0.0662 | −0.0439 | 0.0183 | −0.0051 | 0.0009 | −0.0001 | 0.0000 | 0.0000 |
| S11 | −4.8852 | −0.0113 | −0.0006 | −0.0094 | 0.0059 | −0.0018 | 0.0003 | 0.0000 | 0.0000 | 0.0000 |
| S12 | −9.6613 | 0.0473 | −0.0389 | 0.0110 | −0.0015 | 0.0000 | 0.0000 | 0.0000 | 0.0000 | 0.0000 |
| S13 | 99.0000 | −0.1261 | 0.0595 | −0.0198 | 0.0043 | −0.0006 | 0.0000 | 0.0000 | 0.0000 | 0.0000 |
| S14 | −1.1378 | −0.1581 | 0.0721 | −0.0239 | 0.0050 | −0.0006 | 0.0001 | 0.0000 | 0.0000 | 0.0000 |

FIG. 7b illustrates a longitudinal spherical aberration curve, an astigmatic field curve, and a distortion curve of the optical system illustrated in FIG. 7a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 7b, the optical system illustrated in FIG. 7a can achieve good imaging quality.

Figure 8A:
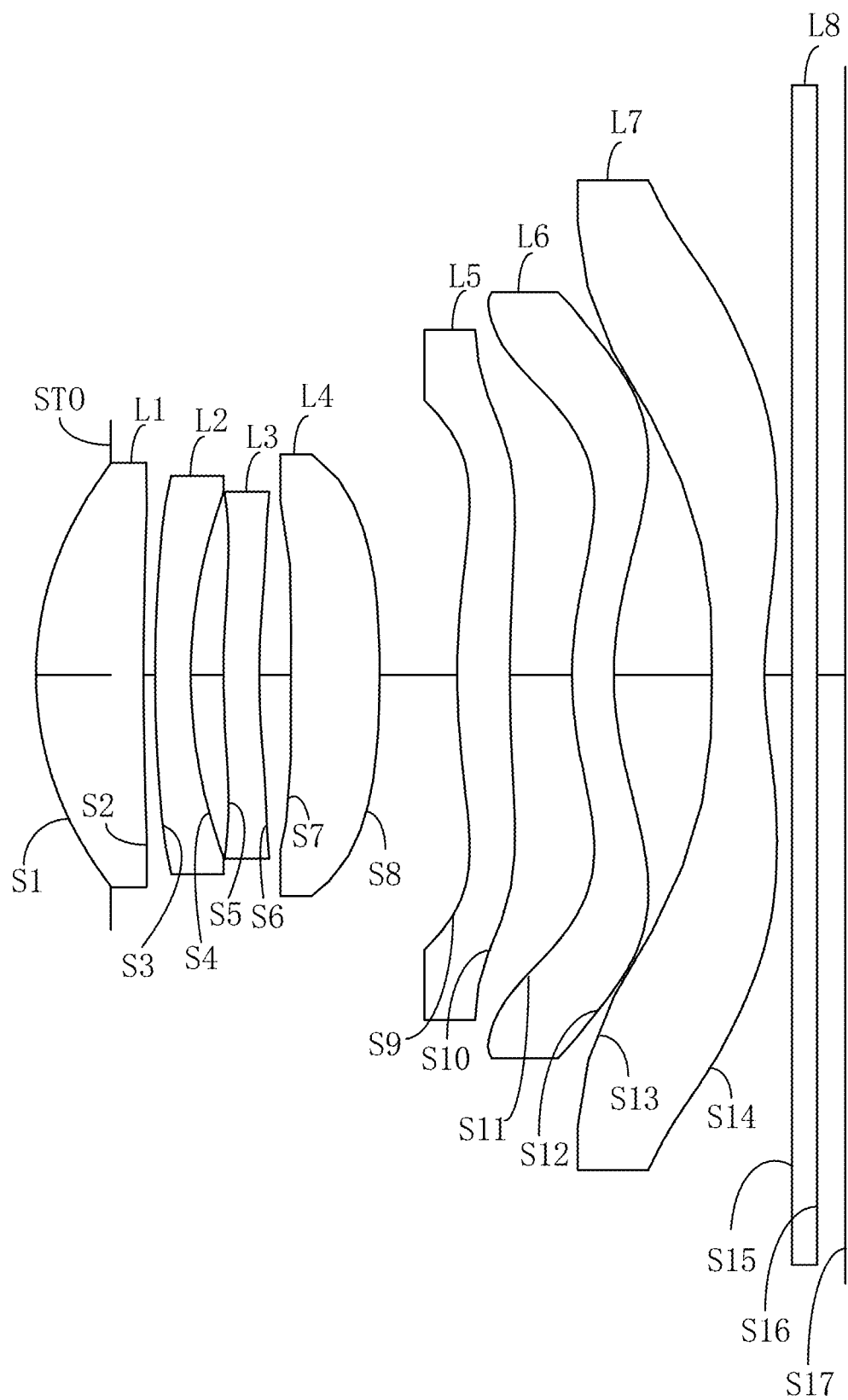
FIG. 8a is a schematic structural view of an optical system according to an implementation.
Figure 8B:
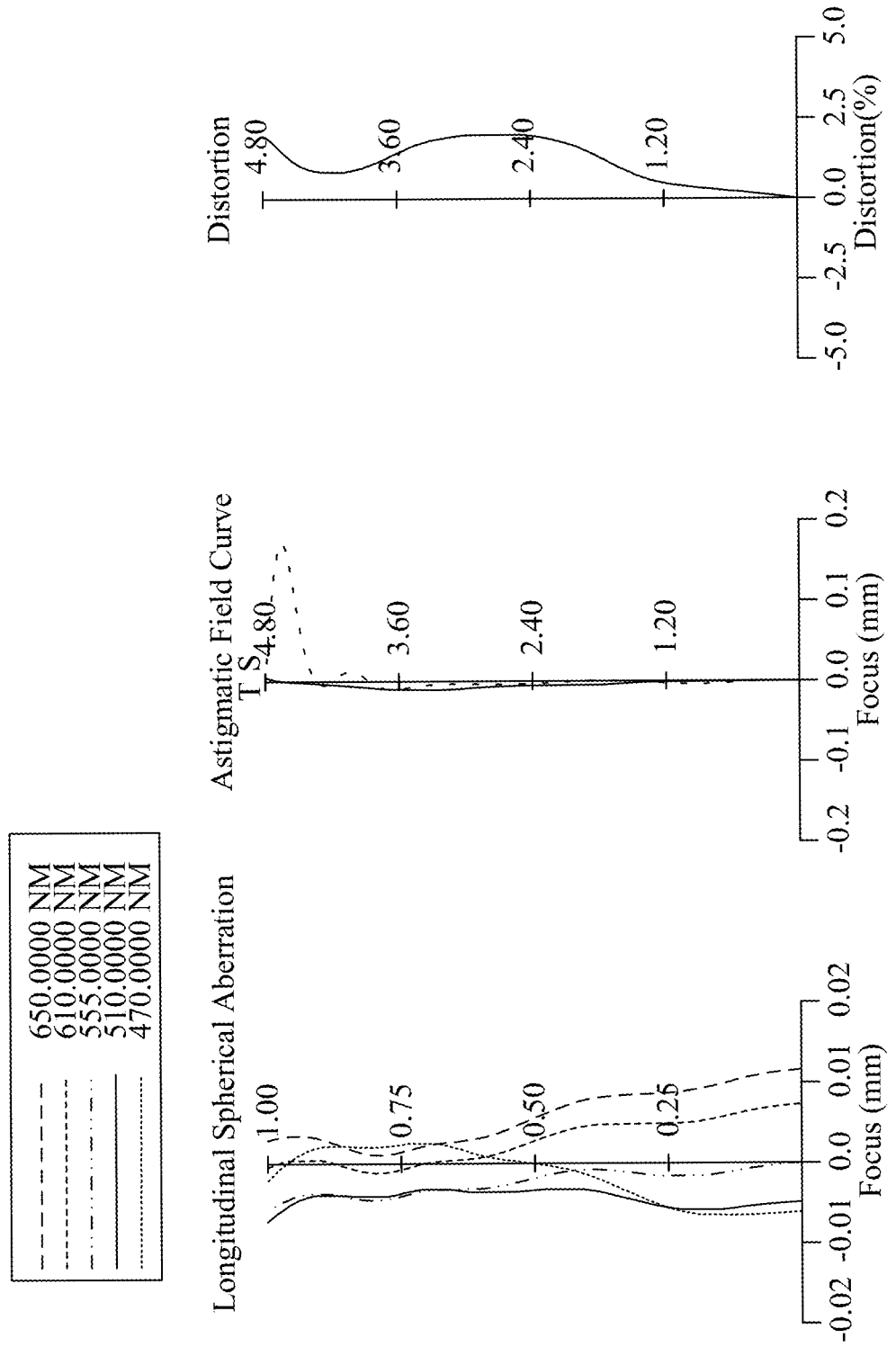

Referring to FIG. 8a and FIG. 8b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave at the optical axis and is convex at a periphery of the image-side surface S2 of the first lens L1.

The second lens L2 has a negative refractive power. An object-side surface S3 of the second lens L2 is convex. An image-side surface S4 of the second lens L2 is concave.

The third lens L3 has a negative refractive power. An object-side surface S5 of the third lens L3 is convex at the optical axis and is concave at a periphery of the object-side surface S5 of the third lens L3. An image-side surface S6 of the third lens L3 is concave.

The fourth lens L4 has a positive refractive power. An object-side surface S7 of the fourth lens L4 is convex at the optical axis and is concave at a periphery of the object-side surface S7 of the fourth lens L4. An image-side surface S8 of the fourth lens L4 is convex.

The fifth lens L5 has a positive refractive power. An object-side surface S9 of the fifth lens L5 is convex at the optical axis and is concave at a periphery of the object-side surface S9 of the fifth lens L5. An image-side surface S10 of the fifth lens L5 is concave at the optical axis and is convex at a periphery of the image-side surface S10 of the fifth lens L5.

The sixth lens L6 has a negative refractive power. An object-side surface S11 of the sixth lens L6 is convex at the optical axis and is concave at a periphery of the object-side surface S11 of the sixth lens L6. An image-side surface S12 of the sixth lens L6 is concave at the optical axis and is convex at a periphery of the image-side surface S12 of the sixth lens L6.

The seventh lens L7 has a negative refractive power. An object-side surface S13 of the seventh lens L7 is convex at the optical axis and is concave at a periphery of the object-side surface S13 of the seventh lens L7. An image-side surface S14 of the seventh lens L7 is concave at the optical axis and is convex at a periphery of the image-side surface S14 of the seventh lens L7.

The other structures of the optical system illustrated in FIG. 8a are identical with the optical system illustrated in FIG. 1a, reference can be made to the optical system illustrated in FIG. 1a.

Table 8a illustrates characteristics of the optical system in this implementation. Data in Table 8a is obtained based on light with a wavelength of 555 nm. Each of Y radius, thickness, and focal length is in units of millimeter (mm).

TABLE 8a

Optical System Illustrated in FIG. 8a
EFL = 5.62, FNO = 1.68, FOV = 79.86, TTL = 6.8

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.6284 | | | | |
| S1 | First | Aspherical | 2.4526 | 0.9010 | Plastic | 1.55 | 56.11 | 5.15 |
| S2 | lens | Aspherical | 16.6539 | 0.1000 | | | | |
| S3 | Second | Aspherical | 9.4095 | 0.3000 | Plastic | 1.67 | 20.38 | −9.82 |
| S4 | lens | Aspherical | 3.8110 | 0.2751 | | | | |
| S5 | Third | Aspherical | 6.3553 | 0.3000 | Plastic | 1.67 | 20.38 | −80.15 |
| S6 | lens | Aspherical | 5.5724 | 0.2640 | | | | |
| S7 | Fourth | Aspherical | 35.5201 | 0.7463 | Plastic | 1.55 | 56.11 | 13.13 |
| S8 | lens | Aspherical | −8.9175 | 0.6527 | | | | |
| S9 | Fifth | Aspherical | 5.3761 | 0.4429 | Plastic | 1.55 | 56.11 | 17.85 |
| S10 | lens | Aspherical | 11.6412 | 0.5220 | | | | |
| S11 | Sixth | Aspherical | 2.6267 | 0.3515 | Plastic | 1.55 | 56.11 | −499.55 |
| S12 | lens | Aspherical | 2.4787 | 0.8210 | | | | |
| S13 | Seventh | Aspherical | 4388.6941 | 0.4444 | Plastic | 1.54 | 55.75 | −5.09 |
| S14 | lens | Aspherical | 2.7304 | 0.2322 | | | | |
| S15 | Infrared | Spherical | Infinity | 0.2100 | Class | | | |
| S16 | cut-off filter | Spherical | Infinity | 0.2368 | | | | |
| S17 | Imaging plane | Spherical | Infinity | 0.0000 | | | | |

Note:
The reference wavelength is 555 nm

In Table 8a, EFL represents an effective focal length of the optical system. FNO represents an F-number of the optical system. FOV represents an angle of view of the optical system.

Table 8b shows higher-order coefficients that can be used for each aspherical lens of the optical system illustrated in FIG. 8a, where a shape of each aspherical lens surface can be defined by the formula given for the optical system illustrated in FIG. 1a.

TABLE 8b

| Surface Number | K | A4 | A6 | A8 | A10 | A12 | A14 | A16 | A18 | A20 |
|---|---|---|---|---|---|---|---|---|---|---|
| S1 | −0.67889 | 0.0053 | 0.0002 | 0.0003 | −0.0002 | −0.0001 | 0.0002 | −0.0001 | 0.0000 | 0.0000 |
| S2 | −39.8415 | −0.0125 | 0.0048 | −0.0020 | 0.0030 | −0.0032 | 0.0020 | −0.0007 | 0.0001 | 0.0000 |
| S3 | 11.3404 | −0.0185 | 0.0108 | −0.0090 | 0.0147 | −0.0151 | 0.0094 | −0.0035 | 0.0007 | −0.0001 |
| S4 | −1.03399 | −0.0047 | 0.0088 | −0.0099 | 0.0116 | −0.0075 | 0.0009 | 0.0017 | −0.0010 | 0.0002 |
| S5 | 0 | −0.0371 | 0.0017 | 0.0025 | −0.0130 | 0.0168 | −0.0119 | 0.0052 | −0.0013 | 0.0001 |
| S6 | −12.354 | −0.0304 | 0.0070 | −0.0051 | 0.0033 | −0.0032 | 0.0036 | −0.0020 | 0.0005 | −0.0001 |
| S7 | 99 | −0.0279 | −0.0079 | 0.0319 | −0.0700 | 0.0878 | −0.0679 | 0.0317 | −0.0082 | 0.0009 |
| S8 | 18.98434 | −0.0292 | −0.0015 | 0.0025 | −0.0023 | 0.0007 | 0.0002 | −0.0003 | 0.0001 | 0.0000 |
| S9 | −21.6674 | 0.0063 | −0.0100 | 0.0009 | 0.0008 | −0.0010 | 0.0004 | −0.0001 | 0.0000 | 0.0000 |
| S10 | 2.148333 | −0.0065 | −0.0011 | −0.0011 | 0.0002 | −0.0001 | 0.0000 | 0.0000 | 0.0000 | 0.0000 |
| S11 | −5.93718 | −0.0129 | −0.0059 | −0.0041 | 0.0029 | −0.0008 | 0.0001 | 0.0000 | 0.0000 | 0.0000 |
| S12 | −9.3428 | 0.0281 | −0.0263 | 0.0073 | −0.0011 | 0.0001 | 0.0000 | 0.0000 | 0.0000 | 0.0000 |
| S13 | 99 | −0.1289 | 0.0691 | −0.0218 | 0.0041 | −0.0005 | 0.0000 | 0.0000 | 0.0000 | 0.0000 |
| S14 | −0.99262 | −0.1320 | 0.0548 | −0.0148 | 0.0024 | −0.0002 | 0.0000 | 0.0000 | 0.0000 | 0.0000 |

FIG. 8b illustrates a longitudinal spherical aberration curve, an astigmatic field curve, and a distortion curve of the optical system illustrated in FIG. 8a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 8b, the optical system illustrated in FIG. 8a can achieve good imaging quality.

Figure 9A:
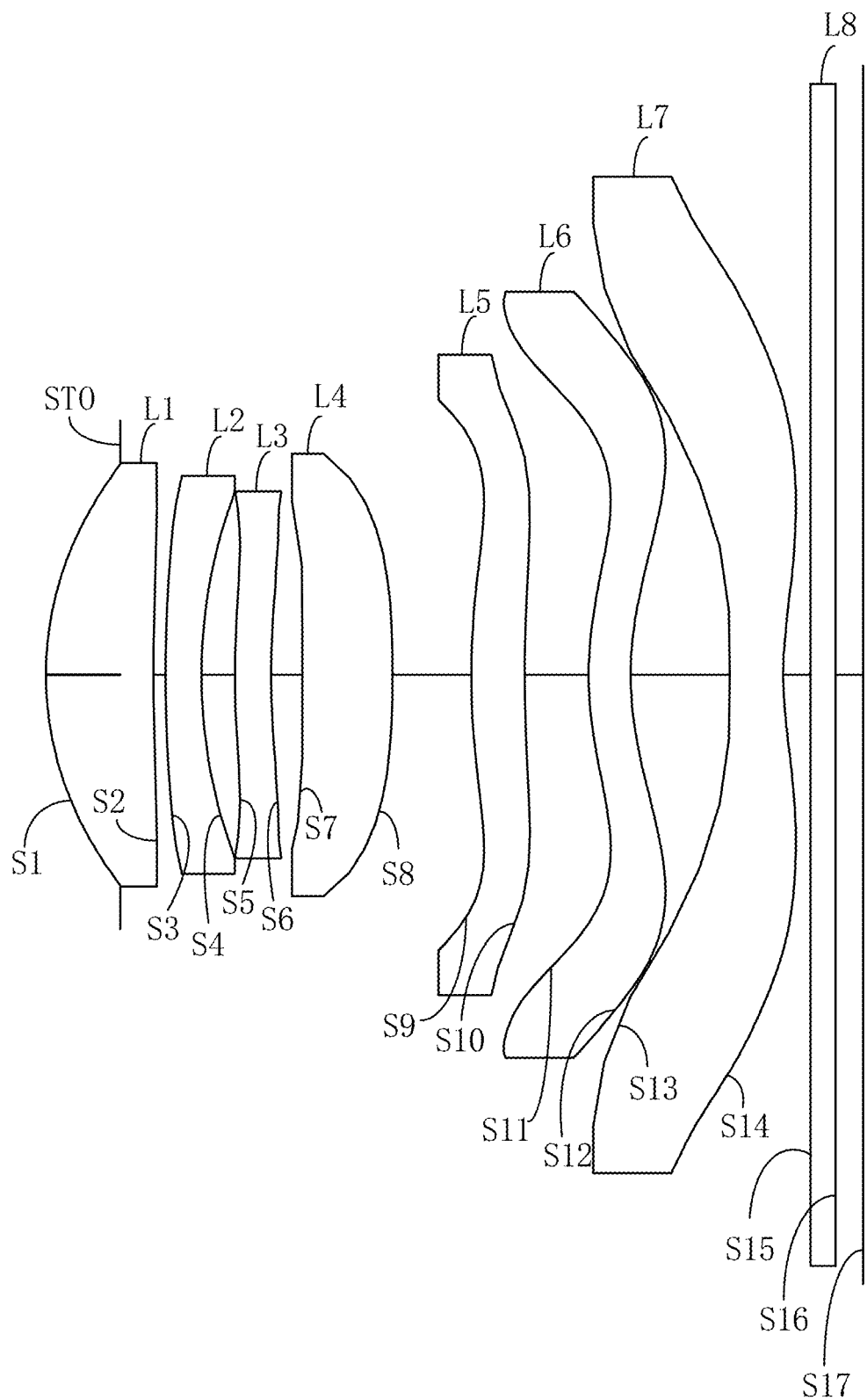
FIG. 9a is a schematic structural view of an optical system according to an implementation.
Figure 9B:
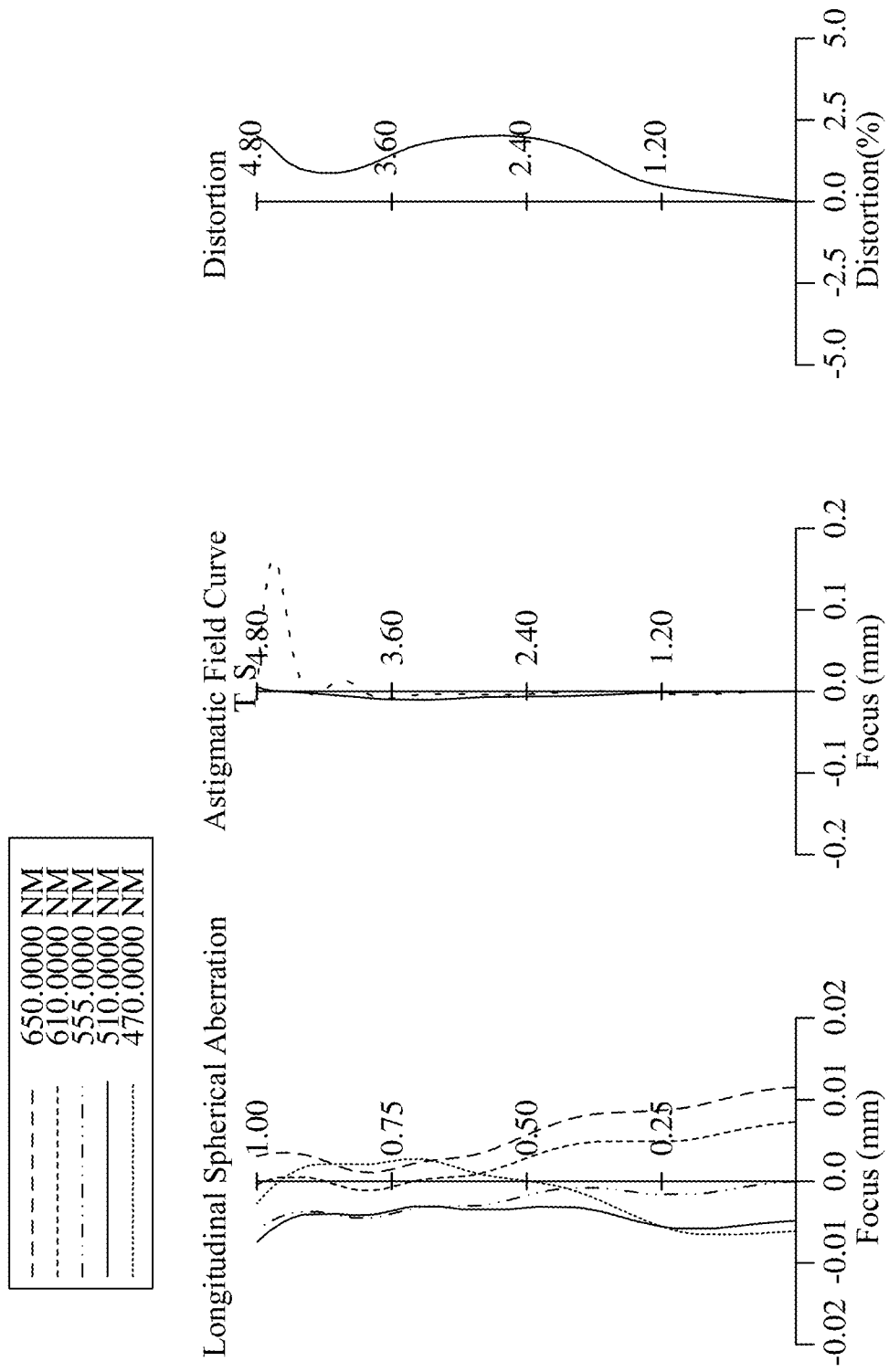

Referring to FIG. 9a and FIG. 9b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave at the optical axis and is convex at a periphery of the image-side surface S2 of the first lens L1.

The second lens L2 has a negative refractive power. An object-side surface S3 of the second lens L2 is convex. An image-side surface S4 of the second lens L2 is concave.

The third lens L3 has a negative refractive power. An object-side surface S5 of the third lens L3 is convex at the optical axis and is concave at a periphery of the object-side surface S5 of the third lens L3. An image-side surface S6 of the third lens L3 is concave.

The fourth lens L4 has a positive refractive power. An object-side surface S7 of the fourth lens L4 is convex at the optical axis and is concave at a periphery of the object-side surface S7 of the fourth lens L4. An image-side surface S8 of the fourth lens L4 is convex.

The fifth lens L5 has a positive refractive power. An object-side surface S9 of the fifth lens L5 is convex at the optical axis and is concave at a periphery of the object-side surface S9 of the fifth lens L5. An image-side surface S10 of the fifth lens L5 is concave at the optical axis and is convex at a periphery of the image-side surface S10 of the fifth lens L5.

The sixth lens L6 has a negative refractive power. An object-side surface S11 of the sixth lens L6 is convex at the optical axis and is concave at a periphery of the object-side surface S511 of the sixth lens L6. An image-side surface S512 of the sixth lens L6 is concave at the optical axis and is convex at a periphery of the image-side surface 12 of the sixth lens L6.

The seventh lens L7 has a negative refractive power. An object-side surface S13 of the seventh lens L7 is concave. An image-side surface S14 of the seventh lens L7 is concave at the optical axis and is convex at a periphery of the image-side surface S14 of the seventh lens L7.

The other structures of the optical system illustrated in FIG. 9a are identical with the optical system illustrated in FIG. 1a, reference can be made to the optical system illustrated in FIG. 1a.

Table 9a illustrates characteristics of the optical system in this implementation. Data in Table 9a is obtained based on light with a wavelength of 555 nm. Each of Y radius, thickness, and focal length is in units of millimeter (mm).

TABLE 9a

Optical System Illustrated in FIG. 9a
EFL = 5.61, FNO = 1.68, FOV = 80.00, TTL = 6.8

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.6204 | | | | |
| S1 | First lens | Aspherical | 2.4582 | 0.8944 | Plastic | 1.55 | 56.11 | 5.17 |
| S2 | | Aspherical | 16.5589 | 0.1000 | | | | |
| S3 | Second lens | Aspherical | 9.4157 | 0.3000 | Plastic | 1.67 | 20.38 | −9.93 |
| S4 | | Aspherical | 3.8364 | 0.2778 | | | | |
| S5 | Third lens | Aspherical | 6.4467 | 0.3000 | Plastic | 1.67 | 20.38 | −74.60 |
| S6 | | Aspherical | 5.6006 | 0.2618 | | | | |
| S7 | Fourth lens | Aspherical | 35.9781 | 0.7498 | Plastic | 1.55 | 56.11 | 12.96 |
| S8 | | Aspherical | −8.7383 | 0.6546 | | | | |

TABLE 9a-continued

Optical System Illustrated in FIG. 9a
EFL = 5.61, FNO = 1.68, FOV = 80.00, TTL = 6.8

| Surface Number | Surface Name | Surface Type | Y Radius | Thickness | Material | Refractive Index | Abbe Number | Focal length |
|---|---|---|---|---|---|---|---|---|
| S9 | Fifth lens | Aspherical | 5.3658 | 0.4461 | Plastic | 1.55 | 56.11 | 17.26 |
| S10 | | Aspherical | 12.0967 | 0.5309 | | | | |
| S11 | Sixth lens | Aspherical | 2.6471 | 0.3500 | Plastic | 1.55 | 56.11 | −240.00 |
| S12 | | Aspherical | 2.4735 | 0.8241 | | | | |
| S13 | Seventh lens | Aspherical | −124.6186 | 0.4452 | Plastic | 1.54 | 55.75 | −5.07 |
| S14 | | Aspherical | 2.7845 | 0.2254 | | | | |
| S15 | Infrared cut-off filter | Spherical | Infinity | 0.2100 | Class | | | |
| S16 | | Spherical | Infinity | 0.2300 | | | | |
| S17 | Imaging plane | Spherical | Infinity | 0.0000 | | | | |

Note:
The reference wavelength is 555 nm

In Table 9a, EFL represents an effective focal length of the optical system. FNO represents an F-number of the optical system. FOV represents an angle of view of the optical system.

Table 9b shows higher-order coefficients that can be used for each aspherical lens of the optical system illustrated in FIG. 9a, where a shape of each aspherical lens surface can be defined by the formula given for the optical system illustrated in FIG. 1a.

The second lens L2 has a negative refractive power. An object-side surface S3 of the second lens L2 is convex. An image-side surface S4 of the second lens L2 is concave.

The third lens L3 has a positive refractive power. An object-side surface S5 of the third lens L3 is convex. An image-side surface S6 of the third lens L3 is concave.

The fourth lens L4 has a positive refractive power. An object-side surface S7 of the fourth lens L4 is concave. An image-side surface S8 of the fourth lens L4 is convex.

TABLE 9b

| Surface Number | K | A4 | A6 | A8 | A10 | A12 | A14 | A16 | A18 | A20 |
|---|---|---|---|---|---|---|---|---|---|---|
| S1 | −0.6954 | 0.0054 | 0.0002 | 0.0003 | −0.0002 | −0.0001 | 0.0002 | −0.0001 | 0.0000 | 0.0000 |
| S2 | −44.4292 | −0.0126 | 0.0050 | −0.0023 | 0.0035 | −0.0038 | 0.0024 | −0.0009 | 0.0002 | 0.0000 |
| S3 | 11.9867 | −0.0185 | 0.0111 | −0.0094 | 0.0155 | −0.0162 | 0.0103 | −0.0039 | 0.0008 | −0.0001 |
| S4 | −0.9667 | −0.0047 | 0.0088 | −0.0100 | 0.0124 | −0.0089 | 0.0023 | 0.0010 | −0.0008 | 0.0002 |
| S5 | 0.0000 | −0.0374 | 0.0019 | 0.0022 | −0.0125 | 0.0166 | −0.0119 | 0.0053 | −0.0014 | 0.0002 |
| S6 | −12.7535 | −0.0305 | 0.0071 | −0.0056 | 0.0042 | −0.0040 | 0.0040 | −0.0020 | 0.0005 | −0.0001 |
| S7 | 99.0000 | −0.0277 | −0.0083 | 0.0330 | −0.0716 | 0.0893 | −0.0686 | 0.0318 | −0.0082 | 0.0009 |
| S8 | 18.5929 | −0.0289 | −0.0015 | 0.0024 | −0.0020 | 0.0003 | 0.0005 | −0.0003 | 0.0001 | 0.0000 |
| S9 | −20.9792 | 0.0068 | −0.0103 | 0.0010 | 0.0009 | −0.0010 | 0.0005 | −0.0001 | 0.0000 | 0.0000 |
| S10 | 3.2034 | −0.0045 | −0.0024 | −0.0004 | −0.0001 | 0.0000 | 0.0000 | 0.0000 | 0.0000 | 0.0000 |
| S11 | −6.0188 | −0.0127 | −0.0069 | −0.0032 | 0.0025 | −0.0008 | 0.0001 | 0.0000 | 0.0000 | 0.0000 |
| S12 | −9.2245 | 0.0274 | −0.0271 | 0.0084 | −0.0016 | 0.0002 | 0.0000 | 0.0000 | 0.0000 | 0.0000 |
| S13 | −99.0000 | −0.1240 | 0.0656 | −0.0204 | 0.0038 | −0.0004 | 0.0000 | 0.0000 | 0.0000 | 0.0000 |
| S14 | −0.9676 | −0.1275 | 0.0520 | −0.0138 | 0.0022 | −0.0002 | 0.0000 | 0.0000 | 0.0000 | 0.0000 |

FIG. 9b illustrates a longitudinal spherical aberration curve, an astigmatic field curve, and a distortion curve of the optical system illustrated in FIG. 9a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 9b, the optical system illustrated in FIG. 9a can achieve good imaging quality.

Figure 10A:
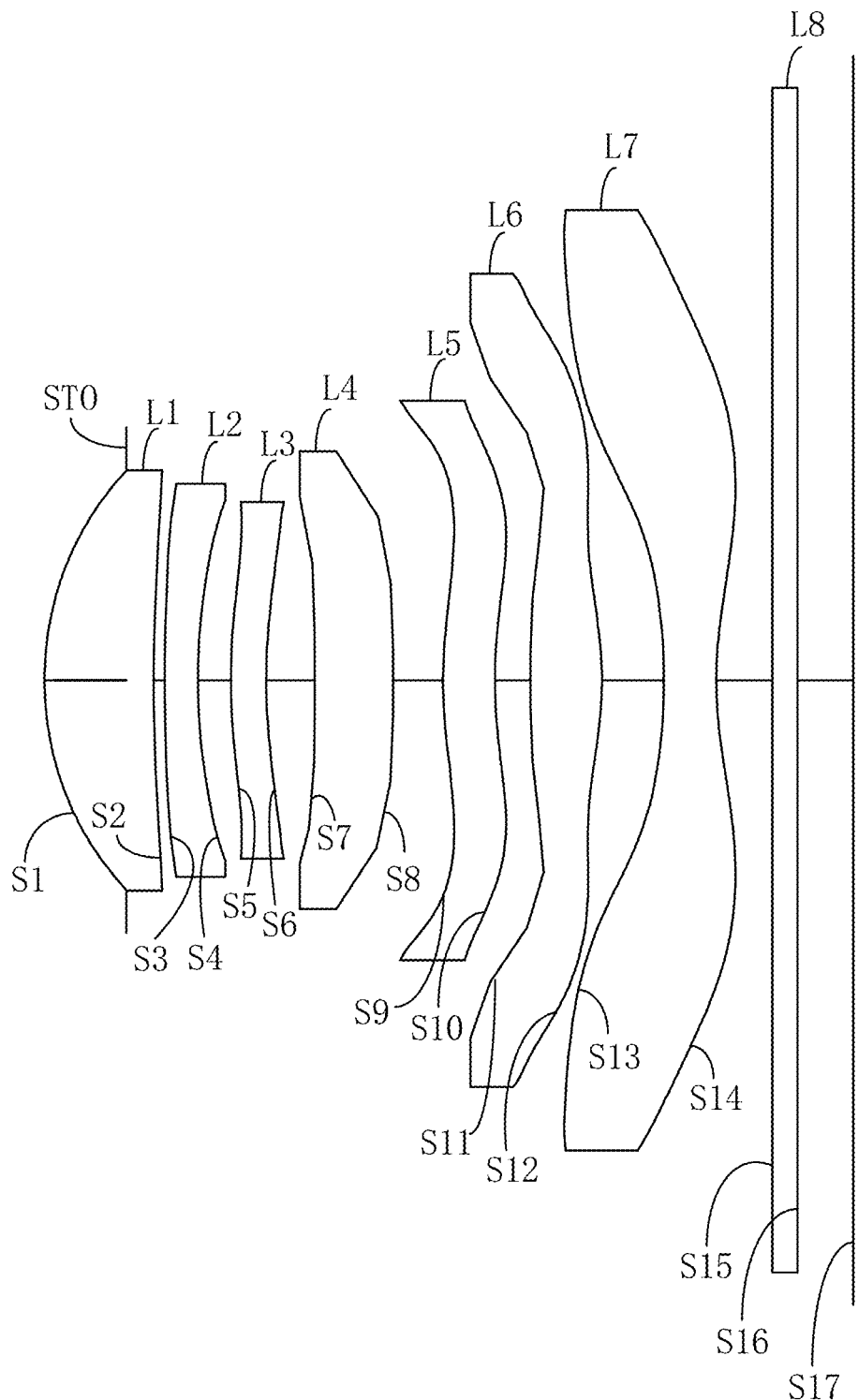
FIG. 10a is a schematic structural view of an optical system according to an implementation.
Figure 10B:
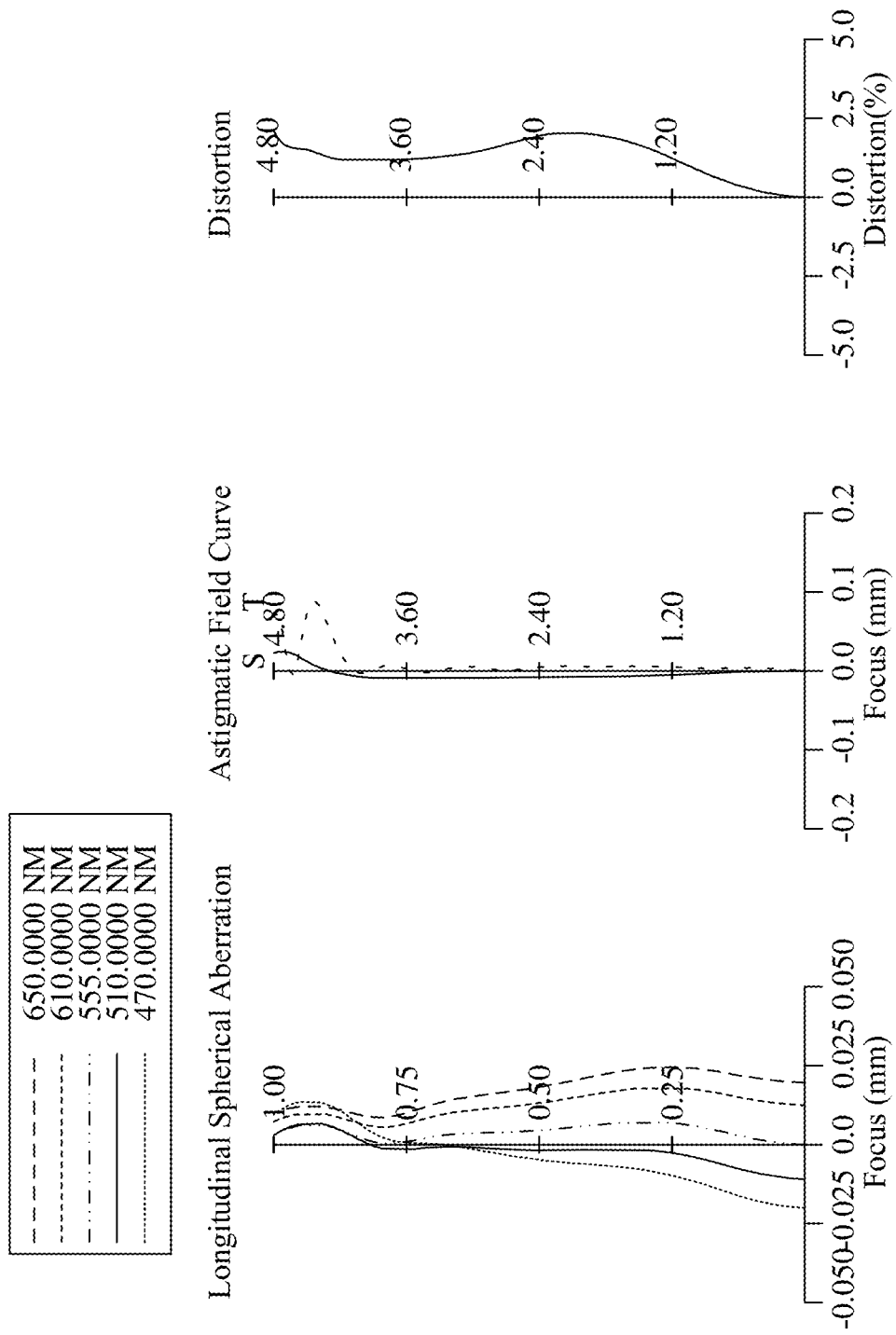

Referring to FIG. 10a and FIG. 10b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave.

The fifth lens L5 has a positive refractive power. An object-side surface S9 of the fifth lens L5 is convex at the optical axis and is concave at a periphery of the object-side surface S9 of the fifth lens L5. An image-side surface S10 of the fifth lens L5 is concave at the optical axis and is convex at a periphery of the image-side surface S10 of the fifth lens L5.

The sixth lens L6 has a positive refractive power. An object-side surface S11 of the sixth lens L6 is convex at the optical axis and is concave at a periphery of the object-side surface S11 of the sixth lens L6. An image-side surface S12 of the sixth lens L6 is convex.

The seventh lens L7 has a negative refractive power. An object-side surface S13 of the seventh lens L7 is concave at the optical axis and is convex at a periphery of the object-side surface S13 of the seventh lens L7. An image-side surface S14 of the seventh lens L7 is concave at the optical axis and is convex at a periphery of the image-side surface S14 of the seventh lens L7.

The other structures of the optical system illustrated in FIG. 10a are identical with the optical system illustrated in FIG. 1a, reference can be made to the optical system illustrated in FIG. 1a.

Table 10a illustrates characteristics of the optical system in this implementation. Data in Table 10a is obtained based on light with a wavelength of 555 nm. Each of Y radius, thickness, and focal length is in units of millimeter (mm).

spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 10b, the optical system illustrated in FIG. 10a can achieve good imaging quality.

TABLE 10a

Optical System Illustrated in FIG. 10a
EFL = 5 54, FNO = 1.75, FOV = 80.60, TTL = 6.69

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.6785 | | | | |
| S1 | First | Aspherical | 2.2658 | 0.9022 | Plastic | 1.55 | 56.11 | 5.00 |
| S2 | lens | Aspherical | 11.4215 | 0.0917 | | | | |
| S3 | Second | Aspherical | 12.2170 | 0.2751 | Plastic | 1.67 | 20.38 | −10.47 |
| S4 | lens | Aspherical | 4.4008 | 0.2720 | | | | |
| S5 | Third | Aspherical | 4.1188 | 0.2924 | Plastic | 1.67 | 20.38 | 107.77 |
| S6 | lens | Aspherical | 4.2452 | 0.4017 | | | | |
| S7 | Fourth | Aspherical | −92.5055 | 0.6496 | Plastic | 1.55 | 56.11 | 78.96 |
| S8 | lens | Aspherical | −29.4770 | 0.4113 | | | | |
| S9 | Fifth | Aspherical | 3.3025 | 0.4276 | Plastic | 1.55 | 56.11 | 106.31 |
| S10 | lens | Aspherical | 3.3416 | 0.2946 | | | | |
| S11 | Sixth | Aspherical | 18.9883 | 0.5912 | Plastic | 1.55 | 56.11 | 4.06 |
| S12 | lens | Aspherical | −2.4803 | 0.5140 | | | | |
| S13 | Seventh | Aspherical | −3.9523 | 0.4318 | Plastic | 1.54 | 55.75 | −3.02 |
| S14 | lens | Aspherical | 2.8461 | 0.4612 | | | | |
| S15 | Infrared | Spherical | Infinity | 0.2100 | Class | | | |
| S16 | cut-off filter | Spherical | Infinity | 0.4636 | | | | |
| S17 | Imaging plane | Spherical | Infinity | 0.0000 | | | | |

Note:
The reference wavelength is 555 nm

In Table 10a, EFL represents an effective focal length of the optical system. FNO represents an F-number of the optical system. FOV represents an angle of view of the optical system.

Table 10b shows higher-order coefficients that can be used for each aspherical lens of the optical system illustrated in FIG. 10a, where a shape of each aspherical lens surface can be defined by the formula given for the optical system illustrated in FIG. 1a.

Figure 11A:
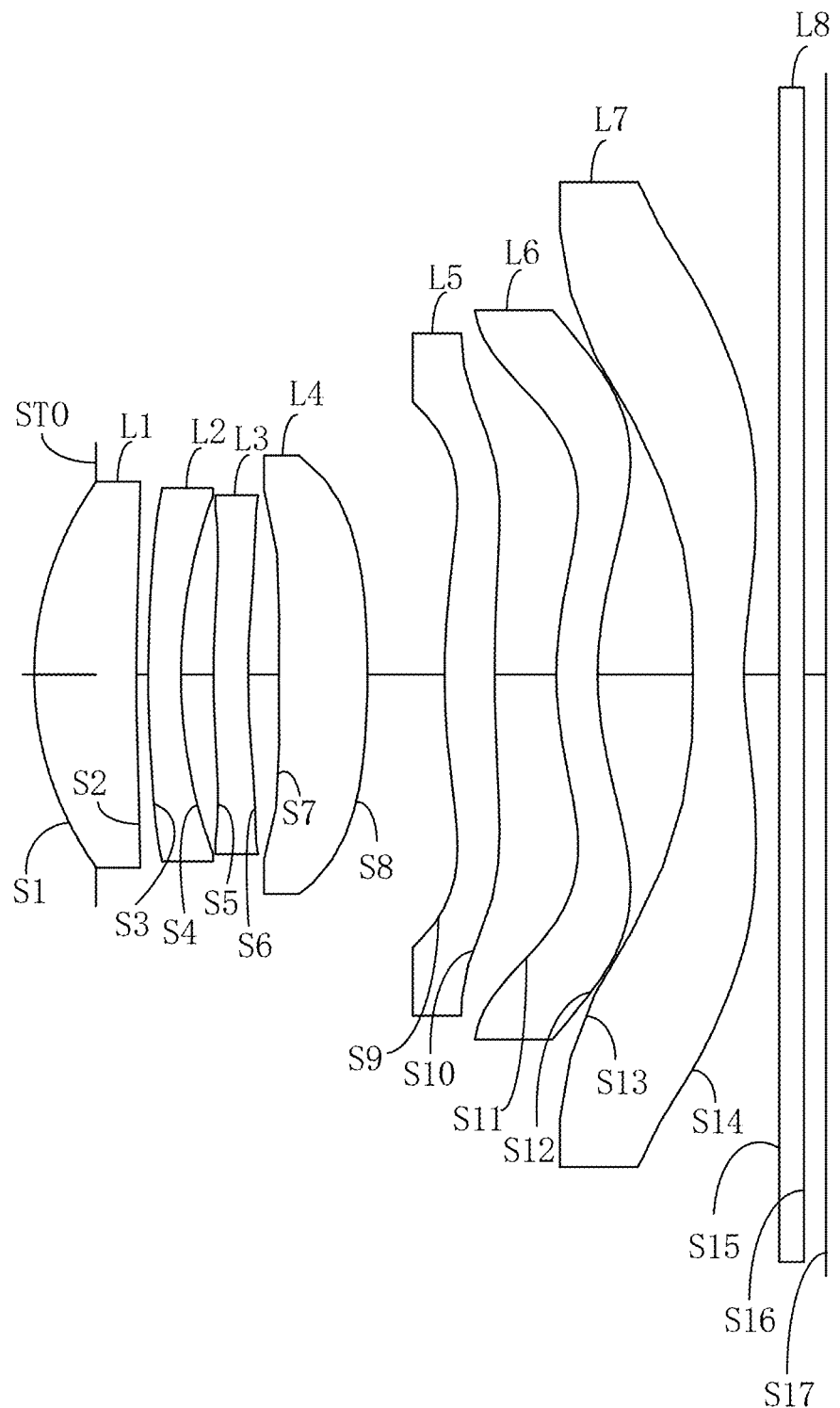
FIG. 11a is a schematic structural view of an optical system according to an implementation.
Figure 11B:
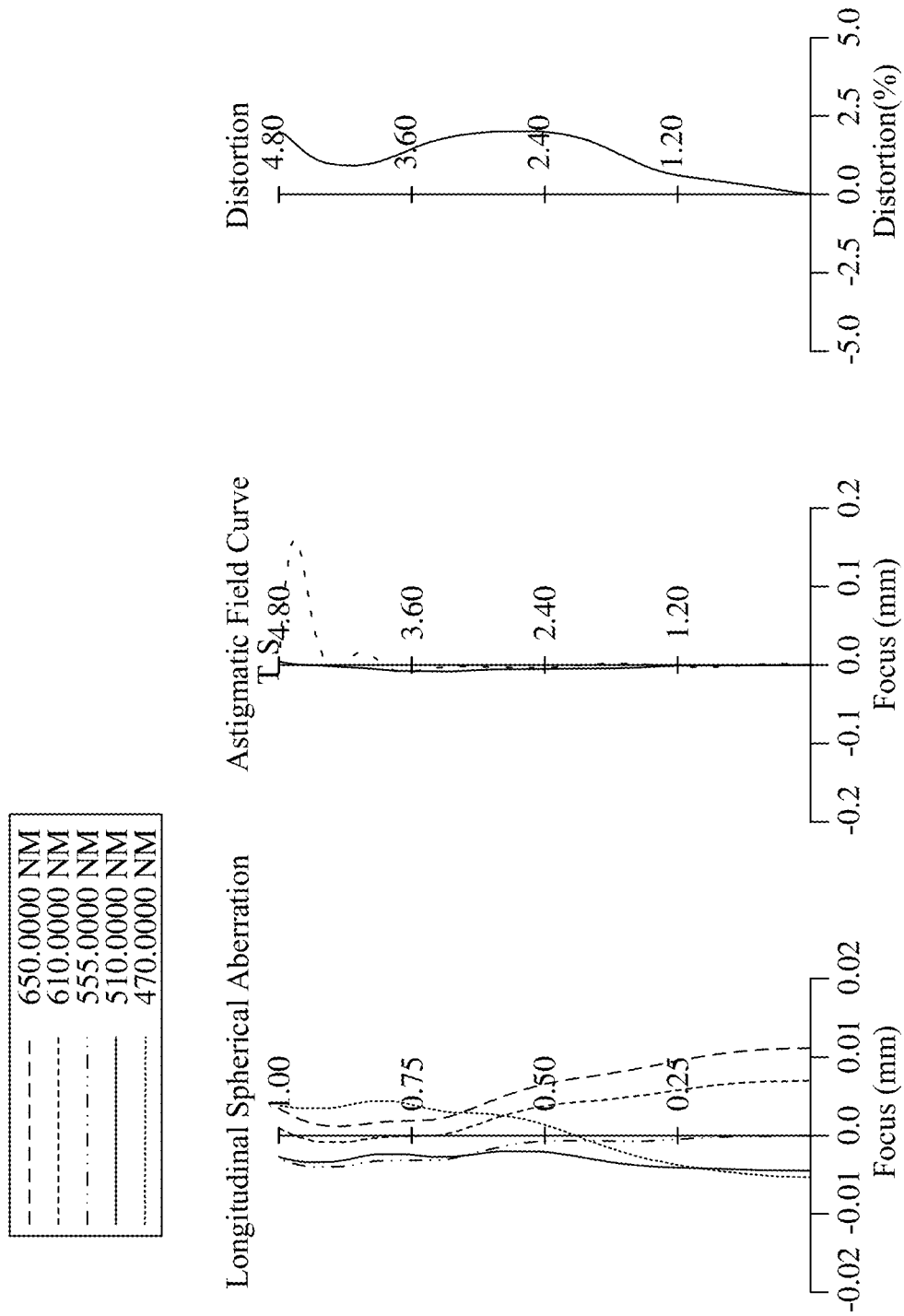

Referring to FIG. 11a and FIG. 11b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An TABLE 10b

| Surface Number | K | A4 | A6 | A8 | A10 | A12 | A14 | A16 | A18 | A20 |
|---|---|---|---|---|---|---|---|---|---|---|
| S1 | −0.4812 | 0.0056 | 0.0022 | −0.0039 | 0.0077 | −0.0086 | 0.0058 | −0.0023 | 0.0005 | 0.0000 |
| S2 | 6.9763 | −0.0219 | 0.0212 | −0.0190 | 0.0202 | −0.0209 | 0.0148 | −0.0063 | 0.0015 | −0.0001 |
| S3 | 5.8591 | −0.0323 | 0.0421 | −0.0287 | 0.0148 | −0.0105 | 0.0086 | −0.0045 | 0.0013 | −0.0001 |
| S4 | −0.4022 | −0.0226 | 0.0301 | −0.0117 | −0.0031 | −0.0026 | 0.0123 | −0.0104 | 0.0038 | −0.0005 |
| S5 | 0.0000 | −0.0460 | 0.0165 | −0.0333 | 0.0398 | −0.0305 | 0.0130 | −0.0022 | −0.0001 | 0.0000 |
| S6 | −3.9014 | −0.0255 | 0.0149 | −0.0318 | 0.0376 | −0.0239 | 0.0059 | 0.0018 | −0.0013 | 0.0002 |
| S7 | −70.1826 | −0.0253 | 0.0161 | −0.0419 | 0.0672 | −0.0742 | 0.0516 | −0.0216 | 0.0049 | −0.0005 |
| S8 | 61.8138 | −0.0516 | 0.0250 | −0.0229 | 0.0135 | −0.0046 | 0.0000 | 0.0006 | −0.0002 | 0.0000 |
| S9 | −9.7197 | −0.0490 | 0.0094 | −0.0122 | 0.0161 | −0.0115 | 0.0046 | −0.0011 | 0.0001 | 0.0000 |
| S10 | −2.6900 | −0.0467 | 0.0014 | −0.0209 | 0.0199 | −0.0088 | 0.0023 | −0.0003 | 0.0000 | 0.0000 |
| S11 | −19.8695 | 0.0487 | 0.0034 | −0.0292 | 0.0173 | −0.0058 | 0.0012 | −0.0002 | 0.0000 | 0.0000 |
| S12 | −9.9253 | 0.0410 | 0.0223 | −0.0213 | 0.0066 | −0.0011 | 0.0001 | 0.0000 | 0.0000 | 0.0000 |
| S13 | −9.0430 | 0.0117 | −0.0519 | 0.0276 | −0.0069 | 0.0010 | −0.0001 | 0.0000 | 0.0000 | 0.0000 |
| S14 | −0.9532 | −0.0637 | 0.0056 | 0.0025 | −0.0012 | 0.0002 | 0.0000 | 0.0000 | 0.0000 | 0.0000 |

FIG. 10b illustrates a longitudinal spherical aberration curve, an astigmatic field curve, and a distortion curve of the optical system illustrated in FIG. 10a. The longitudinal image-side surface S2 of the first lens L1 is concave at the optical axis and is convex at a periphery of the image-side surface S2 of the first lens L1.

The second lens L2 has a negative refractive power. An object-side surface S3 of the second lens L2 is convex. An image-side surface S4 of the second lens L2 is concave.

The third lens L3 has a negative refractive power. An object-side surface S5 of the third lens L3 is convex. An image-side surface S6 of the third lens L3 is concave.

The fourth lens L4 has a positive refractive power. An object-side surface S7 of the fourth lens L4 is convex at the optical axis and is concave at a periphery of the object-side surface S7 of the fourth lens L4. An image-side surface S8 of the fourth lens L4 is convex.

The fifth lens L5 has a positive refractive power. An object-side surface S9 of the fifth lens L5 is convex at the optical axis and is concave at a periphery of the object-side surface S9 of the fifth lens L5. An image-side surface S10 of the fifth lens L5 is concave at the optical axis and is convex at a periphery of the image-side surface S10 of the fifth lens L5.

The sixth lens L6 has a positive refractive power. An object-side surface S11 of the sixth lens L6 is convex at the optical axis and is concave at a periphery of the object-side surface S11 of the sixth lens L6. An image-side surface S12 of the sixth lens L6 is concave at the optical axis and is convex at a periphery of the image-side surface S12 of the sixth lens L6.

The seventh lens L7 has a negative refractive power. An object-side surface S13 of the seventh lens L7 is concave. An image-side surface S14 of the seventh lens L7 is concave at the optical axis and is convex at a periphery of the image-side surface S14 of the seventh lens L7.

The other structures of the optical system illustrated in FIG. 11a are identical with the optical system illustrated in FIG. 1a, reference can be made to the optical system illustrated in FIG. 1a.

Table 11a illustrates characteristics of the optical system in this implementation. Data in Table 11a is obtained based on light with a wavelength of 555 nm. Each of Y radius, thickness, and focal length is in units of millimeter (mm).

TABLE 11a

Optical System Illustrated in FIG. 11a
EFL = 5.61, FNO = 1.82, FOV = 80.00, TTL = 6.8

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.5320 | | | | |
| S1 | First lens | Aspherical | 2.4494 | 0.8783 | Plastic | 1.55 | 56.11 | 5.17 |
| S2 | | Aspherical | 16.2105 | 0.1021 | | | | |
| S3 | Second lens | Aspherical | 9.2668 | 0.2813 | Plastic | 1.67 | 20.38 | −10.02 |
| S4 | | Aspherical | 3.8343 | 0.2796 | | | | |
| S5 | Third lens | Aspherical | 6.6553 | 0.2973 | Plastic | 1.67 | 20.38 | −64.96 |
| S6 | | Aspherical | 5.6655 | 0.2630 | | | | |
| S7 | Fourth lens | Aspherical | 39.4167 | 0.7604 | Plastic | 1.55 | 56.11 | 12.91 |
| S8 | | Aspherical | −8.5228 | 0.6630 | | | | |
| S9 | Fifth lens | Aspherical | 5.3545 | 0.4299 | Plastic | 1.55 | 56.11 | 17.39 |
| S10 | | Aspherical | 11.9354 | 0.5305 | | | | |
| S11 | Sixth lens | Aspherical | 2.6474 | 0.3541 | Plastic | 1.55 | 56.11 | 575.86 |
| S12 | | Aspherical | 2.5438 | 0.8177 | | | | |
| S13 | Seventh lens | Aspherical | −104.2877 | 0.4386 | Plastic | 1.54 | 55.75 | −5.09 |
| S14 | | Aspherical | 2.8120 | 0.3031 | | | | |
| S15 | Infrared cut-off filter | Spherical | Infinity | 0.2100 | Class | | | |
| S16 | | Spherical | Infinity | 0.1910 | | | | |
| S17 | Imaging plane | Spherical | Infinity | 0.0000 | | | | |

Note:
The reference wavelength is 555 nm

In Table 11a, EFL represents an effective focal length of the optical system. FNO represents an F-number of the optical system. FOV represents an angle of view of the optical system.

Table 11b shows higher-order coefficients that can be used for each aspherical lens of the optical system illustrated in FIG. 11a, where a shape of each aspherical lens surface can be defined by the formula given for the optical system illustrated in FIG. 1a.

TABLE 11b

| Surface Number | K | A4 | A6 | A8 | A10 | A12 | A14 | A16 | A18 | A20 |
|---|---|---|---|---|---|---|---|---|---|---|
| S1 | −0.6762 | 0.0054 | 0.0000 | 0.0016 | −0.0030 | 0.0032 | −0.0021 | 0.0008 | −0.0002 | 0.0000 |
| S2 | −43.6163 | −0.0126 | 0.0004 | 0.0131 | −0.0223 | 0.0226 | −0.0146 | 0.0057 | −0.0012 | 0.0001 |
| S3 | 11.7188 | −0.0191 | 0.0060 | 0.0086 | −0.0145 | 0.0144 | −0.0094 | 0.0038 | −0.0009 | 0.0001 |
| S4 | −0.8173 | −0.0042 | 0.0029 | 0.0089 | −0.0213 | 0.0281 | −0.0229 | 0.0112 | −0.0031 | 0.0004 |
| S5 | 0.0000 | −0.0372 | 0.0050 | −0.0138 | 0.0212 | −0.0243 | 0.0181 | −0.0079 | 0.0019 | −0.0002 |

TABLE 11b-continued

| Surface Number | K | A4 | A6 | A8 | A10 | A12 | A14 | A16 | A18 | A20 |
|---|---|---|---|---|---|---|---|---|---|---|
| S6 | −13.0648 | −0.0305 | 0.0088 | −0.0120 | 0.0144 | −0.0131 | 0.0088 | −0.0036 | 0.0008 | −0.0001 |
| S7 | 25.6561 | −0.0285 | −0.0038 | 0.0174 | −0.0401 | 0.0501 | −0.0385 | 0.0179 | −0.0046 | 0.0005 |
| S8 | 18.0274 | −0.0296 | 0.0012 | −0.0038 | 0.0060 | −0.0059 | 0.0034 | −0.0012 | 0.0002 | 0.0000 |
| S9 | −20.1036 | 0.0080 | −0.0124 | 0.0034 | −0.0005 | −0.0005 | 0.0003 | −0.0001 | 0.0000 | 0.0000 |
| S10 | 3.3996 | −0.0039 | −0.0052 | 0.0026 | −0.0018 | 0.0005 | −0.0001 | 0.0000 | 0.0000 | 0.0000 |
| S11 | −6.0132 | −0.0125 | −0.0069 | −0.0031 | 0.0025 | −0.0008 | 0.0001 | 0.0000 | 0.0000 | 0.0000 |
| S12 | −9.3790 | 0.0250 | −0.0247 | 0.0072 | −0.0012 | 0.0001 | 0.0000 | 0.0000 | 0.0000 | 0.0000 |
| S13 | −99.0000 | −0.1278 | 0.0688 | −0.0217 | 0.0041 | −0.0005 | 0.0000 | 0.0000 | 0.0000 | 0.0000 |
| S14 | −0.9608 | −0.1278 | 0.0533 | −0.0145 | 0.0024 | −0.0002 | 0.0000 | 0.0000 | 0.0000 | 0.0000 |

FIG. 11b illustrates a longitudinal spherical aberration curve, an astigmatic field curve, and a distortion curve of the optical system illustrated in FIG. 10a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 11b, the optical system illustrated in FIG. 11a can achieve good imaging quality.

Figure 12A:
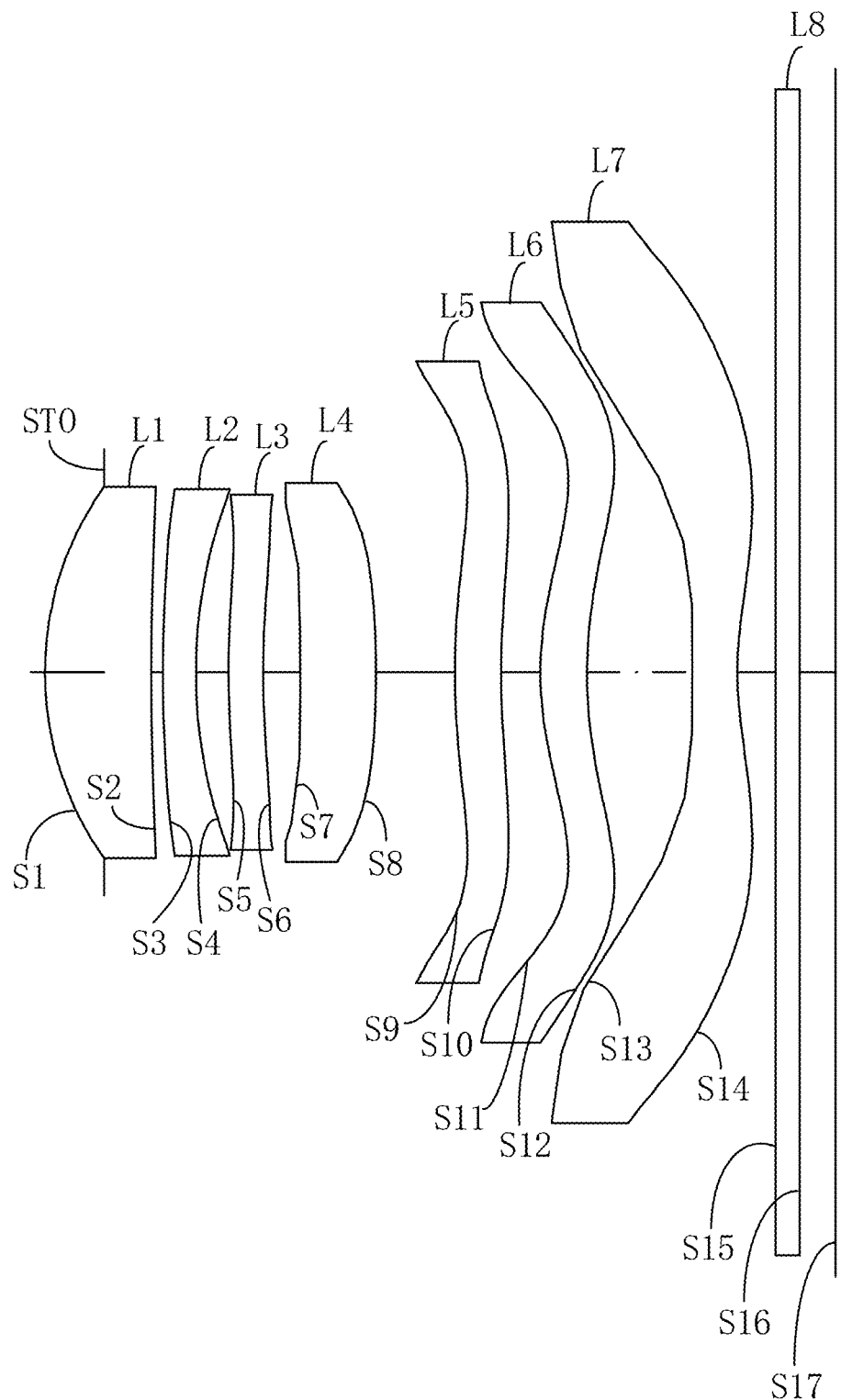
FIG. 12a is a schematic structural view of an optical system according to an implementation.
Figure 12B:
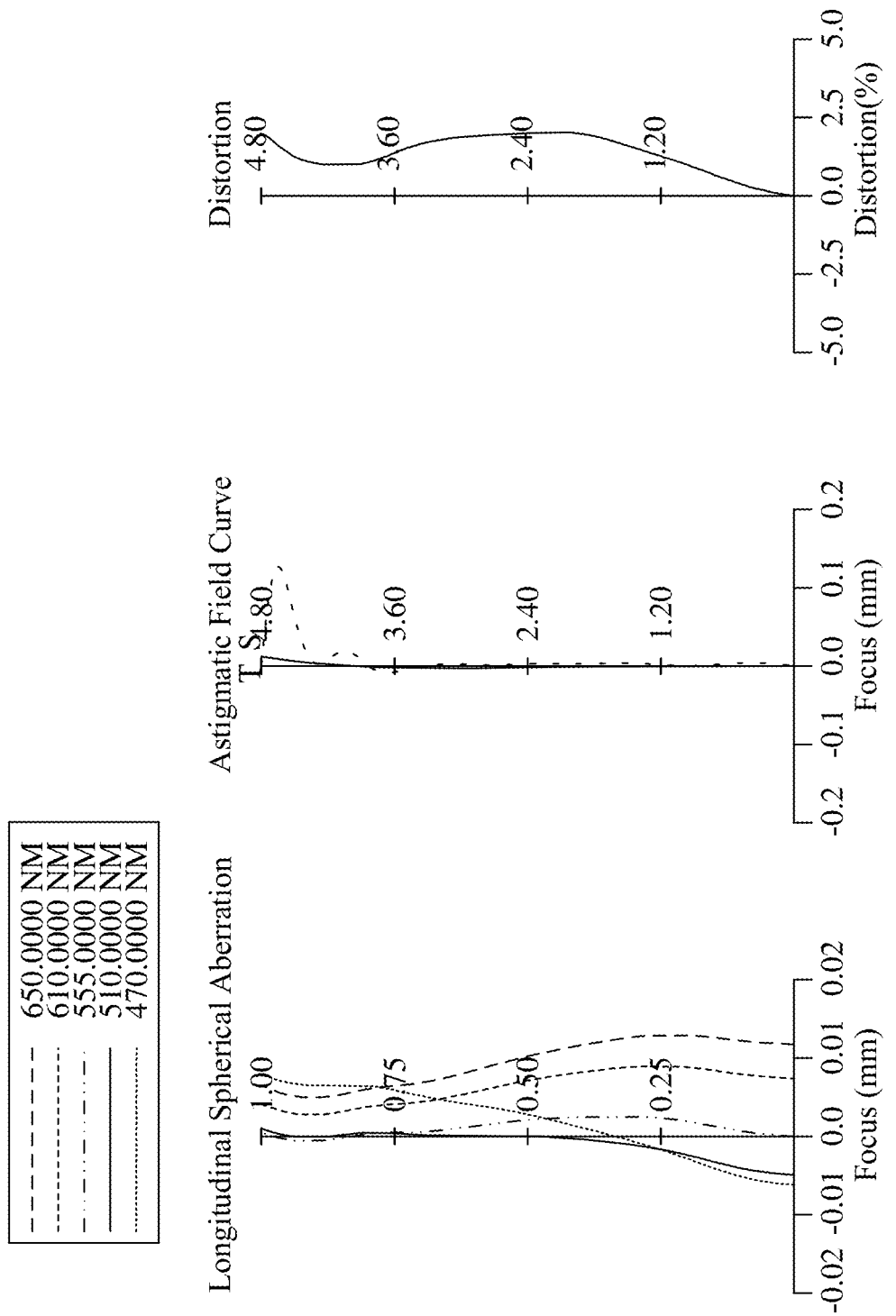

Referring to FIG. 12a and FIG. 12b, an optical system in this implementation includes, in order from an object side to an image side along an optical axis, a first lens L1, a second lens L2, a third lens L3, a fourth lens L4, a fifth lens L5, a sixth lens L6, and a seventh lens L7.

The first lens L1 has a positive refractive power. An object-side surface S1 of the first lens L1 is convex. An image-side surface S2 of the first lens L1 is concave.

The second lens L2 has a negative refractive power. An object-side surface S3 of the second lens L2 is convex. An image-side surface S4 of the second lens L2 is concave.

The third lens L3 has a negative refractive power. An object-side surface S5 of the third lens L3 is convex. An image-side surface S6 of the third lens L3 is concave.

The fourth lens L4 has a positive refractive power. An object-side surface S7 of the fourth lens L4 is convex at the optical axis and is concave at a periphery of the object-side surface S7 of the fourth lens L4. An image-side surface S8 of the fourth lens L4 is convex.

The fifth lens L5 has a positive refractive power. An object-side surface S9 of the fifth lens L5 is convex at the optical axis and is concave at a periphery of the object-side surface S9 of the fifth lens L5. An image-side surface S10 of the fifth lens L5 is concave.

The sixth lens L6 has a positive refractive power. An object-side surface S11 of the sixth lens L6 is convex at the optical axis and is concave at a periphery of the object-side surface S11 of the sixth lens L6. An image-side surface S12 of the sixth lens L6 is concave at the optical axis and is convex at a periphery of the image-side surface S12 of the sixth lens L6.

The seventh lens L7 has a negative refractive power. An object-side surface S13 of the seventh lens L7 is convex at the optical axis and is concave at a periphery of the object-side surface S13 of the seventh lens L7. An image-side surface S14 of the seventh lens L7 is concave at the optical axis and is convex at a periphery of the image-side surface S14 of the seventh lens L7.

The other structures of the optical system illustrated in FIG. 12a are identical with the optical system illustrated in FIG. 1a, reference can be made to the optical system illustrated in FIG. 1a.

Table 12a illustrates characteristics of the optical system in this implementation. Data in Table 12a is obtained based on light with a wavelength of 555 nm. Each of Y radius, thickness, and focal length is in units of millimeter (mm).

TABLE 12a

Optical System Illustrated in FIG. 12a
EFL = 5.67, FNO = 1.92, FOV = 79.34, TTL = 6.8

| Surface Number | Surface Name | Surface Type | Y Radius | Thickness | Material | Refractive Index | Abbe Number | Focal length |
|---|---|---|---|---|---|---|---|---|
| Object surface | Object surface | Spherical | Infinity | Infinity | | | | |
| STO | Stop | Spherical | Infinity | −0.5094 | | | | |
| S1 | First lens | Aspherical | 2.3892 | 0.9125 | Plastic | 1.55 | 56.11 | 4.99 |
| S2 | | Aspherical | 16.7257 | 0.1000 | | | | |
| S3 | Second lens | Aspherical | 8.8915 | 0.2850 | Plastic | 1.67 | 20.38 | −9.03 |
| S4 | | Aspherical | 3.5424 | 0.2810 | | | | |
| S5 | Third lens | Aspherical | 6.4419 | 0.2983 | Plastic | 1.67 | 20.38 | −315.10 |
| S6 | | Aspherical | 6.1345 | 0.3182 | | | | |
| S7 | Fourth lens | Aspherical | 1636.0215 | 0.6522 | Plastic | 1.55 | 56.11 | 16.39 |
| S8 | | Aspherical | −8.9934 | 0.6778 | | | | |
| S9 | Fifth lens | Aspherical | 5.1024 | 0.3980 | Plastic | 1.55 | 56.11 | 123.21 |
| S10 | | Aspherical | 5.3691 | 0.3385 | | | | |
| S11 | Sixth lens | Aspherical | 2.4529 | 0.4016 | Plastic | 1.55 | 56.11 | 12.49 |
| S12 | | Aspherical | 3.6102 | 0.9078 | | | | |
| S13 | Seventh lens | Aspherical | 44.9844 | 0.3858 | Plastic | 1.54 | 55.75 | −5.11 |
| S14 | | Aspherical | 2.5765 | 0.3271 | | | | |
| S15 | Infrared cut-off filter | Spherical | Infinity | 0.2100 | Class | | | |
| S16 | | Spherical | Infinity | 0.3063 | | | | |

TABLE 12a-continued

Optical System Illustrated in FIG. 12a
EFL = 5.67, FNO = 1.92, FOV = 79.34, TTL = 6.8

| Surface Number | Surface Name | Surface Type | Y Radius | Thickness | Material | Refractive Index | Abbe Number | Focal length |
|---|---|---|---|---|---|---|---|---|
| S17 | Imaging plane | Spherical | Infinity | 0.0000 | | | | |

Note:
The reference wavelength is 555 nm.

In Table 12a, EFL represents an effective focal length of the optical system. FNO represents an F-number of the optical system. FOV represents an angle of view of the optical system.

Table 12b shows higher-order coefficients that can be used for each aspherical lens of the optical system illustrated in FIG. 12a, where a shape of each aspherical lens surface can be defined by the formula given for the optical system illustrated in FIG. 1a.

TABLE 12b

| Surface Number | K | A4 | A6 | A8 | A10 | A12 | A14 | A16 | A18 | A20 |
|---|---|---|---|---|---|---|---|---|---|---|
| S1 | −0.5466 | 0.0046 | 0.0031 | −0.0054 | 0.0073 | −0.0059 | 0.0029 | −0.0008 | 0.0001 | 0.0000 |
| S2 | 5.9640 | −0.0157 | 0.0116 | −0.0041 | −0.0035 | 0.0074 | −0.0062 | 0.0029 | −0.0007 | 0.0001 |
| S3 | 5.7670 | −0.0275 | 0.0232 | −0.0106 | 0.0000 | 0.0052 | −0.0043 | 0.0017 | −0.0003 | 0.0000 |
| S4 | −1.4293 | −0.0123 | 0.0183 | −0.0144 | 0.0145 | −0.0170 | 0.0149 | −0.0078 | 0.0022 | −0.0002 |
| S5 | 0.0000 | −0.0355 | 0.0065 | −0.0120 | 0.0117 | −0.0081 | 0.0029 | 0.0003 | −0.0005 | 0.0001 |
| S6 | −8.9095 | −0.0301 | 0.0124 | −0.0243 | 0.0367 | −0.0376 | 0.0256 | −0.0107 | 0.0026 | −0.0003 |
| S7 | −99.0000 | −0.0322 | 0.0000 | 0.0029 | −0.0168 | 0.0251 | −0.0209 | 0.0101 | −0.0027 | 0.0003 |
| S8 | 17.5722 | −0.0332 | 0.0024 | −0.0010 | −0.0041 | 0.0056 | −0.0036 | 0.0013 | −0.0002 | 0.0000 |
| S9 | −22.6951 | −0.0128 | 0.0122 | −0.0104 | 0.0044 | −0.0015 | 0.0004 | −0.0001 | 0.0000 | 0.0000 |
| S10 | −8.8637 | −0.0592 | 0.0398 | −0.0194 | 0.0059 | −0.0013 | 0.0002 | 0.0000 | 0.0000 | 0.0000 |
| S11 | −4.7723 | −0.0089 | −0.0095 | 0.0013 | 0.0005 | −0.0004 | 0.0001 | 0.0000 | 0.0000 | 0.0000 |
| S12 | −10.3919 | 0.0368 | −0.0332 | 0.0112 | −0.0025 | 0.0003 | 0.0000 | 0.0000 | 0.0000 | 0.0000 |
| S13 | 73.3908 | −0.1167 | 0.0467 | −0.0137 | 0.0027 | −0.0003 | 0.0000 | 0.0000 | 0.0000 | 0.0000 |
| S14 | −1.1357 | −0.1175 | 0.0438 | −0.0122 | 0.0022 | −0.0002 | 0.0000 | 0.0000 | 0.0000 | 0.0000 |

FIG. 12b illustrates a longitudinal spherical aberration curve, an astigmatic field curve, and a distortion curve of the optical system illustrated in FIG. 12a. The longitudinal spherical aberration curve represents a focus deviation of each of light rays with different wavelengths after passing through each lens of the optical system. The astigmatic field curve represents a tangential field curvature and a sagittal field curvature. The distortion curve represents magnitudes of distortions corresponding to different field angles. As illustrated in FIG. 12b, the optical system illustrated in FIG. 12a can achieve good imaging quality.

Table 13 illustrates a refractive power of each lens of each of the optical systems illustrated in FIG. 1a-12a.

TABLE 13

| | L1 | L2 | L3 | L4 | L5 | L6 | L7 |
|---|---|---|---|---|---|---|---|
| Optical System Illustrated in FIG. 1a | Positive | Negative | Positive | Negative | Positive | Positive | Negative |
| Optical System Illustrated in FIG. 2a | Positive | Negative | Positive | Positive | Positive | Positive | Negative |
| Optical System Illustrated in FIG. 3a | Positive | Negative | Positive | Positive | Negative | Positive | Negative |
| Optical System Illustrated in FIG. 4a | Positive | Negative | Negative | Positive | Negative | Positive | Negative |
| Optical System Illustrated in FIG. 5a | Positive | Negative | Positive | Positive | Positive | Negative | Negative |
| Optical System Illustrated in FIG. 6a | Positive | Negative | Negative | Positive | Positive | Positive | Negative |
| Optical System Illustrated in FIG. 7a | Positive | Negative | Negative | Positive | Positive | Positive | Negative |
| Optical System Illustrated in FIG. 8a | Positive | Negative | Negative | Positive | Positive | Negative | Negative |
| Optical System Illustrated in FIG. 9a | Positive | Negative | Negative | Positive | Positive | Negative | Negative |
| Optical System Illustrated in FIG. 10a | Positive | Negative | Positive | Positive | Positive | Positive | Negative |

TABLE 13-continued

|  | L1 | L2 | L3 | L4 | L5 | L6 | L7 |
|---|---|---|---|---|---|---|---|
| Optical System Illustrated in FIG. 11a | Positive | Negative | Negative | Positive | Positive | Positive | Negative |
| Optical System Illustrated in FIG. 12a | Positive | Negative | Negative | Positive | Positive | Positive | Negative |

Table 14 illustrates a surface profile of each lens of each of the optical systems illustrated in FIG. 1a-12a at the optical axis.

TABLE 14

|  | L1 | L2 | L3 | L4 | L5 | L6 | L7 |
|---|---|---|---|---|---|---|---|
| FIG. 1a | ( ( Convex Concave | ( ( Convex Concave | ( ( Convex Concave | ) ) Concave Convex | ( ( Convex Concave | ( ) Convex Convex | ) ( Concave Concave |
| FIG. 2a | ( ( Convex Concave | ( ( Convex Concave | ( ( Convex Concave | ( ( Convex Concave | ( ( Convex Concave | ( ( Convex Concave Concave | ( ( Convex Convex Concave |
| FIG. 3a | ( ( Convex Concave | ( ( Convex Concave | ( ( Convex Concave | ( ) Convex Convex | ( ( Convex Concave | ( ) Convex Convex | ) ( Concave Concave |
| FIG. 4a | ( ( Convex Concave | ( ( Convex Concave | ( ( Convex Concave | ) ) Concave Convex | ( ( Convex Concave | ( ( Convex Concave | ( ( Convex Concave Concave |
| FIG. 5a | ( ( Convex Concave | ( ( Convex Concave | ( ( Convex Concave | ) ) Concave Convex | ( ( Convex Concave | ( ( Convex Concave | ( ( Convex Concave Concave |
| FIG. 6a | ( ( Convex Concave | ( ( Convex Concave | ( ( Convex Concave | ) ) Concave Convex | ( ( Convex Concave | ( ( Convex Concave | ( ( Convex Concave Concave |
| FIG. 7a | ( ( Convex Concave | ( ( Convex Concave | ( ( Convex Concave | ( ) Convex Convex | ( ( Convex Concave | ( ( Convex Concave | ( ( Convex Concave Concave |
| FIG. 8a | ( ( Convex Concave | ( ( Convex Concave | ( ( Convex Concave | ( ) Convex Convex | ( ( Convex Concave | ( ( Convex Concave | ( ( Convex Concave Concave |
| FIG. 9a | ( ( Convex Concave | ( ( Convex Concave | ( ( Convex Concave | ( ) Convex Convex | ( ( Convex Concave | ( ( Convex Concave | ) ( Concave Concave |
| FIG. 10a | ( ( Convex Concave | ( ( Convex Concave | ( ( Convex Concave | ) ) Concave Convex | ( ( Convex Concave | ( ) Convex Convex | ) ( Concave Concave |
| FIG. 11a | ( ( Convex Concave | ( ( Convex Concave | ( ( Convex Concave | ( ) Convex Convex | ( ( Convex Concave | ( ( Convex Concave Concave | ) ( Concave Concave |
| FIG. 12a | ( ( Convex Concave | ( ( Convex Concave | ( ( Convex Concave | ( ) Convex Convex | ( ( Convex Concave | ( ( Convex Concave | ( ( Convex Concave Concave |

Table 15 illustrates a surface profile of each lens of each of the optical systems illustrated in FIG. 1a-12a at a periphery.

TABLE 15

|  | L1 | L2 | L3 | L4 | L5 | L6 | L7 |  |
|---|---|---|---|---|---|---|---|---|
| FIG. 1a | ( ) Convex Convex | ( ( Convex Concave | ( ( Convex Concave | ) ) Concave Convex | ) ) Concave Convex | ) ) Concave Convex | ( ) Concave Convex | At a Periphery |
| FIG. 2a | ( ( Convex Concave | ( ( Convex Concave | ) ( Concave Concave | ) ) Concave Convex | ) ( Concave Concave Concave | ) ) Concave Concave Convex | ) ) Concave Concave Convex |  |
| FIG. 3a | ( ( Convex Concave | ( ( Convex Concave | ( ( Convex Concave | ) ) Concave Convex | ) ) Concave Concave Convex | ) ) Concave Concave Convex | ( ) Convex Convex |  |
| FIG. 4a | ( ) Convex Convex | ( ( Convex Concave | ) ( Concave Concave | ) ) Concave Convex | ) ) Concave Concave Convex | ) ) Concave Concave Convex | ( ) Convex Convex |  |
| FIG. 5a | ( ) Convex Convex | ( ( Convex Concave | ) ( Concave Concave | ) ) Concave Concave | ) ) Concave Concave Convex | ) ) Concave Concave Convex | ( ) Convex Convex |  |

TABLE 15-continued

| | L1 | L2 | L3 | L4 | L5 | L6 | L7 |
|---|---|---|---|---|---|---|---|
| FIG. 6a | ( ( Convex Concave | ( ( Convex Concave | ) ( Concave Concave | ) ) Concave Concave | ) ) Concave Convex Convex | ) ) Concave Convex Convex | ) ) Concave Convex Convex |
| FIG. 7a | ( ( Convex Concave | ( ( Convex Concave | ) ( Concave Concave | ) ) Concave Convex | ) ( Concave Concave Convex | ) ) Concave Convex Convex | ) ) Concave Concave Convex |
| FIG. 8a | ( ) Convex Convex | ( ( Convex Concave | ) ( Concave Concave | ) ) Concave Convex | ) ) Concave Concave Convex | ) ) Concave Concave Convex | ) ) Concave Concave Convex |
| FIG. 9a | ( ) Convex Convex | ( ( Convex Concave | ) ( Concave Concave | ) ) Concave Convex | ) ) Concave Concave Convex | ) ) Concave Concave Convex | ) ) Concave Concave Convex |
| FIG. 10a | ( ( Convex Concave | ( ( Convex Concave | ) ( Concave Concave | ) ) Concave Convex | ) ) Concave Concave Convex | ) ) Concave Concave Convex | ( ) Convex Convex |
| FIG. 11a | ( ) Convex Convex | ( ( Convex Concave | ) ( Concave Concave | ) ) Concave Convex | ) ) Concave Concave Convex | ) ) Concave Concave Convex | ) ) Concave Concave Convex |
| FIG. 12a | ( ( Convex Concave | ( ( Convex Concave | ) ( Concave Concave | ) ) Concave Convex | ) ( Concave Concave Concave | ) ) Concave Concave Convex | ) ) Concave Concave Convex |

Table 16 illustrates a value of L/Imgh of each of the optical systems illustrated in FIG. 1a-12a. It can be seen from Table 16 that the optical system in each implementation satisfies the following expression: 0.6<L/Imgh<0.8.

TABLE 16

| | 0.6 < L/Imgh < 0.8 | |
|---|---|---|
| Optical System Illustrated in FIG. 1a | 3.31/4.8 | 0.69 |
| Optical System Illustrated in FIG. 2a | 3.31/4.8 | 0.69 |
| Optical System Illustrated in FIG. 3a | 3.32/4.8 | 0.69 |
| Optical System Illustrated in FIG. 4a | 3.45/4.8 | 0.72 |
| Optical System Illustrated in FIG. 5a | 3.46/4.8 | 0.72 |
| Optical System Illustrated in FIG. 6a | 3.42/4.8 | 0.71 |
| Optical System Illustrated in FIG. 7a | 3.54/4.8 | 0.74 |
| Optical System Illustrated in FIG. 8a | 3.35/4.8 | 0.70 |
| Optical System Illustrated in FIG. 9a | 3.34/4.8 | 0.70 |
| Optical System Illustrated in FIG. 10a | 3.23/4.8 | 0.67 |
| Optical System Illustrated in FIG. 11a | 3.08/4.8 | 0.64 |
| Optical System Illustrated in FIG. 12a | 2.95/4.8 | 0.62 |

Table 17 illustrates a value of f14/f of each of the optical systems illustrated in FIG. 1a-12a. It can be seen from Table 17 that the optical system in each implementation satisfies the following expression: 1<f14/f<1.5.

TABLE 17

| | 1 < f14/f < 1.5 | |
|---|---|---|
| Optical System Illustrated in FIG. 1a | 7.12/5.56 | 1.30 |
| Optical System Illustrated in FIG. 2a | 6.71/5.56 | 1.21 |
| Optical System Illustrated in FIG. 3a | 6.51/5.58 | 1.17 |
| Optical System Illustrated in FIG. 4a | 6.80/5.79 | 1.17 |
| Optical System Illustrated in FIG. 5a | 6.37/5.82 | 1.09 |
| Optical System Illustrated in FIG. 6a | 6.51/5.74 | 1.13 |
| Optical System Illustrated in FIG. 7a | 6.47/5.94 | 1.09 |
| Optical System Illustrated in FIG. 8a | 6.36/5.62 | 1.13 |
| Optical System Illustrated in FIG. 9a | 6.35/5.61 | 1.13 |
| Optical System Illustrated in FIG. 10a | 7.02/5.54 | 1.27 |
| Optical System Illustrated in FIG. 11a | 6.38/5.61 | 1.14 |
| Optical System Illustrated in FIG. 12a | 6.56/5.67 | 1.16 |

Table 18 illustrates a value of no of each of the optical systems illustrated in FIG. 1a-12a. It can be seen from Table 18 that the optical system in each implementation satisfies the following expression: Fno<2.

TABLE 18

| | Fno < 2 | |
|---|---|---|
| Optical System Illustrated in FIG. 1a | 1.68 | 1.68 |
| Optical System Illustrated in FIG. 2a | 1.68 | 1.68 |
| Optical System Illustrated in FIG. 3a | 1.68 | 1.68 |
| Optical System Illustrated in FIG. 4a | 1.68 | 1.68 |
| Optical System Illustrated in FIG. 5a | 1.68 | 1.68 |
| Optical System Illustrated in FIG. 6a | 1.68 | 1.68 |
| Optical System Illustrated in FIG. 7a | 1.68 | 1.68 |
| Optical System Illustrated in FIG. 8a | 1.68 | 1.68 |
| Optical System Illustrated in FIG. 9a | 1.68 | 1.68 |
| Optical System Illustrated in FIG. 10a | 1.75 | 1.75 |
| Optical System Illustrated in FIG. 11a | 1.82 | 1.82 |
| Optical System Illustrated in FIG. 12a | 1.92 | 1.92 |

Table 19 illustrates a value of Fno/TTL of each of the optical systems illustrated in FIG. 1a-12a. It can be seen from Table 19 that the optical system in each implementation satisfies the following expression: Fno/TTL<0.29.

TABLE 19

| | Fno/TTL < 0.29 | |
|---|---|---|
| Optical System Illustrated in FIG. 1a | 1.68/6.69 | 0.251 |
| Optical System Illustrated in FIG. 2a | 1.68/6.68 | 0.251 |
| Optical System Illustrated in FIG. 3a | 1.68/6.69 | 0.251 |
| Optical System Illustrated in FIG. 4a | 1.68/6.80 | 0.247 |
| Optical System Illustrated in FIG. 5a | 1.68/6.80 | 0.247 |
| Optical System Illustrated in FIG. 6a | 1.68/6.80 | 0.247 |
| Optical System Illustrated in FIG. 7a | 1.68/6.80 | 0.247 |
| Optical System Illustrated in FIG. 8a | 1.68/6.80 | 0.247 |
| Optical System Illustrated in FIG. 9a | 1.68/6.80 | 0.247 |
| Optical System Illustrated in FIG. 10a | 1.75/6.69 | 0.262 |
| Optical System Illustrated in FIG. 11a | 1.82/6.80 | 0.268 |
| Optical System Illustrated in FIG. 12a | 1.92/6.80 | 0.282 |

Table 20 illustrates a value of TTL/D of each of the optical systems illustrated in FIG. 1a-12a. It can be seen from Table 20 that the optical system in each implementation satisfies the following expression: 1.5<TTL/D<2.5.

TABLE 20

| | 1.5 < TTL/D < 2.5 | |
|---|---|---|
| Optical System Illustrated in FIG. 1a | 6.69/3.31 | 2.02 |
| Optical System Illustrated in FIG. 2a | 6.68/3.31 | 2.02 |

TABLE 20-continued

| | 1.5 < TTL/D < 2.5 | |
|---|---|---|
| Optical System Illustrated in FIG. 3a | 6.69/3.32 | 2.02 |
| Optical System Illustrated in FIG. 4a | 6.80/3.45 | 1.97 |
| Optical System Illustrated in FIG. 5a | 6.80/3.46 | 1.97 |
| Optical System Illustrated in FIG. 6a | 6.80/3.42 | 1.99 |
| Optical System Illustrated in FIG. 7a | 6.80/3.54 | 1.92 |
| Optical System Illustrated in FIG. 8a | 6.80/3.35 | 2.03 |
| Optical System Illustrated in FIG. 9a | 6.80/3.34 | 2.04 |
| Optical System Illustrated in FIG. 10a | 6.69/3.17 | 2.11 |
| Optical System Illustrated in FIG. 11a | 6.80/3.08 | 2.21 |
| Optical System Illustrated in FIG. 12a | 6.80/2.95 | 2.31 |

Table 21 illustrates a value of TTL/Imgh of each of the optical systems illustrated in FIG. 1a-12a. It can be seen from Table 21 that the optical system in each implementation satisfies the following expression: TTL/Imgh<1.5.

TABLE 21

| | TTL/Imgh < 1.5 | |
|---|---|---|
| Optical System Illustrated in FIG. 1a | 6.69/4.8 | 1.39 |
| Optical System Illustrated in FIG. 2a | 6.68/4.8 | 1.39 |
| Optical System Illustrated in FIG. 3a | 6.69/4.8 | 1.39 |
| Optical System Illustrated in FIG. 4a | 6.80/4.8 | 1.42 |
| Optical System Illustrated in FIG. 5a | 6.80/4.8 | 1.42 |
| Optical System Illustrated in FIG. 6a | 6.80/4.8 | 1.42 |
| Optical System Illustrated in FIG. 7a | 6.80/4.8 | 1.42 |
| Optical System Illustrated in FIG. 8a | 6.80/4.8 | 1.42 |
| Optical System Illustrated in FIG. 9a | 6.80/4.8 | 1.42 |
| Optical System Illustrated in FIG. 10a | 6.69/4.8 | 1.39 |
| Optical System Illustrated in FIG. 11a | 6.80/4.8 | 1.42 |
| Optical System Illustrated in FIG. 12a | 6.80/4.8 | 1.42 |

Table 22 illustrates a value of TTL/f each of the optical systems illustrated in FIG. 1a-12a. It can be seen from Table 22 that the optical system in each implementation satisfies the following expression: 1.0<TTL/f<1.3.

TABLE 22

| | 1.0 < TTL/f < 1.3 | |
|---|---|---|
| Optical System Illustrated in FIG. 1a | 6.69/5.56 | 1.20 |
| Optical System Illustrated in FIG. 2a | 6.68/5.56 | 1.20 |
| Optical System Illustrated in FIG. 3a | 6.69/5.58 | 1.20 |
| Optical System Illustrated in FIG. 4a | 6.80/5.79 | 1.17 |
| Optical System Illustrated in FIG. 5a | 6.80/5.82 | 1.17 |
| Optical System Illustrated in FIG. 6a | 6.80/5.74 | 1.18 |
| Optical System Illustrated in FIG. 7a | 6.80/5.94 | 1.14 |
| Optical System Illustrated in FIG. 8a | 6.80/5.62 | 1.21 |
| Optical System Illustrated in FIG. 9a | 6.80/5.61 | 1.21 |
| Optical System Illustrated in FIG. 10a | 6.69/5.54 | 1.21 |
| Optical System Illustrated in FIG. 11a | 6.80/5.61 | 1.21 |
| Optical System Illustrated in FIG. 12a | 6.80/5.67 | 1.20 |

Table 23 illustrates a value of f/f1 of each of the optical systems illustrated in FIG. 1a-12a. It can be seen from Table 23 that the optical system in each implementation satisfies the following expression: 1.0<f/f1<1.3.

TABLE 23

| | 1.0 < f/f1 < 1.3 | |
|---|---|---|
| Optical System Illustrated in FIG. 1a | 5.56/4.74 | 1.17 |
| Optical System Illustrated in FIG. 2a | 5.56/4.72 | 1.18 |
| Optical System Illustrated in FIG. 3a | 5.58/5.13 | 1.09 |
| Optical System Illustrated in FIG. 4a | 5.79/5.08 | 1.14 |
| Optical System Illustrated in FIG. 5a | 5.82/4.96 | 1.17 |
| Optical System Illustrated in FIG. 6a | 5.74/5.01 | 1.15 |
| Optical System Illustrated in FIG. 7a | 5.94/4.99 | 1.19 |

TABLE 23-continued

| | 1.0 < f/f1 < 1.3 | |
|---|---|---|
| Optical System Illustrated in FIG. 8a | 5.62/5.15 | 1.09 |
| Optical System Illustrated in FIG. 9a | 5.61/5.17 | 1.08 |
| Optical System Illustrated in FIG. 10a | 5.54/5.18 | 1.11 |
| Optical System Illustrated in FIG. 11a | 5.61/5.19 | 1.09 |
| Optical System Illustrated in FIG. 12a | 5.67/5.20 | 1.14 |

Table 24 illustrates a value of (R9+R10)/R9*R10' of each of the optical systems illustrated in FIG. 1a-12a. It can be seen from Table 24 that the optical system in each implementation satisfies the following expression: 0.2<(R9+R10)/R9*R10'<0.65.

TABLE 24

| | 0.2 < (R9 + R10)/R9*R10' < 0.65 | |
|---|---|---|
| Optical System Illustrated in FIG. 1a | (3.29 + 3.47)/3.29*3.47' | 0.59 |
| Optical System Illustrated in FIG. 2a | (6.97 + 6.83)/6.97*6.83' | 0.29 |
| Optical System Illustrated in FIG. 3a | (3.86 + 3.05)/3.86*3.05' | 0.59 |
| Optical System Illustrated in FIG. 4a | (7.24 + 7.10)/7.24*7.10' | 0.28 |
| Optical System Illustrated in FIG. 5a | (4.93 + 8.49)/4.93*8.49' | 0.32 |
| Optical System Illustrated in FIG. 6a | (5.02 + 5.26)/5.02*5.26' | 0.39 |
| Optical System Illustrated in FIG. 7a | (4.75 + 4.84)/4.75*4.84' | 0.42 |
| Optical System Illustrated in FIG. 8a | (5.38 + 11.64)/5.38*11.64' | 0.27 |
| Optical System Illustrated in FIG. 9a | (5.37 + 12.10)/5.37*12.10' | 0.27 |
| Optical System Illustrated in FIG. 10a | (3.30 + 3.34)/3.30*3.34' | 0.60 |
| Optical System Illustrated in FIG. 11a | (5.35 + 11.94)/5.35*11.94' | 0.27 |
| Optical System Illustrated in FIG. 12a | (5.10 + 5.37)/5.10*5.37' | 0.38 |

Table 25 illustrates a value of (R1+R2)/f1 of each of the optical systems illustrated in FIG. 1a-12a. It can be seen from Table 25 that the optical system in each implementation satisfies the following expression: 2<(R1+R2)/f1<4.5.

TABLE 25

| | 2 < (R1 + R2)/f1 < 4.5 | |
|---|---|---|
| Optical System Illustrated in FIG. 1a | (2.25 + 14.74)/4.74 | 3.59 |
| Optical System Illustrated in FIG. 2a | (2.28 + 17.27)/4.72 | 4.15 |
| Optical System Illustrated in FIG. 3a | (2.28 + 10.64)/5.13 | 2.52 |
| Optical System Illustrated in FIG. 4a | (2.40 + 15.26)/5.08 | 3.48 |
| Optical System Illustrated in FIG. 5a | (2.39 + 17.40)/4.96 | 3.99 |
| Optical System Illustrated in FIG. 6a | (2.39 + 16.38)/5.01 | 3.75 |
| Optical System Illustrated in FIG. 7a | (2.36 + 14.91)/4.99 | 3.46 |
| Optical System Illustrated in FIG. 8a | (2.45 + 16.65)/5.15 | 3.71 |
| Optical System Illustrated in FIG. 9a | (2.46 + 16.56)/5.17 | 3.68 |
| Optical System Illustrated in FIG. 10a | (2.27 + 11.42)/5.00 | 2.74 |
| Optical System Illustrated in FIG. 11a | (2.45 + 16.21)/5.17 | 3.61 |
| Optical System Illustrated in FIG. 12a | (2.39 + 16.73)/5.99 | 3.83 |

Table 26 illustrates a value of R3/R4 of each of the optical systems illustrated in FIG. 1a-12a. It can be seen from Table 26 that the optical system in each implementation satisfies the following expression: 1.5<R3/R4<3.5.

TABLE 26

| | 1.5 < R3/R4 < 3.5 | |
|---|---|---|
| Optical System Illustrated in FIG. 1a | 13.34/4.39 | 3.04 |
| Optical System Illustrated in FIG. 2a | 7.93/3.43 | 2.31 |
| Optical System Illustrated in FIG. 3a | 7.11/3.38 | 2.10 |
| Optical System Illustrated in FIG. 4a | 8.11/3.62 | 2.24 |
| Optical System Illustrated in FIG. 5a | 8.98/3.47 | 2.59 |
| Optical System Illustrated in FIG. 6a | 8.79/3.51 | 2.50 |
| Optical System Illustrated in FIG. 7a | 8.56/3.52 | 2.44 |
| Optical System Illustrated in FIG. 8a | 9.41/3.81 | 2.47 |
| Optical System Illustrated in FIG. 9a | 9.42/3.84 | 2.45 |
| Optical System Illustrated in FIG. 10a | 12.22/4.40 | 2.78 |

TABLE 26-continued

| | 1.5 < R3/R4 < 3.5 | |
|---|---|---|
| Optical System Illustrated in FIG. 11a | 9.27/3.83 | 2.42 |
| Optical System Illustrated in FIG. 12a | 8.89/3.54 | 2.51 |

Table 27 illustrates a value of (R5+R6)/(R5-R6) of each of the optical systems illustrated in FIG. 1a-12a. It can be seen from Table 27 that the optical system in each implementation satisfies the following expression: −100<(R5+R6)/(R5−R6)<180.

TABLE 27

| | −100 < (R5 + R6)/(R5 − R6) < 180 | |
|---|---|---|
| Optical System Illustrated in FIG. 1a | (3.67 + 3.78)/(3.67 − 3.78) | −64.35 |
| Optical System Illustrated in FIG. 2a | (3.98 + 3.93)/(3.98 − 3.93) | 172.74 |
| Optical System Illustrated in FIG. 3a | (4.08 + 4.37)/(4.08 − 4.37) | −28.60 |
| Optical System Illustrated in FIG. 4a | (4.53 + 4.34)/(4.53 − 4.34) | 48.25 |
| Optical System Illustrated in FIG. 5a | (5.16 + 5.28)/(5.16 − 5.28) | −87.47 |
| Optical System Illustrated in FIG. 6a | (6.30 + 6.15)/(6.30 − 6.15) | 85.43 |
| Optical System Illustrated in FIG. 7a | (6.38 + 6.24)/(6.38 − 6.24) | 95.06 |
| Optical System Illustrated in FIG. 8a | (6.36 + 5.57)/(6.36 − 5.57) | 15.23 |
| Optical System Illustrated in FIG. 9a | (6.45 + 5.6)/(6.45 − 5.6) | 14.24 |
| Optical System Illustrated in FIG. 10a | (4.12 + 4.25)/(4.12 − 4.25) | −66.14 |
| Optical System Illustrated in FIG. 11a | (6.66 + 5.67)/(6.66 − 5.67) | 12.45 |
| Optical System Illustrated in FIG. 12a | (6.44 + 6.13)/(6.44 − 6.13) | 40.91 |

Table 28 illustrates a value of f1/f2 of the optical system of each of the optical systems illustrated in FIG. 1a-12a. It can be seen from Table 28 that the optical system in each implementation satisfies the following expression: −0.6<f1/f2<−0.3.

TABLE 28

| | −0.6 < f1/f2 < −0.3 | |
|---|---|---|
| Optical System Illustrated in FIG. 1a | 4.74/−9.91 | −0.48 |
| Optical System Illustrated in FIG. 2a | 4.72/−9.25 | −0.51 |
| Optical System Illustrated in FIG. 3a | 5.13/−9.92 | −0.52 |
| Optical System Illustrated in FIG. 4a | 5.08/−10.05 | −0.51 |
| Optical System Illustrated in FIG. 5a | 4.96/−8.68 | −0.57 |
| Optical System Illustrated in FIG. 6a | 5.01/−8.99 | −0.56 |
| Optical System Illustrated in FIG. 7a | 4.99/−9.18 | −0.54 |
| Optical System Illustrated in FIG. 8a | 5.15/−9.82 | −0.52 |
| Optical System Illustrated in FIG. 9a | 5.17/−9.93 | −0.52 |
| Optical System Illustrated in FIG. 10a | 5.00/−10.47 | −0.48 |
| Optical System Illustrated in FIG. 11a | 5.17/−10.02 | −0.52 |
| Optical System Illustrated in FIG. 12a | 4.99/−9.03 | −0.55 |

Table 29 illustrates a value of (R13*R14)*(R13-R14) of each of the optical systems illustrated in FIG. 4a-12a. It can be seen from Table 29 that the optical system in each implementation satisfies the following expression: 1.5<(R13*R14)(R13-R14)<3.5.

TABLE 29

| | 1.5 < (R13*R14)/(R13 − R14) < 3.5 | |
|---|---|---|
| Optical System Illustrated in FIG. 1a | (−3.66*2.86)/(−3.66 − 2.86) | 1.61 |
| Optical System Illustrated in FIG. 2a | (8.29*2.15)/(8.29 − 2.15) | 2.90 |
| Optical System Illustrated in FIG. 3a | (−7.34*2.34)/(−7.34 − 2.34) | 1.78 |
| Optical System Illustrated in FIG. 4a | (8.8*2.22)/(8.8 − 2.22) | 2.96 |
| Optical System Illustrated in FIG. 5a | (19.17*2.49)/(19.17 − 2.49) | 2.87 |
| Optical System Illustrated in FIG. 6a | (42.03*2.53)/(42.03 − 2.53) | 2.69 |
| Optical System Illustrated in FIG. 7a | (46.17*2.4)/(46.17 − 2.4) | 2.53 |
| Optical System Illustrated in FIG. 8a | (4388.69*2.73)/(4388.69 − 2.73) | 2.73 |
| Optical System Illustrated in FIG. 9a | (−124.62*2.78)/(−124.62 − 2.78) | 2.72 |
| Optical System Illustrated in FIG. 10a | (−3.95*2.85)/(−3.95 − 2.85) | 1.65 |
| Optical System Illustrated in FIG. 11a | (−104.29*2.81)/(−104.29 − 2.81) | 2.74 |
| Optical System Illustrated in FIG. 12a | (44.98*2.58)/(44.98 − 2.58) | 2.73 |

Table 30 illustrates a value of ΣCT/f of each of the optical systems illustrated in FIG. 1a-12a. It can be seen from Table 30 that the optical system in each implementation satisfies the following expression: 0.5<ΣCT/f<0.7.

TABLE 30

| | 0.5 < ΣCT/f < 0.7 | |
|---|---|---|
| Optical System Illustrated in FIG. 1a | 3.59/5.56 | 0.65 |
| Optical System Illustrated in FIG. 2a | 3.39/5.56 | 0.61 |
| Optical System Illustrated in FIG. 3a | 3.50/5.58 | 0.63 |
| Optical System Illustrated in FIG. 4a | 3.31/5.79 | 0.57 |
| Optical System Illustrated in FIG. 5a | 3.45/5.82 | 0.59 |
| Optical System Illustrated in FIG. 6a | 3.35/5.74 | 0.58 |
| Optical System Illustrated in FIG. 7a | 3.39/5.94 | 0.57 |
| Optical System Illustrated in FIG. 8a | 3.49/5.62 | 0.62 |
| Optical System Illustrated in FIG. 9a | 3.49/5.61 | 0.62 |
| Optical System Illustrated in FIG. 10a | 3.57/5.54 | 0.64 |
| Optical System Illustrated in FIG. 11a | 3.44/5.61 | 0.61 |
| Optical System Illustrated in FIG. 12a | 3.33/5.67 | 0.59 |

Table 31 illustrates a value of ΣCT/TTL of each of the optical systems illustrated in FIG. 1a-12a. It can be seen from Table 31 that the optical system in each implementation satisfies the following expression: 0.4<ΣCT/TTL<0.6.

TABLE 31

| | 0.4 < ΣCT/TTL < 0.6 | |
|---|---|---|
| Optical System Illustrated in FIG. 1a | 3.59/6.69 | 0.54 |
| Optical System Illustrated in FIG. 2a | 3.39/6.68 | 0.51 |
| Optical System Illustrated in FIG. 3a | 3.50/6.69 | 0.52 |
| Optical System Illustrated in FIG. 4a | 3.31/6.8 | 0.49 |
| Optical System Illustrated in FIG. 5a | 3.45/6.8 | 0.51 |
| Optical System Illustrated in FIG. 6a | 3.35/6.8 | 0.49 |
| Optical System Illustrated in FIG. 7a | 3.39/6.8 | 0.50 |
| Optical System Illustrated in FIG. 8a | 3.49/6.8 | 0.51 |
| Optical System Illustrated in FIG. 9a | 3.49/6.8 | 0.51 |
| Optical System Illustrated in FIG. 10a | 3.57/6.69 | 0.53 |
| Optical System Illustrated in FIG. 11a | 3.44/6.80 | 0.51 |
| Optical System Illustrated in FIG. 12a | 3.33/6.80 | 0.49 |

Table 32 illustrates a value of ET1/CT1 of each of the optical systems illustrated in FIG. 1a-12a. It can be seen from Table 32 that the optical system in each implementation satisfies the following expression: 0.25<ET1/CT1<0.55.

TABLE 32

| | 0.25 < ET1/CT1 < 0.55 | |
|---|---|---|
| Optical System Illustrated in FIG. 1a | 0.32/1.01 | 0.32 |
| Optical System Illustrated in FIG. 2a | 0.28/0.94 | 0.30 |
| Optical System Illustrated in FIG. 3a | 0.32/0.94 | 0.34 |
| Optical System Illustrated in FIG. 4a | 0.30/0.96 | 0.32 |
| Optical System Illustrated in FIG. 5a | 0.29/0.98 | 0.29 |
| Optical System Illustrated in FIG. 6a | 0.29/0.96 | 0.31 |
| Optical System Illustrated in FIG. 7a | 0.32/1.04 | 0.31 |
| Optical System Illustrated in FIG. 8a | 0.30/0.90 | 0.33 |
| Optical System Illustrated in FIG. 9a | 0.30/0.89 | 0.34 |

TABLE 32-continued

| | 0.25 < ET1/CT1 < 0.55 | |
|---|---|---|
| Optical System Illustrated in FIG. 10a | 0.29/0.90 | 0.32 |
| Optical System Illustrated in FIG. 11a | 0.38/0.88 | 0.43 |
| Optical System Illustrated in FIG. 12a | 0.44/0.91 | 0.49 |

Table 33 illustrates a value of ET5/CT5 of each of the optical systems illustrated in FIG. 1a-12a. It can be seen from Table 33 that the optical system in each implementation satisfies the following expression: 1.0<ET5/CT5<1.6.

TABLE 33

| | 1.0 < ET5/CT5 < 1.6 | |
|---|---|---|
| Optical System Illustrated in FIG. 1a | 0.49/0.44 | 1.11 |
| Optical System Illustrated in FIG. 2a | 0.46/0.42 | 1.08 |
| Optical System Illustrated in FIG. 3a | 0.47/0.42 | 1.13 |
| Optical System Illustrated in FIG. 4a | 0.40/0.36 | 1.11 |
| Optical System Illustrated in FIG. 5a | 0.46/0.42 | 1.09 |
| Optical System Illustrated in FIG. 6a | 0.46/0.40 | 1.13 |
| Optical System Illustrated in FIG. 7a | 0.55/0.39 | 1.42 |
| Optical System Illustrated in FIG. 8a | 0.54/0.44 | 1.22 |
| Optical System Illustrated in FIG. 9a | 0.54/0.45 | 1.20 |
| Optical System Illustrated in FIG. 10a | 0.48/0.43 | 1.13 |
| Optical System Illustrated in FIG. 11a | 0.53/0.43 | 1.22 |
| Optical System Illustrated in FIG. 12a | 0.46/0.40 | 1.17 |

Preferred implementations of the present disclosure have been described above, which cannot be understood as limitations on the present disclosure. Those skilled in the art can appreciate all or part of processes of carrying out the above-mentioned implementations, make equivalent changes based on the claims of the present disclosure, and these equivalent changes are also considered to fall into the protection scope of the present disclosure.

What is claimed is:

1. An optical system comprising, in order from an object side to an image side along an optical axis:
a first lens with a positive refractive power, wherein the first lens has an object-side surface which is convex and an image-side surface which is concave at the optical axis;
a second lens with a negative refractive power, wherein the second lens has an object-side surface which is convex and an image-side surface which is concave;
a third lens with a refractive power, wherein the third lens has an object-side surface which is convex at the optical axis and an image-side surface which is concave at the optical axis;
a fourth lens with a refractive power;
a fifth lens with a refractive power, wherein the fifth lens has an object-side surface which is convex at the optical axis and an image-side surface which is concave at the optical axis;
a sixth lens with a refractive power; and
a seventh lens with a negative refractive power, wherein the seventh lens has an image-side surface which is concave at the optical axis, wherein the optical system further comprises a stop, and the optical system satisfies the following expression:

$1.5 < TTL/D < 2.5;$ wherein TTL represents a distance on the optical axis from the object-side surface of the first lens to an imaging plane of the optical system, and D represents an aperture of the stop;

wherein the optical system further satisfies the following expression:

$2.52 < (R1+R2)/f1 < 4.5;$ wherein R1 represents a radius of curvature of the object-side surface of the first lens, R2 represents a radius of curvature of the image-side surface of the first lens, and f1 represents an effective focal length of the first lens; and wherein the optical system satisfies the following expression:

$0.6 < L/\mathrm{Imgh} < 0.8;$ wherein L represents a clear aperture diameter of the first lens, and Imgh represents half of a diagonal length of an effective pixel area of the imaging plane of the optical system.

2. The optical system of claim 1, wherein the optical system satisfies the following expression:

$Fno < 2;$ wherein Fno represents an F-number of the optical system.

3. The optical system of claim 1, wherein the optical system satisfies the following expression:

$Fno/TTL < 0.29;$ wherein Fno represents an F-number of the optical system.

4. The optical system of claim 1, wherein the optical system satisfies the following expression:

$TTL/\mathrm{Imgh} < 1.5;$ wherein Imgh represents half of a diagonal length of an effective pixel area of the imaging plane of the optical system.

5. The optical system of claim 1, wherein the optical system satisfies the following expression:

$1.0 < TT/f < 1.3;$ wherein $f$ represents an effective focal length of the optical system.

6. The optical system of claim 1, wherein the optical system satisfies the following expression:

$1.0 < f1/f < 1.3;$ wherein f1 represents an effective focal length of the first lens, and f represents an effective focal length of the optical system.

7. The optical system of claim 1, wherein the optical system satisfies the following expression:

$0.2 < (R9+R10)/R9*R10 < 0.65;$ wherein R9 represents a radius of curvature of the object-side surface of the fifth lens, R10 represents a radius of curvature of the image-side surface of the fifth lens.

8. The optical system of claim 1, wherein the optical system satisfies the following expression:

$1.5 < R3/R4 < 3.5;$ wherein R3 represents a radius of curvature of the object-side surface of the second lens, and R4 represents a radius of curvature of the image-side surface of the second lens.

9. The optical system of claim 1, wherein the optical system satisfies the following expression:

$-100 < (R5+R6)/(R5-R6) < 180;$ wherein R5 represents a radius of curvature of the object-side surface of the third lens, and R6 represents a radius of curvature of the image-side surface of the third lens.

10. The optical system of claim 1, wherein the optical system satisfies the following expression:

$$-0.6<f1/f2<-0.3;$$

wherein $f1$ represents an effective focal length of the first lens, and $f2$ represents an effective focal length of the second lens.

11. The optical system of claim 1, wherein the optical system satisfies the following expression:

$$1.5<(R13*R14)/(R13-R14)<3.5;$$

wherein R13 represents a radius of curvature of an object-side surface of the seventh lens, and R14 represents a radius of curvature of the image-side surface of the seventh lens.

12. The optical system of claim 1, wherein the optical system satisfies the following expression:

$$0.5<\Sigma CT1f<0.7;$$

wherein $\Sigma CT$ represents a sum of a center thickness of each lens of the optical system on the optical axis, and f represents an effective focal length of the optical system.

13. The optical system of claim 1, wherein the optical system satisfies the following expression:

$$0.4<\Sigma CT/TTL<0.6;$$

wherein $\Sigma CT$ represents a sum of a center thickness of each lens of the optical system on the optical axis.

14. The optical system of claim 1, wherein the optical system satisfies the following expression:

$$0.25<ED1/CT1<0.55;$$

wherein ET1 represents an edge thickness of the first lens, and CT1 represents a center thickness of the first lens.

15. The optical system of claim 1, wherein the optical system satisfies the following expression:

$$1.0<ET5/CT5<1.6;$$

wherein ET5 represents an edge thickness of the fifth lens, and CT5 represents a center thickness of the fifth lens.

16. The optical system of claim 1, wherein the optical system satisfies the following expression:

$$2.1 \leq R3/R4<3.5;$$

wherein R3 represents a radius of curvature of the object-side surface of the second lens, and R4 represents a radius of curvature of the image-side surface of the second lens.

17. An optical system comprising, in order from an object side to an image side along an optical axis:
a first lens with a positive refractive power, wherein the first lens has an object-side surface which is convex and an image-side surface which is concave at the optical axis;
a second lens with a negative refractive power, wherein the second lens has an object-side surface which is convex and an image-side surface which is concave;
a third lens with a refractive power, wherein the third lens has an object-side surface which is convex at the optical axis and an image-side surface which is concave at the optical axis;
a fourth lens with a refractive power;
a fifth lens with a refractive power, wherein the fifth lens has an object-side surface which is convex at the optical axis and an image-side surface which is concave at the optical axis;
a sixth lens with a refractive power; and
a seventh lens with a negative refractive power, wherein the seventh lens has an image-side surface which is concave at the optical axis, wherein the optical system further comprises a stop, and the optical system satisfies the following expression:

$$1.5<TTL/D<2.5;$$

wherein TTL represents a distance on the optical axis from the object-side surface of the first lens to an imaging plane of the optical system, and D represents an aperture of the stop;
wherein the optical system further satisfies the following expression:

$$2.52<(R1+R2)/f1<4.5;$$

wherein R1 represents a radius of curvature of the object-side surface of the first lens, R2 represents a radius of curvature of the image-side surface of the first lens, and f1 represents an effective focal length of the first lens; and
wherein the optical system satisfies the following expression:

$$1<f14/f<1.5;$$

wherein f14 represents a combined focal length of the first lens, the second lens, the third lens, and the fourth lens, and f represents an effective focal length of the optical system.

18. A lens module, comprising:
a lens barrel; and
an optical system comprising, in order from an object side to an image side along an optical axis:
a first lens with a positive refractive power, wherein the first lens has an object-side surface which is convex and an image-side surface which is concave at the optical axis;
a second lens with a negative refractive power, wherein the second lens has an object-side surface which is convex and an image-side surface which is concave;
a third lens with a refractive power, wherein the third lens has an object-side surface which is convex at the optical axis and an image-side surface which is concave at the optical axis;
a fourth lens with a refractive power;
a fifth lens with a refractive power, wherein the fifth lens has an object-side surface which is convex at the optical axis and an image-side surface which is concave at the optical axis;
a sixth lens with a refractive power; and
a seventh lens with a negative refractive power, wherein the seventh lens has an image-side surface which is concave at the optical axis, wherein the optical system further comprises a stop, and the optical system satisfies the following expression:

$$1.5<TTL/D<2.5;$$

wherein TTL represents a distance on the optical axis from the object-side surface of the first lens to an imaging plane of the optical system, and D represents an aperture of the stop;

wherein the first to seventh lenses of the optical system are received in the lens barrel;

wherein the optical system further satisfies the following expression:

$$2.52 < (R1+R2)/f1 < 4.5;$$

wherein R1 represents a radius of curvature of the object-side surface of the first lens, R2 represents a radius of curvature of the image-side surface of the first lens, and f1 represents an effective focal length of the first lens; and wherein the optical system satisfies the following expression:

$$0.6 < L/\text{Imgh} < 0.8;$$

wherein L represents a clear aperture diameter of the first lens, and Imgh represents half of a diagonal length of an effective pixel area of the imaging plane of the optical system.

19. An electronic device, comprising:
a housing;
an electronic photosensitive element; and
the lens module of claim 18;
wherein the lens module and the electronic photosensitive element are received in the housing, and the electronic photosensitive element is disposed on the imaging plane of the optical system and configured to convert lights of an object passing through the first to seventh lenses and incident on the electronic photosensitive element into an electrical signal of an image.

* * * * *